United States Patent
Hecht

(10) Patent No.: US 6,594,406 B1
(45) Date of Patent: Jul. 15, 2003

(54) MULTI-LEVEL SELECTION METHODS AND APPARATUS USING CONTEXT IDENTIFICATION FOR EMBEDDED DATA GRAPHICAL USER INTERFACES

(75) Inventor: David L. Hecht, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/223,882

(22) Filed: Dec. 31, 1998

Related U.S. Application Data

(63) Continuation-in-part of application No. 09/144,518, filed on Aug. 31, 1998, now Pat. No. 6,208,771, and a continuation-in-part of application No. 09/144,250, filed on Aug. 31, 1998, now Pat. No. 6,310,988, and a continuation-in-part of application No. 09/144,251, filed on Aug. 31, 1998, now Pat. No. 6,327,395, which is a continuation-in-part of application No. 08/772,158, filed on Dec. 20, 1996, now Pat. No. 5,937,110.

(51) Int. Cl.[7] .............................. G06K 9/54; G06K 9/60
(52) U.S. Cl. ....................... 382/306; 382/232; 235/494; 235/487
(58) Field of Search ................................. 382/306, 232, 382/243; 235/494, 456, 487, 462.1, 454, 470, 432, 375

(56) References Cited

U.S. PATENT DOCUMENTS

| | | | |
|---|---|---|---|
| 5,315,098 A | | 5/1994 | Tow |
| 5,337,361 A | | 8/1994 | Wang et al. |
| 5,388,203 A | | 2/1995 | Kaneko |
| 5,416,312 A | | 5/1995 | Lamoure |
| 5,761,686 A | * | 6/1998 | Bloomberg .................. 382/232 |
| 5,937,110 A | | 8/1999 | Petrie et al. |

FOREIGN PATENT DOCUMENTS

| | | |
|---|---|---|
| JP | 10-187911 | 7/1998 |
| WO | WO 98/35336 | 8/1998 |

OTHER PUBLICATIONS

Card, S. K., "The Human, The Computer, The Task, and Their Interaction—Analytic Models and Use–Centered Design," Mind Matters: A Tribute to Allen Newell, Edited by D. Steier and T. Mitchell, Lawrence Erlbaum Associates, Publishers, 1996, pp. 259–312.

Rekimoto, J., "Pick–and–Drop: A Direct Manipulation Technique for Multiple Computer Environments," 10th Annual Symposium on User Interface Software and Technology, UIST 97 Banff, Alberta, Canada, Oct. 14–17, 1997, pp. 31–39.

(List continued on next page.)

*Primary Examiner*—Thomas D. Lee

(57) ABSTRACT

An image capture user interface receives an image of an area of a user interface selected by a user and translates the image into operations performable by a computer. The user interface is comprised of graphic entities and embedded code. The user places an image capture device, such as a camera pen, on or near a graphic entity of the user interface, and presses a button on the image capture device indicating selection of the graphic entity. In response to the button, an image is captured that corresponds to the graphic entity selected by the user. The image includes embedded code, which is analyzed to develop an image capture code corresponding to the captured image area. The image capture code is then mapped to a selection code corresponding to the graphic entity selected by the user. The user may then make other selections. The selection codes are processed for a particular syntax, and a computer operation is performed when a selection code, or combination of selection codes, is received which indicate that an operation is to be performed. In other embodiments, mapping of image capture codes to selection codes and syntax processing may be performed in accordance with a particular context.

54 Claims, 47 Drawing Sheets

OTHER PUBLICATIONS

Rekimoto, J., "A Multiple Device Approach for Supporting Whiteboard–based Interactions," CHI 98 Los Angeles, CA, Apr. 18–23, 1998, pp. 344–351.

Arai, T., et al., "PaperLink: A Technique for Hyperlinking from Real Paper to Electronic Content," CHI 97 Electronic Publications: Papers, Mar. 22–27, 1997, pp. 1–13.

Hecht, D., "Embedded Data Glyph Technology for Hardcopy Digital Documents," SPIE–The International Society for Optical Engineering, vol. 2171, San Jose, CA, Feb. 7–10, 1994, pp. 341–352.

Stifelman, L., "Augmenting Real–World Objects: A Paper–Based Audio Notebook," In the Proceedings of CHI '96 Conference Companion, ACM, pp. 199–200.

Johnson, W., et al., "Bridging the Paper and Electronic Worlds: The Paper User Interface," In Proceedings of INTERCHI.ACM, Apr. 1993; Xerox Palo Alto Research Center, Palo Alto, CA, 7 pages.

Wellner, P., "Digital Desk," Communications of the ACM, Jul. 1993, vol. 36, No. 7, pp. 87–96.

Dymetman, M. and Copperman, M., "Intelligent Paper," $7^{th}$ International Conference on Electronic Publishing, Mar. 30–Apr. 3, 1998, pp. 392–466.

The Anoto Pen—Technical Description (2 pages) as printed from the Internet, May 16, 2000.

The Anoto Pen—Technical Pattern (2 pages) as printed from the Internet, May 16, 2000.

The Anoto Pen—The Pen (2 pages) as printed from the Internet, May 16, 2000.

The Anoto Pen—The Infrastructure (2 pages) as printed from the Internet, May 16, 2000.

The Anoto Pen—White Paper (4 pages) as printed from the Internet, May 16, 2000.

"Anoto Technology Takes Pen and Paper into the Digital Age" as printed from the Internet, May 16, 2000.

* cited by examiner

```
X00 X01 X02 X03 X04 X05 X06 X07 X08 X09 X0A X0B X0C X0D X0E X0F X10
Y00 Y01 Y02 Y03 Y04 Y05 Y06 Y07 Y08 Y09 Y0A Y0B Y0C Y0D Y0E Y0F Y10
X00 X01 X02 X03 X04 X05 X06 X07 X08 X09 X0A X0B X0C X0D X0E X0F X10
YFF Y00 Y01 Y02 Y03 Y04 Y05 Y06 Y07 Y08 Y09 Y0A Y0B Y0C Y0D Y0E Y0F
X00 X01 X02 X03 X04 X05 X06 X07 X08 X09 X0A X0B X0C X0D X0E X0F X10
YFE YFF Y00 Y01 Y02 Y03 Y04 Y05 Y06 Y07 Y08 Y09 Y0A Y0B Y0C Y0D Y0E
X00 X01 X02 X03 X04 X05 X06 X07 X08 X09 X0A X0B X0C X0D X0E X0F X10
YFD YFE YFF Y00 Y01 Y02 Y03 Y04 Y05 Y06 Y07 Y08 Y09 Y0A Y0B Y0C Y0D
X00 X01 X02 X03 X04 X05 X06 X07 X08 X09 X0A X0B X0C X0D X0E X0F X10
YFC YFD YFE YFF Y00 Y01 Y02 Y03 Y04 Y05 Y06 Y07 Y08 Y09 Y0A Y0B Y0C
X00 X01 X02 X03 X04 X05 X06 X07 X08 X09 X0A X0B X0C X0D X0E X0F X10
YFB YFC YFD YFE YFF Y00 Y01 Y02 Y03 Y04 Y05 Y06 Y07 Y08 Y09 Y0A Y0B
X00 X01 X02 X03 X04 X05 X06 X07 X08 X09 X0A X0B X0C X0D X0E X0F X10
YFB YFB YFC YFD YFE YFF Y00 Y01 Y02 Y03 Y04 Y05 Y06 Y07 Y08 Y09 Y0A
X00 X01 X02 X03 X04 X05 X06 X07 X08 X09 X0A X0B X0C X0D X0E X0F X10
YFA YFB YFB YFC YFD YFE YFF Y00 Y01 Y02 Y03 Y04 Y05 Y06 Y07 Y08 Y09
X00 X01 X02 X03 X04 X05 X06 X07 X08 X09 X0A X0B X0C X0D X0E X0F X10
YF9 YFA YFB YFB YFC YFD YFE YFF Y00 Y01 Y02 Y03 Y04 Y05 Y06 Y07 Y08
X00 X01 X02 X03 X04 X05 X06 X07 X08 X09 X0A X0B X0C X0D X0E X0F X10
YF8 YF9 YFA YFB YFB YFC YFD YFE YFF Y00 Y01 Y02 Y03 Y04 Y05 Y06 Y07
X00 X01 X02 X03 X04 X05 X06 X07 X08 X09 X0A X0B X0C X0D X0E X0F X10
```

FIG. 2

```
Z00 Z01 Z02 Z03 Z04 Z05 Z06 Z07 Z08 Z09 Z0A Z0B Z0C Z0D Z0E Z0F Z10
Z00 Z01 Z02 Z03 Z04 Z05 Z06 Z07 Z08 Z09 Z0A Z0B Z0C Z0D Z0E Z0F Z10
Z00 Z01 Z02 Z03 Z04 Z05 Z06 Z07 Z08 Z09 Z0A Z0B Z0C Z0D Z0E Z0F Z10
ZFF Z00 Z01 Z02 Z03 Z04 Z05 Z06 Z07 Z08 Z09 Z0A Z0B Z0C Z0D Z0E Z0F
Z00 Z01 Z02 Z03 Z04 Z05 Z06 Z07 Z08 Z09 Z0A Z0B Z0C Z0D Z0E Z0F Z10
ZFE ZFF Z00 Z01 Z02 Z03 Z04 Z05 Z06 Z07 Z08 Z09 Z0A Z0B Z0C Z0D Z0E
Z00 Z01 Z02 Z03 Z04 Z05 Z06 Z07 Z08 Z09 Z0A Z0B Z0C Z0D Z0E Z0F Z10
ZFD ZFE ZFF Z00 Z01 Z02 Z03 Z04 Z05 Z06 Z07 Z08 Z09 Z0A Z0B Z0C Z0D
Z00 Z01 Z02 Z03 Z04 Z05 Z06 Z07 Z08 Z09 Z0A Z0B Z0C Z0D Z0E Z0F Z10
ZFC ZFD ZFE ZFF Z00 Z01 Z02 Z03 Z04 Z05 Z06 Z07 Z08 Z09 Z0A Z0B Z0C
Z00 Z01 Z02 Z03 Z04 Z05 Z06 Z07 Z08 Z09 Z0A Z0B Z0C Z0D Z0E Z0F Z10
ZFB ZFC ZFD ZFE ZFF Z00 Z01 Z02 Z03 Z04 Z05 Z06 Z07 Z08 Z09 Z0A Z0B
Z00 Z01 Z02 Z03 Z04 Z05 Z06 Z07 Z08 Z09 Z0A Z0B Z0C Z0D Z0E Z0F Z10
ZFB ZFB ZFC ZFD ZFE ZFF Z00 Z01 Z02 Z03 Z04 Z05 Z06 Z07 Z08 Z09 Z0A
Z00 Z01 Z02 Z03 Z04 Z05 Z06 Z07 Z08 Z09 Z0A Z0B Z0C Z0D Z0E Z0F Z10
ZFA ZFB ZFB ZFC ZFD ZFE ZFF Z00 Z01 Z02 Z03 Z04 Z05 Z06 Z07 Z08 Z09
Z00 Z01 Z02 Z03 Z04 Z05 Z06 Z07 Z08 Z09 Z0A Z0B Z0C Z0D Z0E Z0F Z10
ZF9 ZFA ZFB ZFB ZFC ZFD ZFE ZFF Z00 Z01 Z02 Z03 Z04 Z05 Z06 Z07 Z08
Z00 Z01 Z02 Z03 Z04 Z05 Z06 Z07 Z08 Z09 Z0A Z0B Z0C Z0D Z0E Z0F Z10
ZF8 ZF9 ZFA ZFB ZFB ZFC ZFD ZFE ZFF Z00 Z01 Z02 Z03 Z04 Z05 Z06 Z07
Z00 Z01 Z02 Z03 Z04 Z05 Z06 Z07 Z08 Z09 Z0A Z0B Z0C Z0D Z0E Z0F Z10
```

FIG. 3

```
X00 Y00 X01 Y01 X02 Y02 X03 Y03 X04 Y04 X05 Y05 X06 Y06 X07 Y07 X08 ...
X00 YFF X01 Y00 X02 Y01 X03 Y02 X04 Y03 X05 Y04 X06 Y05 X07 Y06 X08 ...
X00 YFE X01 YFF X02 Y00 X03 Y01 X04 Y02 X05 Y03 X06 Y04 X07 Y05 X08 ...
X00 YFD X01 YFE X02 YFF X03 Y00 X04 Y01 X05 Y02 X06 Y03 X07 Y04 X08 ...
... ... ... ... ... ... ... ... ... ... ... ... ... ... ... ... ...
... ... ... ... ... ... ... ... ... ... ... ... ... ... ... ... ...
```

FIG. 4

```
X00 Y00 X01 Y01 X02 Y02 X03 Y03 X04 Y04 X05 Y05 X06 Y06 X07 Y07 X08 ...
D   D   D   D   D   D   D   D   D   D   D   D   D   D   D   D   ...
D   D   D   D   D   D   D   D   D   D   D   D   D   D   D   D   ...
D   D   D   D   D   D   D   D   D   D   D   D   D   D   D   D   ...
D   D   D   D   D   D   D   D   D   D   D   D   D   D   D   D   ...
X00 YFF X01 Y00 X02 Y01 X03 Y02 X04 Y03 X05 Y04 X06 Y05 X07 Y06 X08 ...
D   D   D   D   D   D   D   D   D   D   D   D   D   D   D   D   ...
D   D   D   D   D   D   D   D   D   D   D   D   D   D   D   D   ...
D   D   D   D   D   D   D   D   D   D   D   D   D   D   D   D   ...
D   D   D   D   D   D   D   D   D   D   D   D   D   D   D   D   ...
X00 YFE X01 YFF X02 Y00 X03 Y01 X04 Y02 X05 Y03 X06 Y04 X07 Y05 X08 ...
D   D   D   D   D   D   D   D   D   D   D   D   D   D   D   D   ...
D   D   D   D   D   D   D   D   D   D   D   D   D   D   D   D   ...
D   D   D   D   D   D   D   D   D   D   D   D   D   D   D   D   ...
D   D   D   D   D   D   D   D   D   D   D   D   D   D   D   D   ...
X00 YFD X01 YFE X02 YFF X03 Y00 X04 Y01 X05 Y02 X06 Y03 X07 Y04 X08 ...
... ... ... ... ... ... ... ... ... ... ... ... ... ... ... ... ...
... ... ... ... ... ... ... ... ... ... ... ... ... ... ... ... ...
```

FIG. 5

| Z00 | Z01 | Z02 | Z03 | Z04 | Z05 | Z06 | Z07 | Z08 | Z09 | Z0A | Z0B | Z0C | Z0D | Z0E | Z0F | Z10 |
|---|---|---|---|---|---|---|---|---|---|---|---|---|---|---|---|---|
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFF | Z00 | Z01 | Z02 | Z03 | Z04 | Z05 | Z06 | Z07 | Z08 | Z09 | Z0A | Z0B | Z0C | Z0D | Z0E | Z0F |
| ZFD | ZFE | ZFF | Z00 | Z01 | Z02 | Z03 | Z04 | Z05 | Z06 | Z07 | Z08 | Z09 | Z0A | Z0B | Z0C | Z0D |
| ZFB | ZFB | ZFC | ZFD | ZFE | ZFF | Z00 | Z01 | Z02 | Z03 | Z04 | Z05 | Z06 | Z07 | Z08 | Z09 | Z0A |
| ZF7 | ZF8 | ZF9 | ZFA | ZFB | ZFB | ZFC | ZFD | ZFE | ZFF | Z00 | Z01 | Z02 | Z03 | Z04 | Z05 | Z06 |
| ZF2 | ZF3 | ZF4 | ZF5 | ZF6 | ZF7 | ZF8 | ZF9 | ZFA | ZFB | ZFC | ZFD | ZFE | ZFF | Z00 | Z01 | Z02 |
| ZEC | ZED | ZEE | ZEF | ZF0 | ZF1 | ZF2 | ZF3 | ZF4 | ZF5 | ZF6 | ZF7 | ZF8 | ZF9 | ZFA | ZFB |

| ⋱ | ⋮ | ⋮ | ⋮ | ⋮ | ⋰ |
|---|---|---|---|---|---|
| ... | $X_n$ | $X_{n+1}$ | $X_{n+2}$ | $X_{n+3}$ | ... |
| | $Y_{m+3+p}$ | $Y_{m+2+p}$ | $Y_{m+1+p}$ | $Y_{m+p}$ | |
| ... | $I_r$ | $I_{r+1}$ | $I_{r+2}$ | $I_{r+2}$ | ... |
| | $I_{s+2}$ | $I_{s+1}$ | $I_s$ | $I_s$ | |
| ... | $X_{n+2p}$ | $X_{n+1+2p}$ | $X_{n+2+2p}$ | $X_{n+3+2p}$ | ... |
| | $Y_{m+3+3p}$ | $Y_{m+2+3p}$ | $Y_{m+1+3p}$ | $Y_{m+3p}$ | |
| ⋰ | ⋮ | ⋮ | ⋮ | ⋮ | ⋱ |

| B10 | B9 | B8 | B7 | B6 | B5 | B4 | B3 | B2 | B1 | B15 | B14 | B13 | B12 | B11 | B10 | B9 | B8 | B7 | B6 | B5 | B4 | B3 | B2 | B1 |
|---|---|---|---|---|---|---|---|---|---|---|---|---|---|---|---|---|---|---|---|---|---|---|---|---|
| A5 | B9 | A7 | A8 | A9 | A10 | A11 | A12 | A13 | A14 | A15 | A1 | A2 | A3 | A4 | A5 | A6 | A7 | A8 | A9 | A10 | A11 | A12 | A13 | A14 |
| B12 | B11 | B10 | B9 | B8 | B7 | B6 | B5 | B4 | B3 | B2 | B1 | B15 | B14 | B13 | B12 | B11 | B10 | B9 | B8 | B7 | B6 | B5 | B4 | B3 |
| A7 | A8 | A9 | A10 | A11 | A12 | A13 | A14 | A15 | A1 | A2 | A3 | A4 | A5 | A6 | A7 | A8 | A9 | A10 | A11 | A12 | A13 | A14 | A15 | A1 |
| B14 | B13 | B12 | B11 | B10 | B9 | B8 | B7 | B6 | B5 | B4 | B3 | B2 | B1 | B15 | B14 | B13 | B12 | B11 | B10 | B9 | B8 | B7 | B6 | B5 |
| A9 | A10 | A11 | A12 | A13 | A14 | A15 | A1 | A2 | A3 | A4 | A5 | A6 | A7 | A8 | A9 | A10 | A11 | A12 | A13 | A14 | A15 | A1 | A2 | A3 |
| B1 | B15 | B14 | B13 | B12 | B11 | B10 | B9 | B8 | B7 | B6 | B5 | B4 | B3 | B2 | B1 | B15 | B14 | B13 | B12 | B11 | B10 | B9 | B8 | B7 |
| A11 | A12 | A13 | A14 | A15 | A1 | A2 | A3 | A4 | A5 | A6 | A7 | A8 | A9 | A10 | A11 | A12 | A13 | A14 | A15 | A1 | A2 | A3 | A4 | A5 |
| B3 | B2 | B1 | B15 | B14 | B13 | B12 | B11 | B10 | B9 | B8 | B7 | B6 | B5 | B4 | B3 | B2 | B1 | B15 | B14 | B13 | B12 | B11 | B10 | B9 |
| A13 | A14 | A15 | A1 | A2 | A3 | A4 | A5 | A6 | A7 | A8 | A9 | A10 | A11 | A12 | A13 | A14 | A15 | A1 | A2 | A3 | A4 | A5 | A6 | A7 |
| B5 | B4 | B3 | B2 | B1 | B15 | B14 | B13 | B12 | B11 | B10 | B9 | B8 | B7 | B6 | B5 | B4 | B3 | B2 | B1 | B15 | B14 | B13 | B12 | B11 |
| A15 | A1 | A2 | A3 | A4 | A5 | A6 | A7 | A8 | A9 | A10 | A11 | A12 | A13 | A14 | A15 | A1 | A2 | A3 | A4 | A5 | A6 | A7 | A8 | A9 |
| B7 | B6 | B5 | B4 | B3 | B2 | B1 | B15 | B14 | B13 | B12 | B11 | B10 | B9 | B8 | B7 | B6 | B5 | B4 | B3 | B2 | B1 | B15 | B14 | B13 |
| A2 | A3 | A4 | A5 | A6 | A7 | A8 | A9 | A10 | A11 | A12 | A13 | A14 | A15 | A1 | A2 | A3 | A4 | A5 | A6 | A7 | A8 | A9 | A10 | A11 |

| | | | | | | | | | | | | | |
|---|---|---|---|---|---|---|---|---|---|---|---|---|---|
|B|B|B|B|B|B|B|B|B|B|B|B|B|B|
|B|X|X|X|E|E|0|0|E|E|X|X|X|B|
|B|X|X|E|1|0|1|1|0|0|1|E|X|B|
|B|X|E|1|0|0|1|1|1|1|0|E|X|B|
|B|E|0|1|(0)|0|1|0|1|1|0|0|E|B|
|B|E|0|0|1|1|1|1|0|[1]|1|0|0|B|
|B|0|0|0|0|1|(0)|0|1|0|1|1|0|B|
|B|0|1|1|1|1|0|[1]|1|0|0|0|1|B|
|B|E|1|0|0|0|0|1|(0)|0|1|0|1|B|
|B|E|1|1|0|[1]|1|0|0|0|1|1|E|B|
|B|X|1|0|1|0|0|0|0|1|(0)|E|X|B|
|B|X|E|[1]|1|0|0|0|1|1|1|E|X|B|
|B|X|X|X|E|0|1|0|0|E|E|X|X|B|
|B|B|B|B|B|B|B|B|B|B|B|B|B|B|

*FIG. 23*

FIG. 26
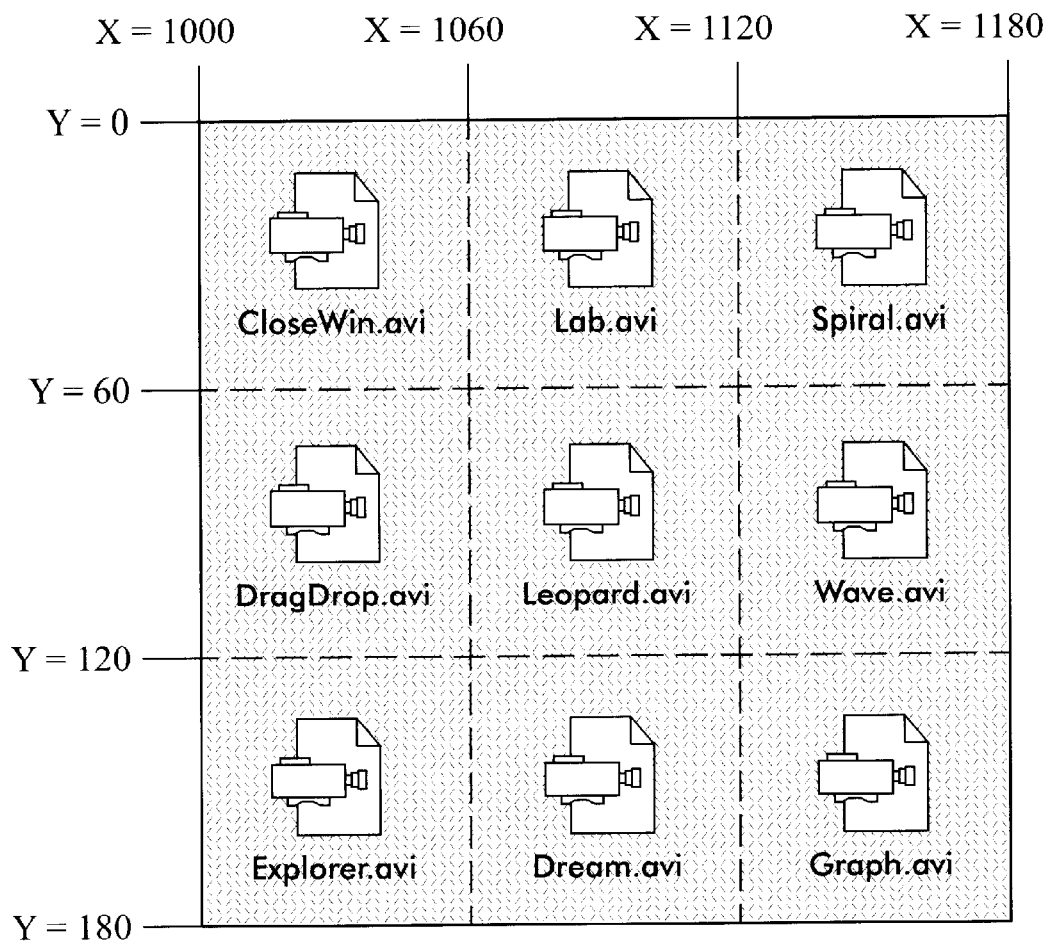
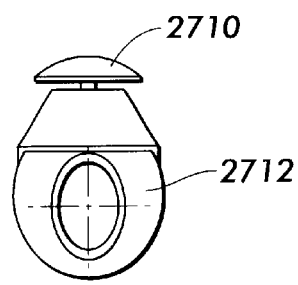
FIG. 27A

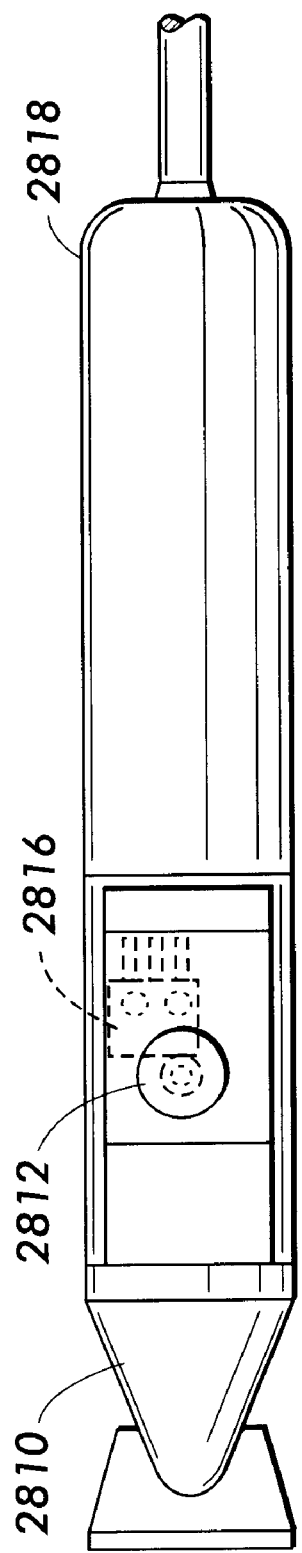

MULTI-LEVEL SELECTION METHODS AND APPARATUS USING CONTEXT IDENTIFICATION FOR EMBEDDED DATA GRAPHICAL USER INTERFACES

CROSS-REFERENCES TO RELATED APPLICATIONS

This application is a continuation-in-part of U.S. patent application Ser. No. 09/144,518, filed on Aug. 31, 1998, now U.S. Pat. No. 6,208,771, issued Mar. 27, 2001 entitled METHODS AND APPARATUS FOR ROBUST DECODING OF GLYPH ADDRESS CARPETS, U.S. patent application Ser. No. 09/144,250, filed on Aug. 31, 1998, now U.S. Pat. No. 6,310,988 issued Oct. 30, 2001 entitled METHODS AND APPARATUS FOR CAMERA PEN, and U.S. patent application Ser. No. 09/144,251, filed on Aug. 31, 1998, now U.S. Pat. No. 6,327,395 issued Dec. 4, 2001 entitled GLYPH ADDRESS CARPET METHODS AND APPARATUS FOR PROVIDING LOCATION INFORMATION IN A MULTI-DIMENSIONAL ADDRESS SPACE, each of which is a continuation-in-part of U.S. application Ser. No. 08/772,158 filed Dec. 12, 1996, now U.S. Pat. No. 5,937,110 issued Aug. 10, 1999.

BACKGROUND OF THE INVENTION

This invention relates to user interfaces for computer systems and, more particularly, to image capture user interfaces for such computer systems.

Conventional user interfaces allow users to selectively initiate computer system operations. A computer coordinates an electronic display and a user input device, such as a keyboard. Command line interfaces, for example, require users to type in commands directing the computer to perform a particular operation. Graphical user interfaces relieve users of the burden of typing commands by allowing a graphical selection of computer system entities and computer system operations. For example, when the user uses a mouse to select a file icon on a screen, the computer accesses the file associated with the icon. Graphical user interfaces are particularly advantageous because they are intuitive and therefore easy to use.

Heretofore, conventional graphical user interfaces were configured to permit electronic (X, Y) addressing of graphic elements displayed on a computer I/O device, such as a screen of a computer monitor. The address space accessible at any given time is constrained by the display space. Larger address spaces can be implemented within the constraints of the display, but this requires the user to navigate sequentially through the larger space within the dimensions of the display.

A conventional graphical user interface is also constrained by the requirement that a computer system must coordinate electrical signals from user input devices with the user interface graphics on the display. This limits flexibility because the computer must produce the user interface on the display, and coordinate input received from the input devices.

What is needed, then, is a computer interface that is not constrained by the typical dimensions of an electronic display, and does not require electronic coordination between the display device and the user input device.

SUMMARY OF THE INVENTION

Apparatus and methods consistent with the principles of the invention provide a user interface that utilizes multi-level image capture and context identification. An apparatus consistent with the invention, for use with a user interface having sensory indicia and embedded data code, and an image capture device for selecting a portion of the user interface and sending image information corresponding to the portion, comprises an image processor for decoding first image information into a first image capture code, a resolver for mapping the first image capture code into a first selection code, and a syntax processor for analyzing the first selection code with a second selection code.

A method consistent with the invention, for use with a user interface having sensory indicia and embedded data code, and an image capture device for selecting a portion of the user interface and sending image information corresponding to the portion, comprises decoding first image information into a first image capture code, mapping the first image capture code into a first selection code and analyzing the first selection code with a second selection code.

A graphical user interface consistent with the principles of the invention, for use with a user interface system including a device for capturing a portion of the graphical user interface in response to selection of sensory indicia, and a computer system responsive to embedded code in the portion for performing an operation related to the sensory indicia and a first selection code, comprises sensory indicia, and embedded data codes having a predetermined spatial relationship to the sensory indicia. Other embodiments may also provide methods and apparatus consistent with the invention that are implemented in systems having an image capture device and a computer for processing embedded code.

Human sensory information, such as textual, graphical or mixed textual and graphical representations of the computer system entities and operations may be selected using this user interface. The sensory information is spatially registered in superimposed or juxtaposed relationship with respective spatial addresses in the embedded data address space. These spatial addresses, in turn, are registered in a lookup table or similar mechanism with computer recognizable descriptions of the respective computer system operations or entities.

BRIEF DESCRIPTION OF THE DRAWINGS

Still further objects of this invention will become apparent when the following detailed description is read in conjunction with the attached drawings, in which:

FIGS. 2–8 schematically illustrates two dimensional image domain address spaces that are constructed by embedding address information in self-clocking glyph code patterns or the like in accordance with this invention;

FIG. 14 illustrates a distributed code label for identifying a specific code in an N-dimensional parameterized code pattern;

FIG. 21 illustrates address codes encoded in the glyph address carpet 1732;

FIG. 23 illustrates a binary data matrix 2310 formed from a glyph lattice captured by camera pen 1710;

FIG. 26 illustrates an embodiment showing address carpet 1612 divided into areas that encompass respective sets of addresses corresponding to respective computer system entities;

FIGS. 27(a), 27(b), and 27(c) show front, side and top views, respectively, of one embodiment of glyph pen 1710 of FIG. 17;

FIGS. 28(a) and 28(b) show side and top views, respectively, of another embodiment of glyph pen 1710 of FIG. 17;

DETAILED DESCRIPTION OF THE INVENTION

While the invention is described in some detail hereinbelow with reference to certain illustrated embodiments, it is to be understood that it is not limited to those embodiments. On the contrary, the intent is to cover all modifications, alternative, and equivalents falling within the spirit and scope of the invention as defined by the appended claims.

A. Self Clocking Glyph Codes

Figure 1:
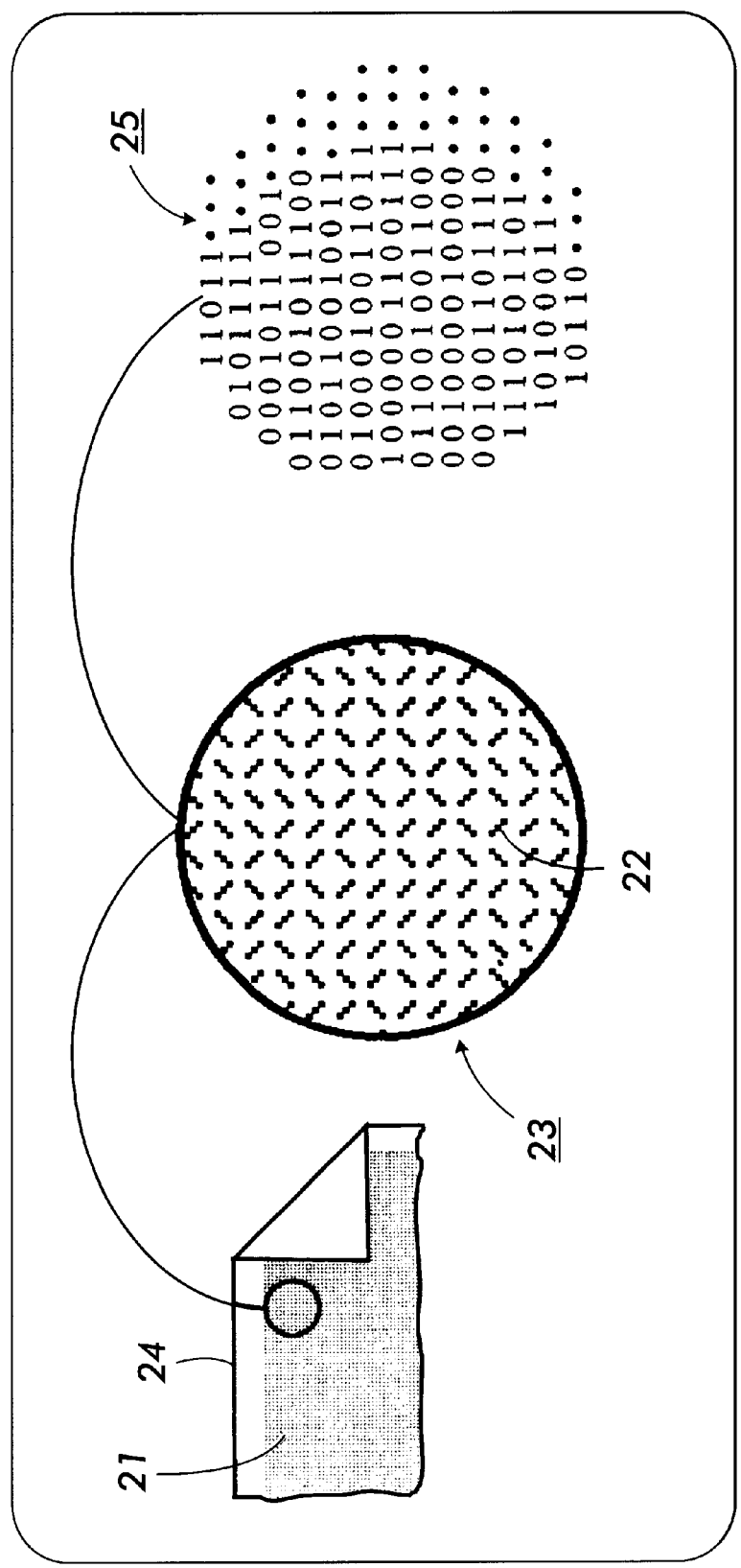
FIG. 1 illustrates a self-clocking glyph code pattern and a portion of its binary interpretation.

Turning now to the drawings, and at this point especially to FIG. 1, there is a more or less conventional self-clocking glyph code pattern 21 which is composed of elongated slash-like it marks or "glyphs" 22 and 23 that are written on a generally regular rectangular lattice of centers on a suitable recording medium 24. Suitably, the glyphs 22 and 23 are printed by a printer (not shown) operating at 300 d.p.i.–600 d.p.i. to write 4 pixel×4 pixel–7 pixel×7 pixel representations of the glyphs 22 and 23 on regularly spaced centers that are distributed widthwise and lengthwise of the recording medium 24 to produce the rectangular code pattern 21. The glyphs of these fine grain glyph code patterns are not easily resolved by the unaided human eye when the code patterns are viewed under standard lighting conditions and at normal reading distances, so the code pattern 21 typically has a generally uniform gray scale appearance. Nevertheless, the glyph code is still capable of effectively communicating machine readable digital information. To carry out this function, the glyphs 22 and 23 usually are titled to the left and right, at about +45° and −45° with respect to the longitudinal dimension of the recording medium 24 to encode binary "1's" and "0's", respectively, as shown at 25.

B. The Relative Phase of Parallel Propagating Embedded Maximal Length Bit Sequences as a Spatial Address Parameter FIGS. 2–8 diagramatically illustrate image domain address spaces which are constructed by embedding multiple instances of one (FIGS. 3 and 6) or two (FIGS. 2, 4, 5, 7 and 9) maximal length bit sequences ("Z" in FIGS. 3 and 6, "X" and "Y" in FIGS. 2, 4 and 5, and "U" and "V" in FIGS. 7 and 8) in a self-clocking glyph code pattern 21 (FIG. 1). These maximal bit length sequences are encoded by the glyphs on parallel lines of the glyph code pattern to propagate in a predetermined direction, such as a left-to-right direction, from one side of the address space to the other. However, the relative phase, $f_R$, of the bit sequences (or at least certain of the bit sequences—see FIG. 4) that are encoded on neighboring ones of these lines incrementally vanes as a function of the transverse positioning of those lines in the address space (i.e., as a function of the position of those lines in the address space (i.e., as a function of the position of the respective lines relative to the Y-axis of the address space). The phase shift corresponds to translating the code parallel to its linear direction by an integer number of bits.

In the address spaces shown in FIGS. 2, 3, and 5–8, the maximal length bit sequence encoded on all of the odd numbered lines are phase aligned. However, the sequences encoded on the other odd numbered lines are phased shifted to the right, in successive one bit position increments, so the transverse positioning of any given even numbered line in these address spaces is given by:

$$Y = 2\phi_R + 1 \quad (1)$$

Where: $f_R$=the phase of the sequence encoded on the given even numbered line relative to the phase of the sequence encoded a neighboring odded numbered line Equation (1) can, of course, be restated for any constant incremental phase shift, Df, as follows:

$$Y = \frac{2\phi_R + \Delta\phi_R}{\Delta\phi_R} \quad (2)$$

Furthermore, it follows from equation (1) that the relative transverse position of the sequence encoded on the immediately preceding odd numbered line is given by:

$$Y = 2\phi_R \quad (3)$$

While the transverse positioning of the sequence encoded on the immediately following odd numbered line is given by:

$$Y = 2(\phi_R + 1) \quad (4)$$

The phase differences $f_R$ between the odd and even numbered lines can be computed in either order, provided that a consistent order is employed.

The best practice for identifying the location of a given glyph with respect to the transverse or Y-axis of such an address space is to capture a sufficiently large area of the address space to determine the phase of the sequence that is encoded on the line containing the given glyph relative to the phases of the sequences encoded on the next preceding and next following lines of the address space. The two-way relative phase analysis that is enabled by this three sequence phase determination effectively discriminates between odd and even numbered lines in the address space, even if one or more of the sequences has "rolled over" in the address space. As will be appreciated, the principal implication of this two-way relative phase analysis technique is that it requires that capture of a sufficiently large number of the bit encodings from each of the three sequences to phase lock on to each of those sequences. Typically, pattern matching (or sliding window correlation) process is employed to find the phase locked state in a maximal length bit sequence. For cases where the width, W, of the address space equals the length, L, of the maximal bit length sequence in question, this correlation process requires a capture of at least N bits sequence, where N is the unique subsequence bit length of the maximal bit length sequence to establish phase lock (preferably, the correlation process given approximately 2N bits or more to establish phase lock with a desirable higher degree of confidence in its correctness). Note the maximal PN sequence ordinal position can be correlated normally even in the neighborhood of rollover at the end of the code (the code is cyclic). If a truncated PN sequence or the like is used, a somewhat larger typical capture region (no more than twice the extent along the linear code direction) would be needed to assure ambiguous address determination. If any one of a family of sequences may be used, more glyphs in the sequence may be needed to distinguish allowed sequences.

Figure 7:
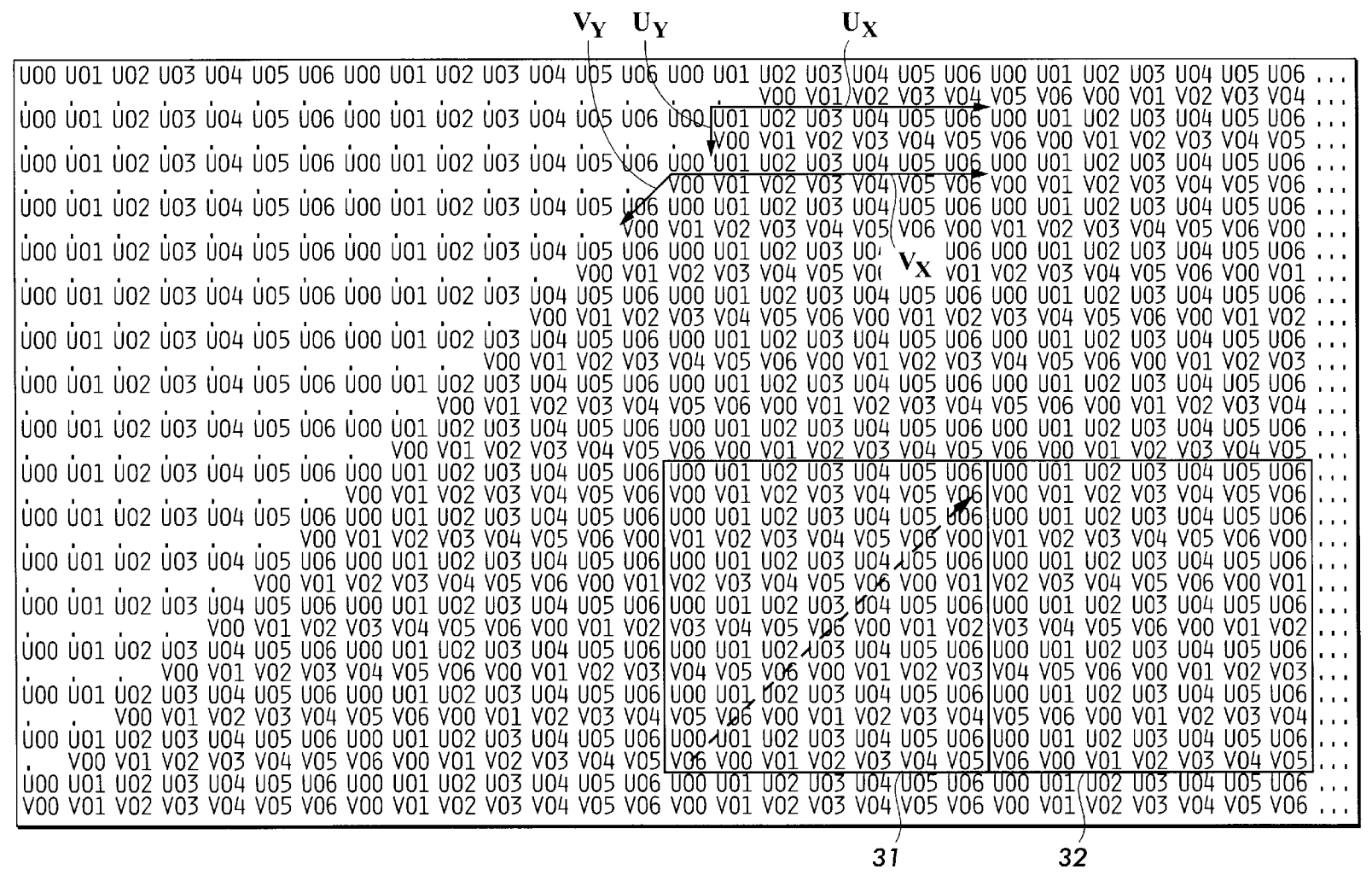

As shown in dashed lines in FIG. 7, phase roll over can be avoided by reducing the effective address space by a factor of two, so that all phase shifts are in the same absolute direction (i.e., same sign sense). That, in turn, permits a one-way relative phase analysis to be used for determining the relative transverse positions (i.e., the positioning relative to the Y-axis) of the lines of such an address space glyphs on the odd and even numbered lines encode different maximal bit length sequences (such as at "X" and "Y" in FIGS. 2, and U and V in FIGS. 7 and 8) because the sequences themselves can then be used to distinguish between the odd and even numbered lines.

However, it is believed that the relative phase difference, $f_R$, between the maximal length bit sequences propagating on any two neighboring lines of the address space can be determined from the difference between the sequence index numbers, i and j, of the bits of those respective sequences that are encoded by any transversely aligned glyphs on those respective lines. More particularly, it is believed phase difference $f_R$ can be determined from the difference, if any, of the sequence index numbers by (1) summing the index difference (i–j) with (2) the smallest integer multiple of the width, W, of the address space width which (3) yields a positive integer multiple that is (4) evenly divisible by the relative incremental phase shift of the respective sequences; (5) by dividing the positive integer that is found at step 3 to satisfy the condition specified by step 4; and by then (6) evaluating the quotient resulting from step 5 module the width, W (in glyphs), of the address space. While this formulation has not been fully tested for all cases, its effectivity has been confirmed with substantial rigor for the address space shown in FIG. 8 (i.e., where the maximal bit length sequences on the odd and even numbered lines are incrementally phase shifted; each by one bit sequence index position, but in opposite directions to provide a relative incremental phase shift of two bit positions. Further, its effectivity has been less rigorously confirmed for the address spaces of the type shown in FIG. 2 (i.e., incremental relative phase shift of just one bit index position.

As will be appreciated, the bit sequence indices of the unshifted maximal length bit sequences suitably are employed to identify the spatial location of the glyphs that encode those sequences with respect to the X-axis of the address space. Thus, once the spatial positions of the lines on which those sequences are encoded are located relative to the Y-axis of the address space, there is a unique x/y coordinate pair for identifying the spatial location of each of those glyphs in the address space. A similar process is employed to determine the x/y coordinate pairs for the glyphs that encode the phase shifted maximal length bit sequences, except the bit sequence indices of those sequences are normalized to account for the accumulated phase shift and roll over of those sequences prior to computing the positions of the glyphs that encode those sequences relative to the X-axis of the address space.

Focusing for a moment on FIG. 4, it will be seen that glyph encodings of maximal length bit sequences which define the X and Y coordinates of the address space may be interleaved on each of a set of parallel lines of the glyph code pattern. As illustrated, the phase of the "Y" sequence is incrementally shifted to the right on each line of the code pattern, so the relative phases of the interleaved "X" and "Y" sequences that are encoded on the respective lines of the code pattern may be employed, as previously described, to determine the locations of the respective lines of the code pattern relative to the Y-axis of the address space. Furthermore, the process that is described above may be employed to locate the individual glyphs of the code pattern relative to the X-axis of the address space.

Referring to FIG. 5, it will be understood that an interleaved construction of the address space is particularly beneficial for applications in which data encodings, D, or the like are transversely interlaced with the spatial addressing information. For these applications, the addressing information is cyclically encoded at a predetermined fractional duty cycle ratio, such as 1/5 as shown, so an appropriately phased scaling factor is used to compute the location of the encodings of the address information relative to the Y-axis of the address space. Once these locations have been determined, the locations of the data encodings relative to the Y-axis of the address space can also be identified by using the self-clocking properties of the glyph code.

While incremental linear phase shifts of the maximal bit length sequences that define the address space are typically employed to parameterize the address space relative to one axis, such as the Y-axis as described above, incremental arithmetic phase shifts of various type can be employed for that purpose. For example, as shown in FIG. 6, a cumulative arithmetic function is used to cause the relative phase difference between the maximal bit length sequences that are encoded on neighboring lines of the code to directly parameterize the position of one of those lines (i.e., the lower line) relative to the Y-axis of the address space.

Figure 8:
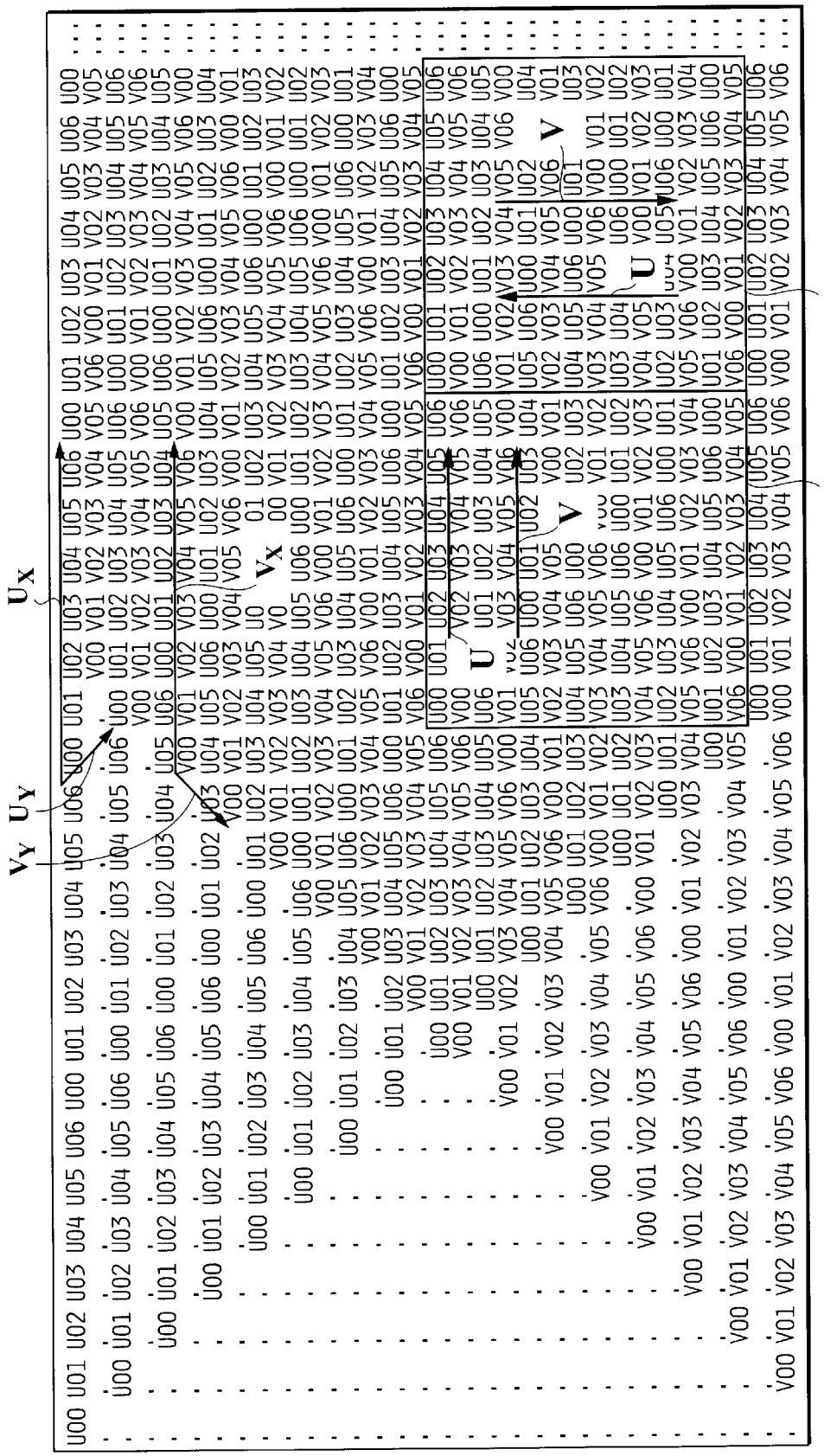

Turning now to FIGS. 7 and 8, it will be seen that address spaces that are parameterized relative to one axis by linear incremental phase shifts advantageously are constructed by tiling the maximal length bit sequence or sequences into the glyph code pattern on tiling vectors that map the bit sequences into the code pattern with the desired relative phase shifts. For example, as shown in FIG. 7, the "U" and "V" maximal length bit sequences are tiled into the glyph code pattern on tiling vectors $U_x$, $U_y$ and $V_x$, $V_y$ respectively, which interlace those sequences on alternate parallel lines of the code pattern, while incrementally shifting the "V" sequence one bit index position to the right on every other line of the code pattern. This, of course, creates an u address space 31 of the type that is shown in FIG. 2. Indeed, the tiled construction of the address space 31 distributively replicates that space at other locations in the glyph code pattern, such as at 32, thereby providing a distributed redundancy in code patterns that are sufficiently large to encode these multiple instances 31 and 32 of the address space. Note, all of the address codes may be tiling; the ones having fixed line-to-line shifts for each code are "periodic" tilings.

FIG. 8 illustrates a tiled construction where the "U" and "V" maximal length bit sequences are tiled into the glyph code pattern on tiling vectors $U_x$, $U_y$ and $V_x$, $V_y$ respectively, which also interleave those sequences on alternate parallel lines of the code pattern. However, unlike the "mono shear" tiled case shown in FIG. 7, in this embodiment, the tiling vectors produce a "dual shear" tiling of the sequences U and V, such those sequences are incrementally phase shifted one sequence index position to the left and right, respectively, on every other line of the code pattern. This tiling creates address spaces 41 and 42 which contain precisely the same members, but the members of those address spaces 41 and 42 differ in both their spatial and logical organization, so the organization that best fits a given application can be used.

Figure 9:
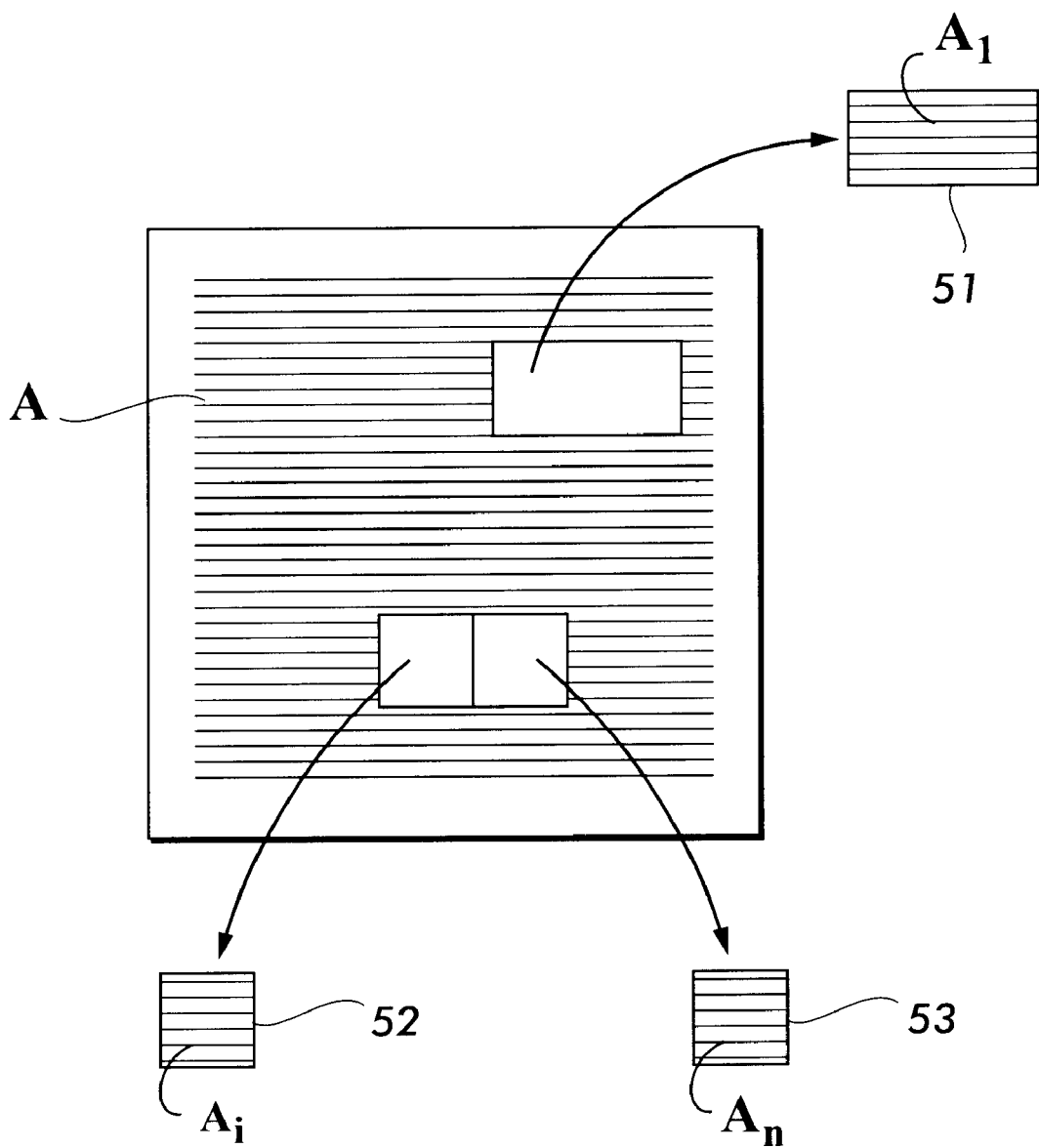
FIG. 9 illustrates a fragmentation of an address space of the type shown in FIGS. 2–8.

Turning now to FIG. 9, it will be evident that contiguous and/or non-contiguous non-overlapping fragments $A_1 \ldots A_n$ of an address space A of the above described type may be written on different substrates 51–53. Each of these fragments $A_1 \ldots A_n$ must contain a sufficiently large sample of the maximal length bit sequences that parameterize the address space A in the image domain to permit the x/y coordinate pairs for the glyphs they contain to be computed as described above, but they otherwise can be sized as required to best satisfy the needs of a given application. The fragments $A_1 \ldots A_n$ need not define a complete cover of the address space, but one of the more attractive applications of this feature is to print out contiguous fragments of a large address space A on multiple substrates so that these printed fragments provide an essentially complete cover of the address space A.

Figure 10:
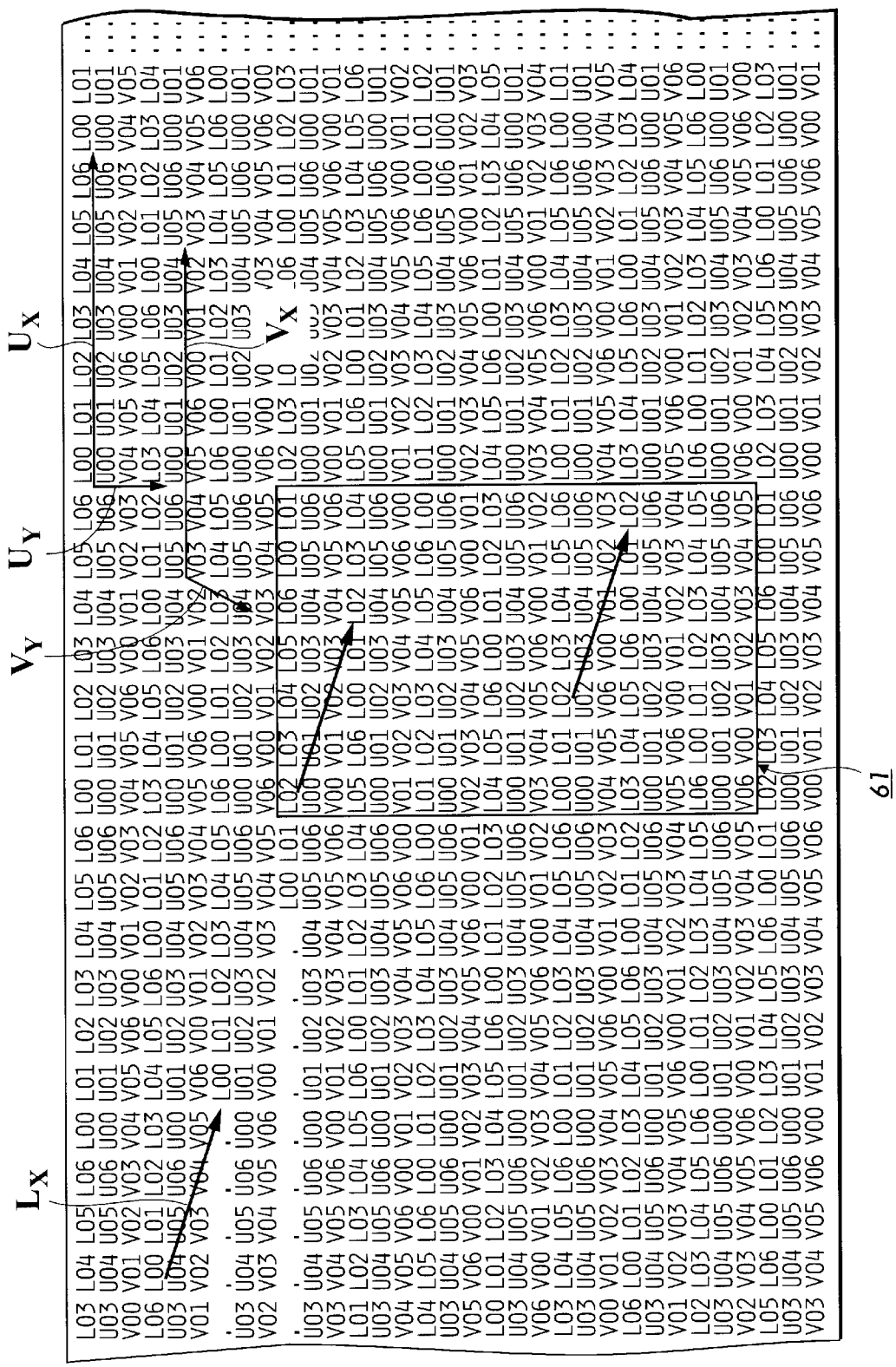
FIGS. 10 and 11 illustrate distributed labeling of address spaces of the type shown in FIGS. 2–8.

C. The Relative Phase of an Interlaced Parallel Propagating Maximal Length Bit Sequences as a Labeling Parameter for Spatial Address Spaces Referring to FIG. 10, the functionality of address spaces of the foregoing type can be extended by cyclically interlacing (or interleaving) encodings of another parallel propagating maximal length bit sequence L with the encodings of the sequence or sequences, such as U and V, which parameterize the address space 61 with respect to its x/y coordinates. This additional bit sequence L further parameterizes the address space 61 by embedding a machine readable distributed label in it. As shown in FIG. 10, this label is a numeric value which is determined by the incremental phase shift between successive encodings of the sequence L. This phase shift may, of course, be adjusted to selectively embed any one of a plurality of different labels in the address space 61. A look-up table or the like (not shown) can be employed to interpret the embedded label based on its numeric value. In this embodiment, the distributed label L is independently interpretable.

Figures 11, 12:
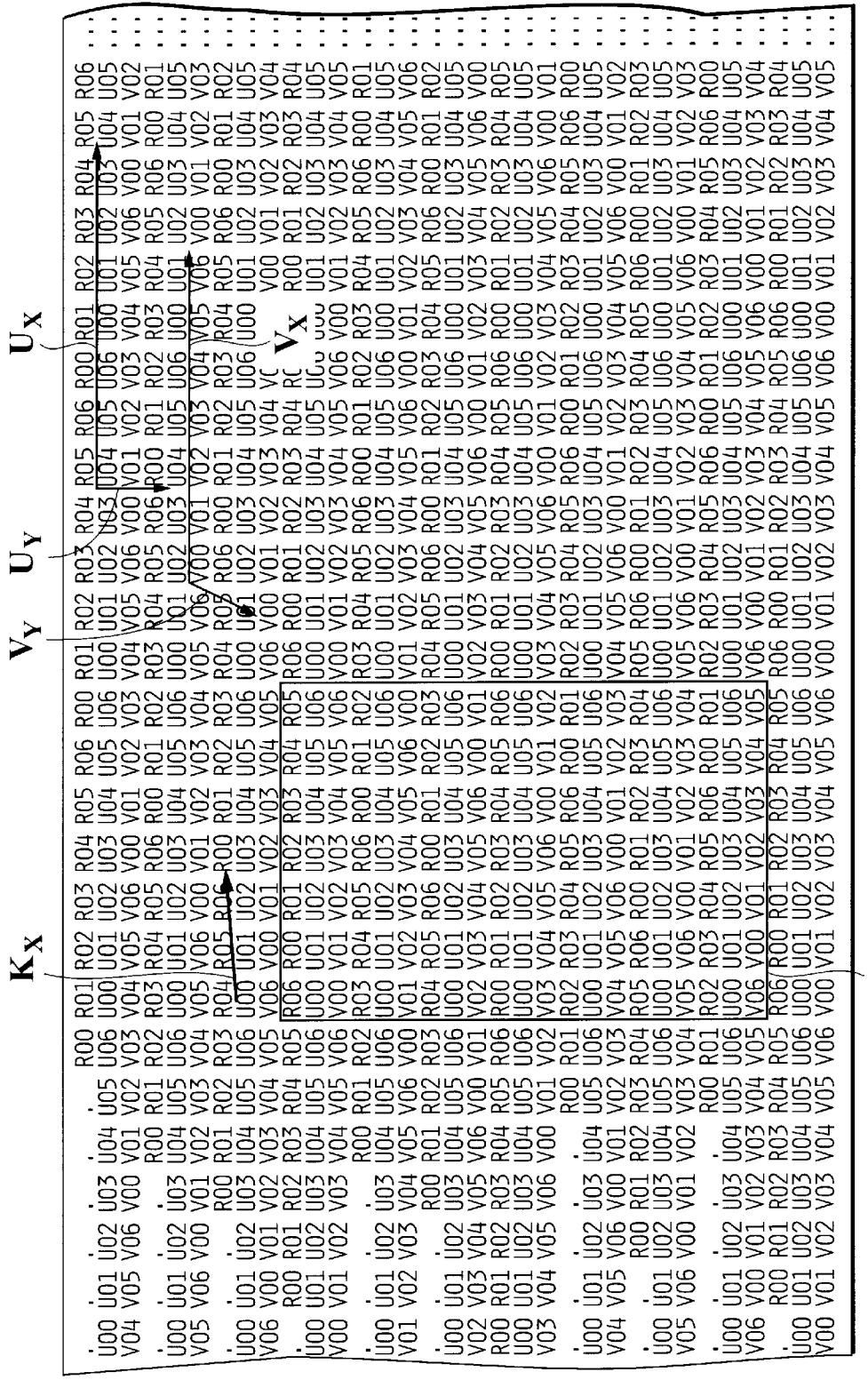
FIG. 12 illustrates an example of labeled address spaces of the type shown in FIGS. 10 and 11.

However, as shown in FIGS. 11 and 12, a distributed labeling that requires a computationally less intensive read out of the address space is provided if the encodings of the labeling sequence, r, is referenced to the encodings of one or another of the address defining sequence U or V. This relatively minor change avoids the correlation processing which the embodiment of FIG. 10 requires to latch on to the phase of the reference copy of the labeling sequence.

Figure 13:
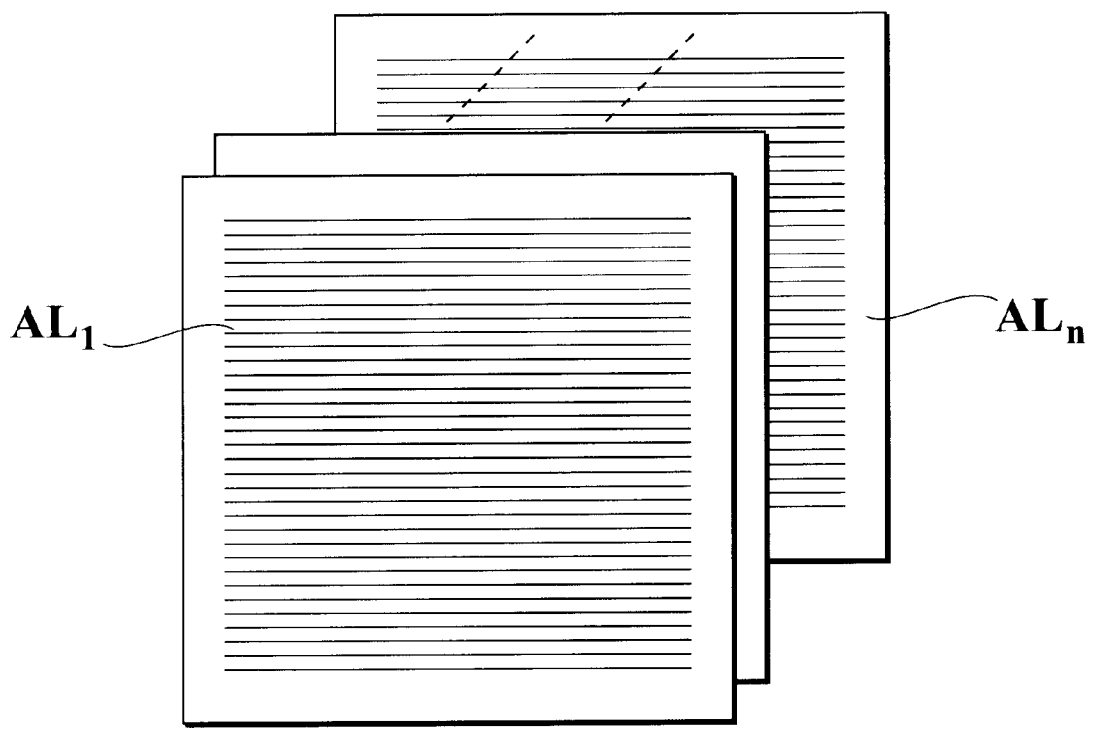
FIG. 13 illustrates, in fragmentary form, code labeling for image domain address space.

Turning to FIG. 13, one of the advantages of including a distributed labeling parameter in address spaces of the foregoing type is that the labeling provides a hierarchical mechanism for distinguishing between address spaces that include otherwise identical address parameters. This hierarchical labeling mechanism may be used, for example, to classify the address spaces $AL_1 \ldots AL_n$ for various purposes or to index the address spaces $AL_1 \ldots AL_n$ into a hierarchically organized look-up table or the like.

D. Further Characterizing N Dimensionally Parameterized Code Pattern By Selection of Parameterizing Code Sequences It is desirable for some applications to select the maximal length bit sequences that parameterize the glyph code pattern in two dimensions from a family of candidates so that the selection of one or both of those sequences effectively parameterizes (i.e., "labels") the glyph code pattern in accordance with still another metric. However, the computational cost of testing all, or even a significant subset of the maximal bit length sequences that might be candidates for such a selection is likely to be prohibitive.

Thus, as shown in FIG. 13, to reduce the computation cost of implementing this type of address space labeling (or "characterization"), encodings of a prespecified maximal length bit sequence I are interleaved (typically at a 50% duty ratio) with the encodings of the address space parameterizing maximal length bit sequences, X and Y. Accordingly, one or both of the parameterizing sequences X and Y may be selected from a family of potentially suitable sequences to further characterize the address space in accordance with any desired metric. This freedom to select does not significantly reduce the computation cost of interpreting the address space because the relative phase difference between the transversely neighboring instances of the t prespecified (i.e., "known") sequence is set to uniquely identify the sequences X and Y that have been selected to parameterize the glyph code pattern in address space.

In the embodiment shown in FIG. 14, neighboring instances of the known sequence I, as well as neighboring instances of the X and Y sequences, are counterpropagating. It, therefore, should be understood that counterpropagating sequences need not be used since the relative phasing of these sequences can be determined as described hereinabove when they propagate in the same direction.

E. Uniquely Identifying Physical Objects in Parameterized Address Space

Figure 15:
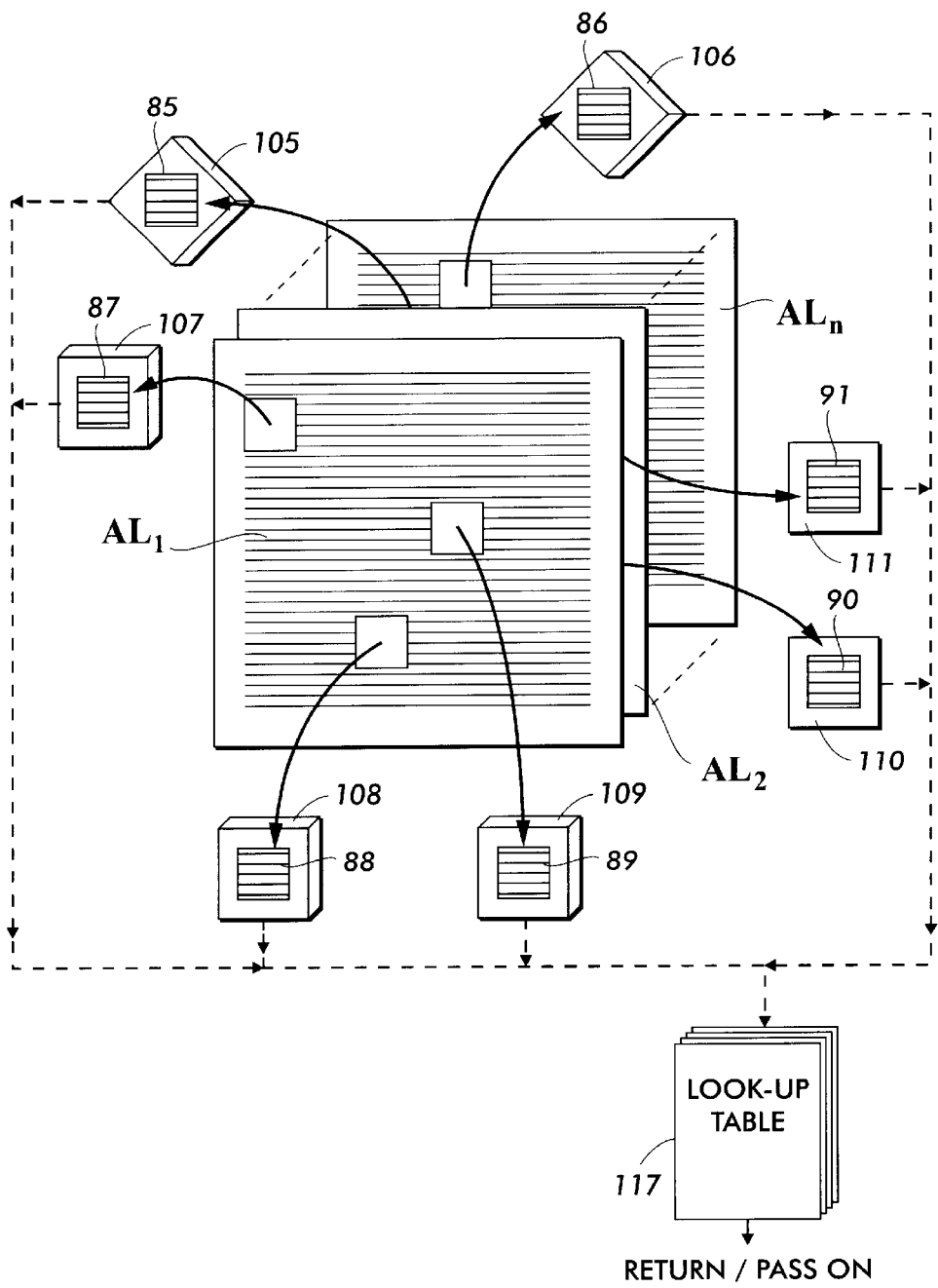
FIG. 15 illustrates machine readable non-overlapping fragments of N-dimensional image domain address spaces.

Turning to FIG. 15, it will be seen that machine readable non-overlapping fragments, such as at 85–91, of N-dimensional image domain address spaces of the above-described type, such as at $AL_1 \ldots AL_n$, can be affixed to a variety of two and three dimensional objects, such as at 105–111, to unique machine readable identifiers of those objects. Typically, these machine readable identifiers (i.e., address space fragments) are registered with the objects to which they are applied in a flat or hierarchically organized look-up table 117 so that a readout of any part of the address space identifier on any of the objects 105–111 provides a pointer for indexing into the look-up table 117. This pointer, in turn, usually causes the look-up table to return and/or pass on predetermined object related information to other system components (not shown).

In practice, the address space fragments 85–91 may be written directly on the objects 105–111, respectively, and/or on other substrates that are subsequently permanently or temporarily affixed to the objects. While a two dimensional address space can be employed for this application, more fully parameterized address spaces, such as the labeled address spaces $AL_1 \ldots AL_n$ have the advantage of having a hierarchical organization which may be employed, as shown, to hierarchically organize object identifiers 85–91 by object type or any other desired classification.

F. Glyph Address Carpets

Figure 16:
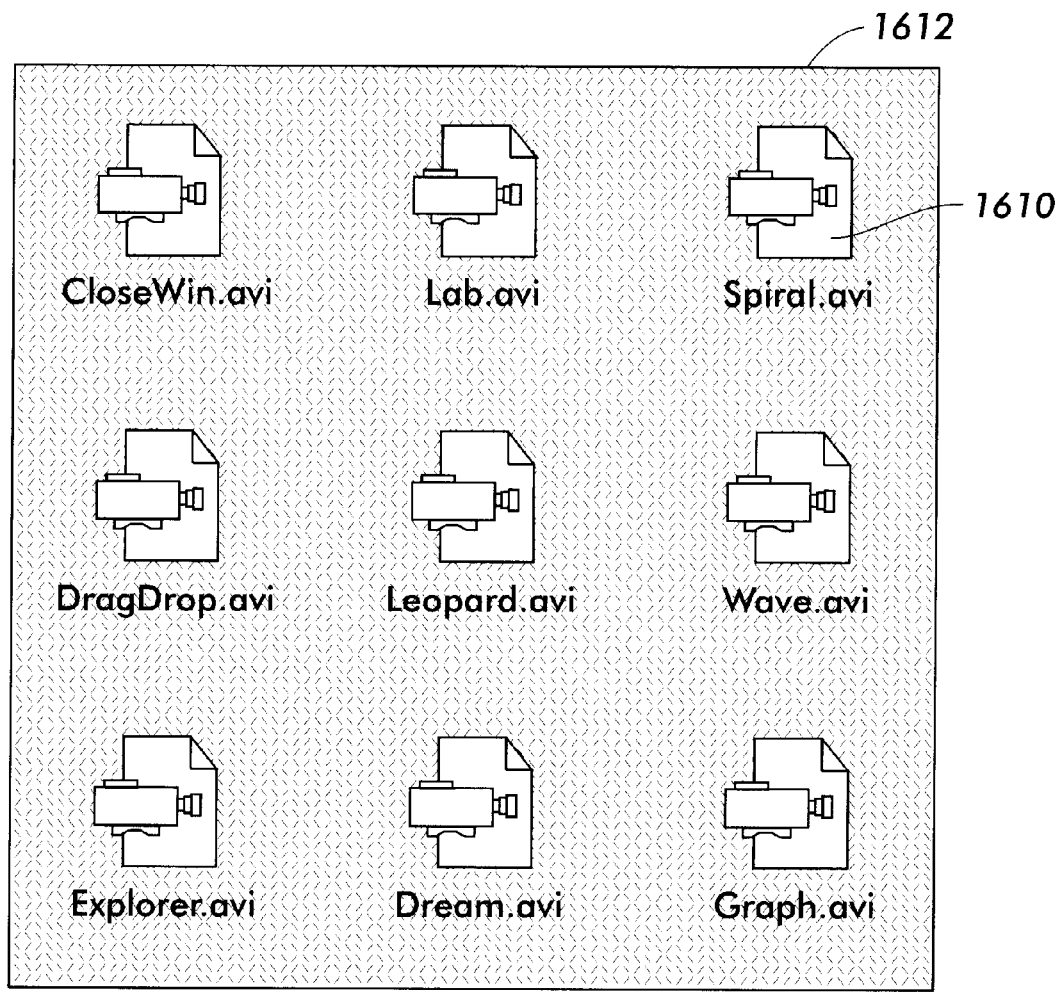
FIG. 16 is a block diagram that shows an example of a user interface graphical image implemented using glyph address carpets.

FIG. 16 is a block diagram that shows an example graphical user interface implemented using a glyph address carpet. The interface comprises two components:

(1) sensory indicia and (2) a background which comprises a glyph address carpet 1612. The address carpet may be visible or invisible. The sensory indicia in FIG. 16 are preferably visual indicia, and in particular graphic elements, such as icon 1612. The glyph address carpet 1612 is used as the background wallpaper for the graphic elements. The glyph pattern that makes up the background is called an "address carpet" because the glyphs can be decoded to provide unique address information for each location.

The icons may, as shown in FIG. 16, be partially formed by glyphs that are part of the glyph address carpet. In the case of glyphtones (see, e.g., U.S. Pat. No. 5,315,098 to Tow) and serpentones (see, e.g., U.S. Pat. No. 5,706,099 to Curry), the indicia may be substantially composed of the glyphs themselves. Because the glyphs encode address information, a portion of the glyphs can be read optically and decoded to determine a unique address for a local position.

The graphical user interface implemented using glyph address carpets can be implemented on any media capable of displaying the components of the interface. Thus, the interface could be implemented on hardcopy, such as paper, labels, physical objects, and photographic media; on dynamic displays such as a cathode ray tube (CRT) display or liquid crystal display (LCD); or on projected displays from fixed or dynamic media such as a slide projector, or television.

Although the embodiment described herein utilizes glyphs, the glyphs can alternatively be replaced by any system, visible or invisible, that provides a data address code. Whereas the embodiment described herein utilizes visual indicia, the visual indicia can alternatively be replaced by any sensory indicia that could serve to guide a user or machine to select a location while the machine readable data address codes provide an address logical reference. The embodiment described herein utilizes a paper substrate, but the paper substrate can alternatively be replaced by any media in which the data address codes can be embedded and read by a machine.

The sensory indicia may be embedded in the same media as the data address codes or may be embedded in other media. The sensory indicia can alternatively be projected onto glyphs, or glyphs can be projected onto sensory indicia.

Figure 17:
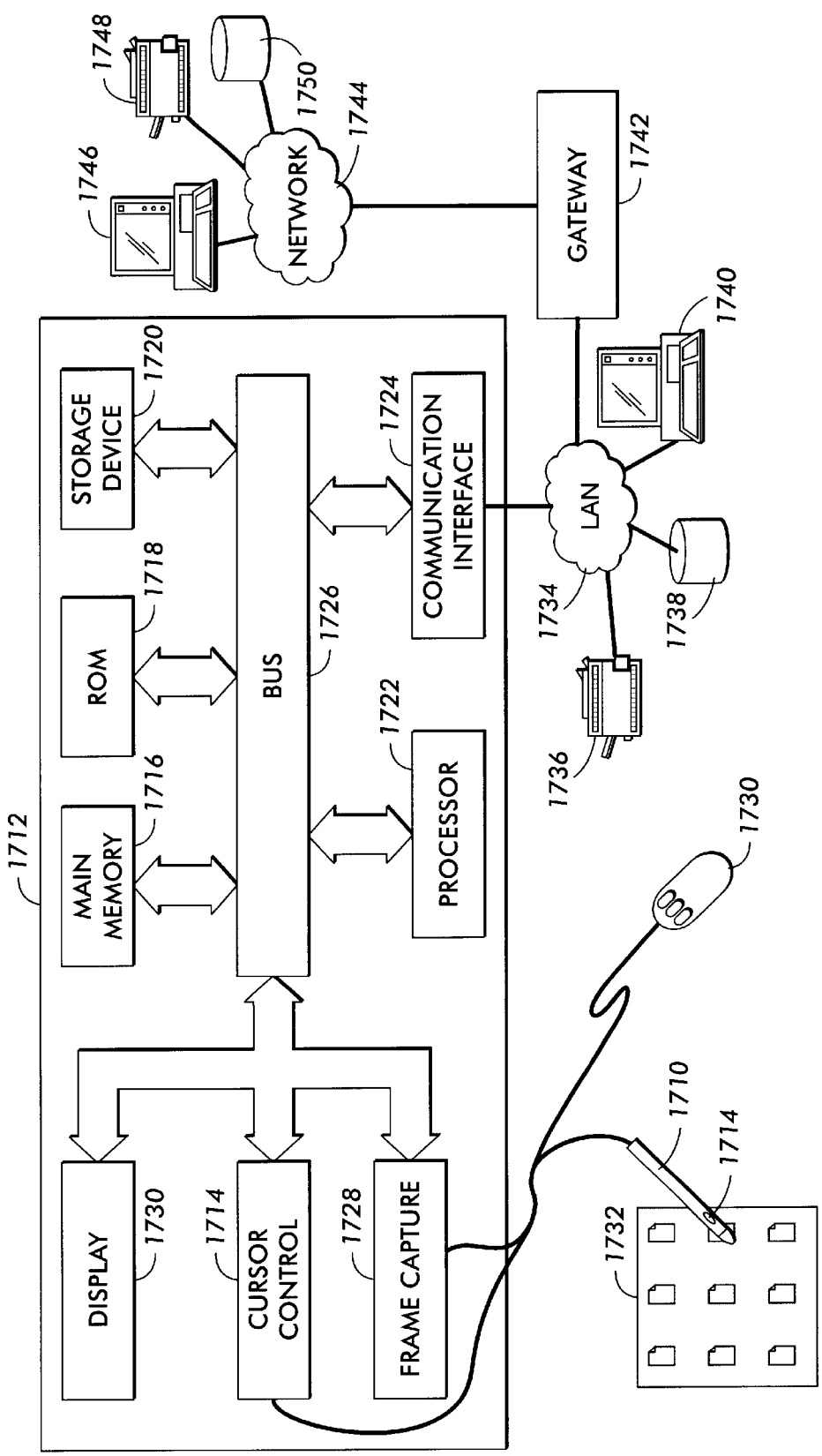
FIG. 17 is a block diagram of an image capture system that may be used to capture a user-selected portion of the glyph address carpet.

FIG. 17 is a block diagram of a user interface image capture system that may be used to capture a user-selected portion of a graphical user interface, such as glyph address carpet 1612, and decode the glyphs in the captured portion. In one embodiment, computer system 1712 is a general purpose computer system, such as a conventional personal computer or laptop computer, that includes main memory 1716, read only memory (ROM) 1718, storage device 1720, processor 1722, and communication interface 1724, all interconnected by bus 1726. Bus 1726 also connects to display 1730, cursor control 1714, and frame capture 1728.

Image capture device 1710, which in this case is a camera pen, is connected to frame capture 1728 and mouse 1730. Camera pen 1710 transmits image information to frame capture 1728. In one embodiment, button 1714 of camera pen 1710 is wired to mouse 1730 so that when a user presses button 1714 a signal travels through the circuitry of mouse 1728 to cursor control 1714. The signal causes processor 1722 to run a program that directs frame capture 1728 to capture the image from camera pen 1710. In another embodiment, both the image line and signal line from camera pen 1710 are input directly into frame capture card 1728. The lines between camera pen 1710 and computer 1712 can be wired in any way that provides capture of the image from camera pen 1710.

The user makes a selection by placing camera pen 1710 on or near visual indicia on glyph address carpet 1732, and pressing button 1714. Pressing button 1714 causes camera pen 1710 to capture the portion of the address carpet under the tip of camera pen 1710, and transmit the image to computer 1712, via frame capture 1728, for analysis. The button or multiple buttons can be used for additional signaling, as in a double click, hold down.

Computer 1712 is also connected to local area network (LAN) 1734 for communicating with devices connected to LAN 1734. For example, LAN may be connected to a computer 1740, a printer 1736, and a mass storage 1738. LAN 1734 is also connected to a gateway 1742 for connecting to another network 1744. Network 1744 may be connected to a computer 1746, a printer 1748, and a database 1750. By connecting computer 1712 to LAN 1734 and network 1744, computer 1712 can perform operations using the devices connected to these networks. For example, a document selected for printing by camera pen 1710 or mouse 1730 can be printed on printer 1736 or printer 1748. Similarly, a user may use computer 1712 to request a file on database 1750.

Figure 18:
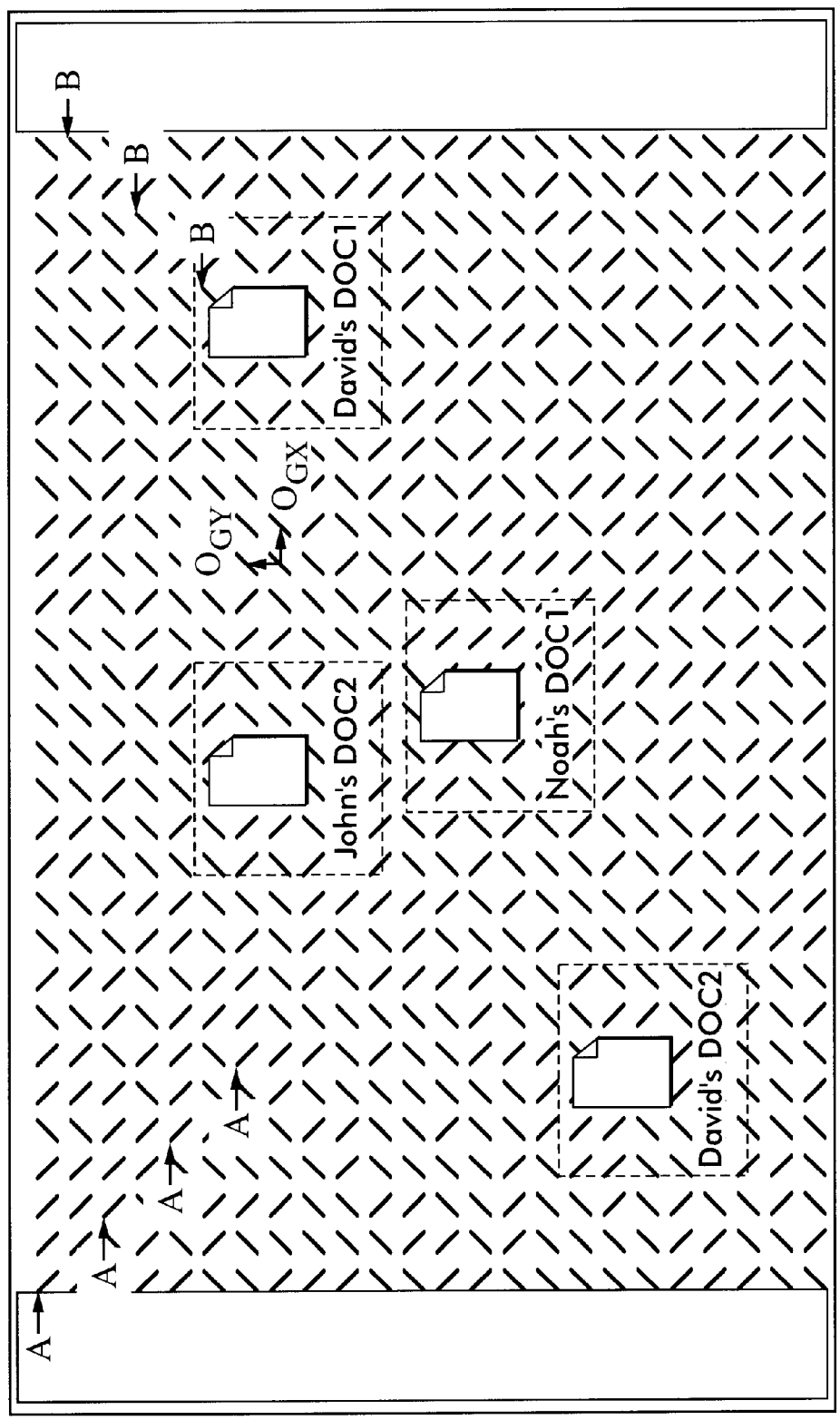
FIG. 18 shows an embodiment of a user interface implementing hot zones.

FIG. 18 shows an embodiment of a user interface implementing hot zones. A hot zone is an area on or near the visual indicia that defines selection locations that are equivalent to selecting the same visual indicia. In a preferred embodiment, the hot zone may encompass the visual indicia. For example, in FIG. 18, the icon David's DOC2 has a broken line area indicating a hot zone. If the user makes a selection within this hot zone, the icon "David's DOC2" will be selected. This allows the user to make a selection that is on or near the visual indicia. The selection is treated by the system as if the visual indicia was selected. The hot zone may be explicitly denoted by the visual indicia, including a visually distinct coloring in the address carpet, or may be implicit by appropriate proximity.

FIG. 18 also illustrates a preferred embodiment for the glyph address carpet coding scheme. Each glyph is either a forward slash or a backward slash. The orientation and spacing of the rows and columns of glyphs is indicated by $O_{GX}$ and $O_{GY}$, respectively. As denoted by the As and Bs in the drawing, an A code runs on every other line, and is interlaced with a B code. Along diagonals running down and to the right, every A value is preferably the same. Similarly, along diagonals running down and to the left, every B value is preferably the same.

Figure 19:
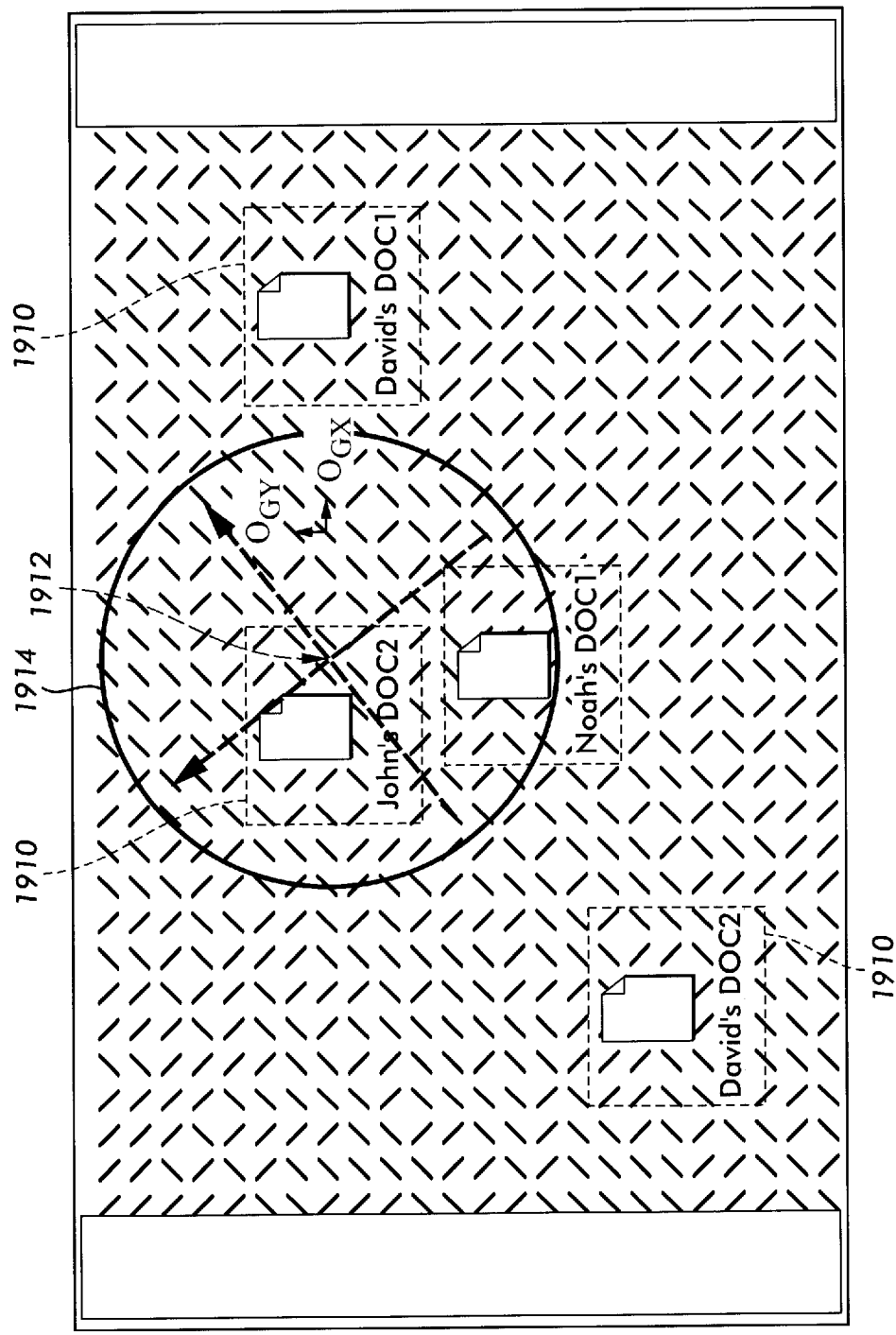
FIG. 19 is a block diagram illustrating the selection process using camera pen 1710.

FIG. 19 is a block diagram illustrating the selection process using camera pen 1710. Each icon has an effective selection area indicated by a broken line hot zone 1910. The tip of camera pen 1710 covers an area indicated by 1914. The orientation of the tip of camera pen 1710 is denoted by the $Y_C$ axis and $X_C$ axis. To make a selection, the user places the tip of camera pen 1710 over the area to be selected. When the user presses button 1714, the image within area 1914 is captured. Computer 1712 analyzes the captured image to determine the location of the center 1912 of selection area 1914. After determining the location of center 1912, the location of center 1912 is used to look up a function corresponding to center 1912.

Figure 20:
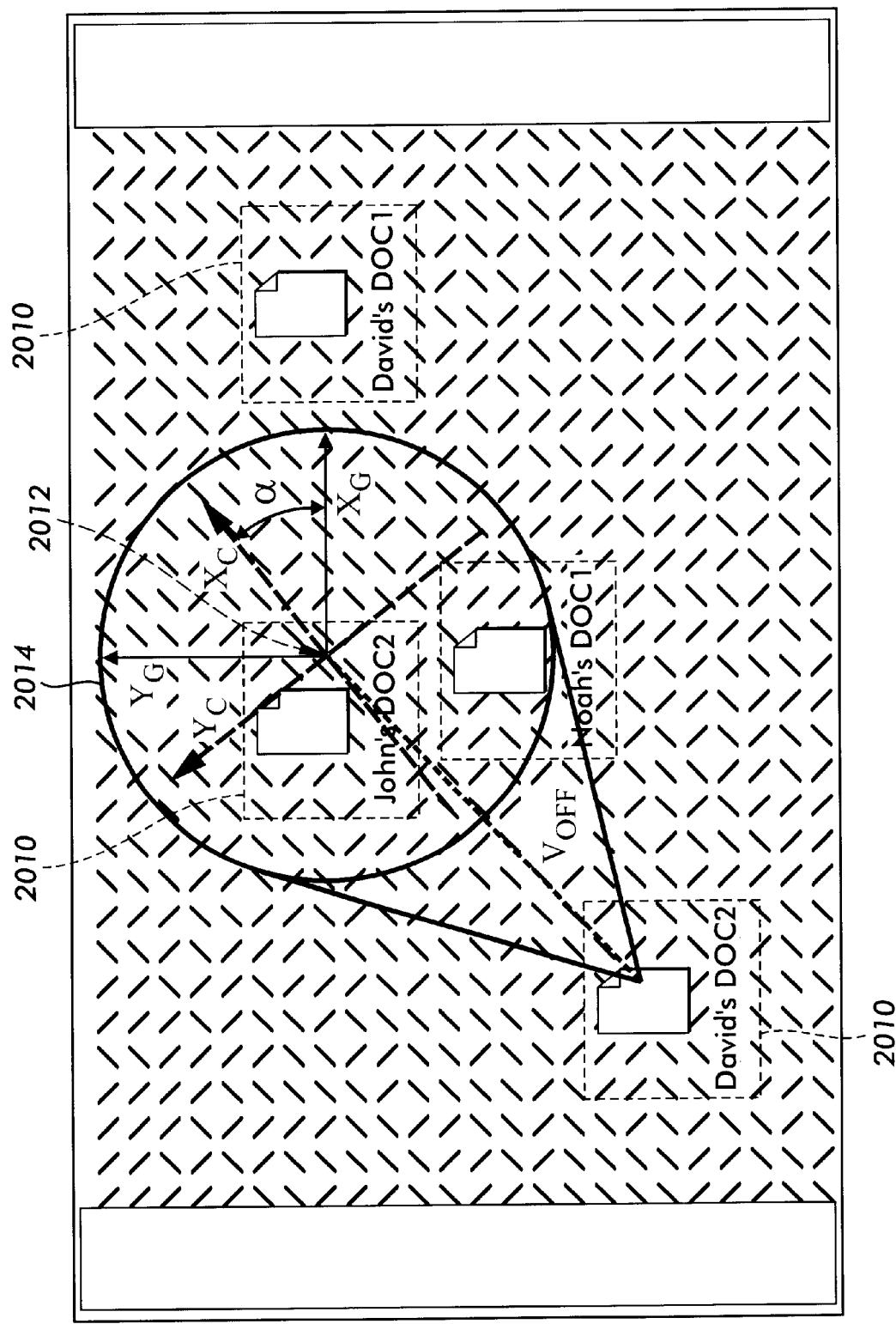
FIG. 20 is a block diagram illustrating a second type of selection process that may be used to implement a graphical user interface consistent with the principles of the invention

FIG. 20 is a block diagram illustrating a second type of selection process that may be used to implement a graphical user interface consistent with the principles of the invention. In this embodiment, camera pen 1710 has a pointing device attached to the tip, thus making the image capture area of the pen offset from the location pointed at by the user. For example, in FIG. 20, a user selects the icon "David's DOC" by pointing to the icon, but the camera pen 1719 image capture area 2014, with center 2012, is offset from the icon. In this case, computer 1712 must determine the actual selection based on 1) the image area 2014, and 2) the orientation of the selected area, and 3) the offset distance and direction from the image capture area from center 2012. The offset calculation utilizes the glyph lattice parameters from the captured image decoding process described below.

Returning to FIG. 17, in one embodiment, main memory 1716 is a random access memory (RAM) or a dynamic storage device that stores instructions executed by processor 1722. Main memory 1716 may also store information used in executing instructions. ROM 1718 is used for storing static information and instructions used by processor 1722. Storage device 1720, such as a magnetic or optical disk, also stores instructions and data used in the operation of computer system 1712.

Display 1730 may be a CRT or other type of display device. Cursor control 1714 controls cursor movement on display 1730. Cursor control 1714 may be, for example, a mouse, a trackball or cursor direction keys.

The system shown in FIG. 17 can be used to implement the glyph address carpet capture and translation system described herein. The apparatus and methods described herein may be implemented by computer system 1712 using hardware, software, or a combination of hardware and software. For example, the apparatus and methods described herein may be implemented as a program in any one or more of main memory 1716, ROM 1718, or storage device 1720. In one embodiment, processor 1722 executes programs which analyze captured portions of a glyph address carpet to determine address information encoded in the glyphs.

Such programs may be read into main memory 1716 from another computer-readable medium, such as storage device 1720. Execution of sequences of instructions contained in main memory 1716 causes processor 1722 to perform the process steps consistent with the present invention described herein. Execution of sequences of instructions contained in main memory 1716 also causes processor to implement apparatus elements that perform the process steps. Hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1722 for execution. Such a medium may take many forms, including but not limited to, non-volatile memory media, volatile memory media, and transmission media. Non-volatile memory media includes, for example, optical or magnetic disks, such as storage device 1720. Volatile memory media includes RAM, such as main memory 1716. Transmission media includes coaxial cables, copper wire and fiber optics, including the wires that comprise bus 1726. Transmission media can also take the form of acoustic or light waves, such as those generated during radiowave and infrared data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 1722 for execution. For example, the instructions may initially be carried on a magnetic disk or a remote computer. The remote computer can load the instructions into its dynamic memory and send the instructions over a telephone line using a modem. A modem local to computer system 1712 can receive the data on the telephone line and use an infrared transmitter to convert the data to an infrared signal. An infrared detector coupled to appropriate circuitry can receive the data carried in the infrared signal and place the data on bus 1726. Bus 1726 carries the data to main memory 1716, from which processor 1722 retrieves and executes the instructions. The instructions received by main memory 1716 may optionally be stored on storage device 1720 either before or after execution by processor 1722.

Computer system 1712 also includes a communication interface 1724 coupled to bus 1726. Communication interface 1724 provides two way communications to other systems. For example, communication interface 1724 may be an integrated services digital network (ISDN) card or a modem to provide a data communication connection to a corresponding type of telephone line. Communication may also be, for example, a local area network (LAN) card to provide communication to a LAN. Communication interface 1724 may also be a wireless card for implementing wireless communication between computer system 1712 and wireless systems. In any such implementation, communication interface 1724 sends and receives electrical, electromagnetic or optical signals that carry data streams representing various types of information.

The link between communication interface 1724 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the "Internet." Local networks and the Internet both use electrical, electromagnetic or optical signals that carry digital data streams. The signals through the various networks and the signals between the networks and communication interface 1724, which carry the digital data to and from computer system 1712, are exemplary forms of carrier waves transporting the information.

Computer system 1712 can send messages and receive data, including program code, through the network(s) via the link between communication interface 1724 and the external systems and devices. In the Internet, for example, a server might transmit a requested code for an application program through the Internet, an ISP, a local network, and communication interface 1724.

Program code received over the network may be executed by processor 1722 as it is received, and/or stored in memory, such as in storage device 1720, for later execution. In this manner, computer system 1712 may obtain application code in the form of a carrier wave.

FIG. 21 illustrates an embodiment of the address codes encoded in glyph address carpet 1732. More particularly, FIG. 21 illustrates one section of glyph address carpet 1732. The addresses are encoded by alternating rows of "A" address code sequences and "B" address code sequences. The position along each sequence in each row should be unambiguously determinable from a predetermined length subsequence. For example, an N-bit shift register maximal length code can be uniquely determined in position from an N-bit subsequence. Each address code sequence is a fifteen bit sequence, with the A sequence indexed running left to right, and the B sequence indexed running in a reverse direction, right to left. Each row of A code sequences is offset by two glyph positions relative to the previous and next row of A addresses. Similarly, each row of B code sequences is offset in the opposite direction by two positions. Thus, the encoding scheme has two key characteristics: parallel rows including two sets of one-dimensional unique address codes and relative offsets among members of the two sets so that the offset between each pair from the two sets is unique. This establishes two-dimensional unique address locations.

Computer 1712 decodes address information encoded in the glyphs by analyzing the captured image area in two steps. Ideally, the user places camera pen 1710 over a portion of glyph address carpet 1732 and captures an image angularly aligned as shown in the pattern of bits shown in FIG. 21. In reality, however, the user variably orients the camera pen 1710 over an area of interest, so the pattern could be oriented anywhere from 0° to 360°. Therefore, the computer 1712 must first determine the orientation of the image as part of decoding and interpreting the address information.

The orientation of the image is determined by analyzing the captured image. This process is called disambiguation. (See, e.g., U.S. Pat. No. 5,521,372 to Hecht et al.). After determining the proper orientation of the image, computer 1712 decodes the address of the selected location in the address carpet. The disambiguation and address decoding processes performed by computer 1712 will now be described in greater detail.

G. Disambiguation and Address Decoding

Figure 22A:
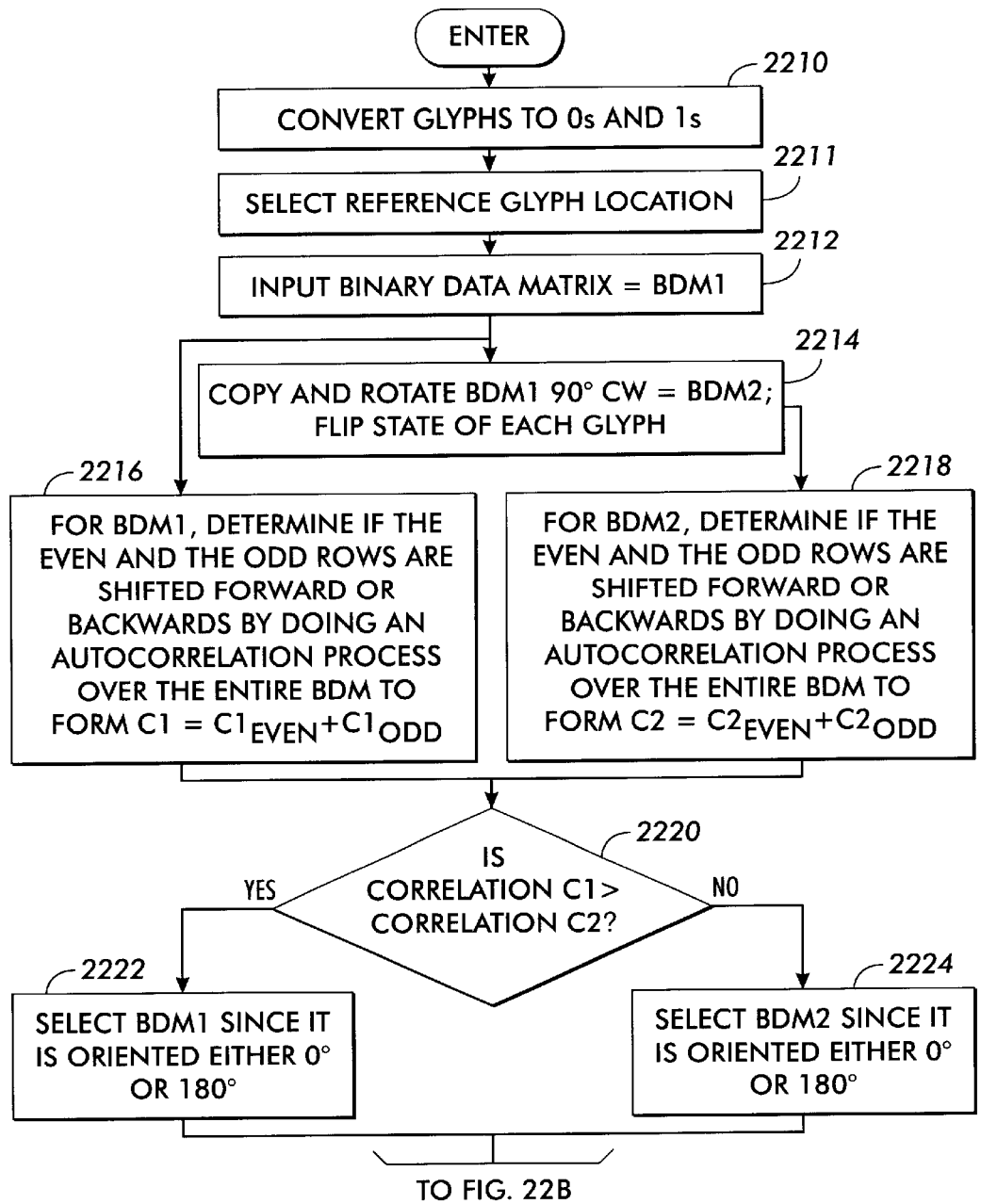
FIG. 22(a) and FIG. 22(b) form a flow chart showing the disambiguation and address decoding processes performed on the captured image area by computer 1712.
Figure 22B:
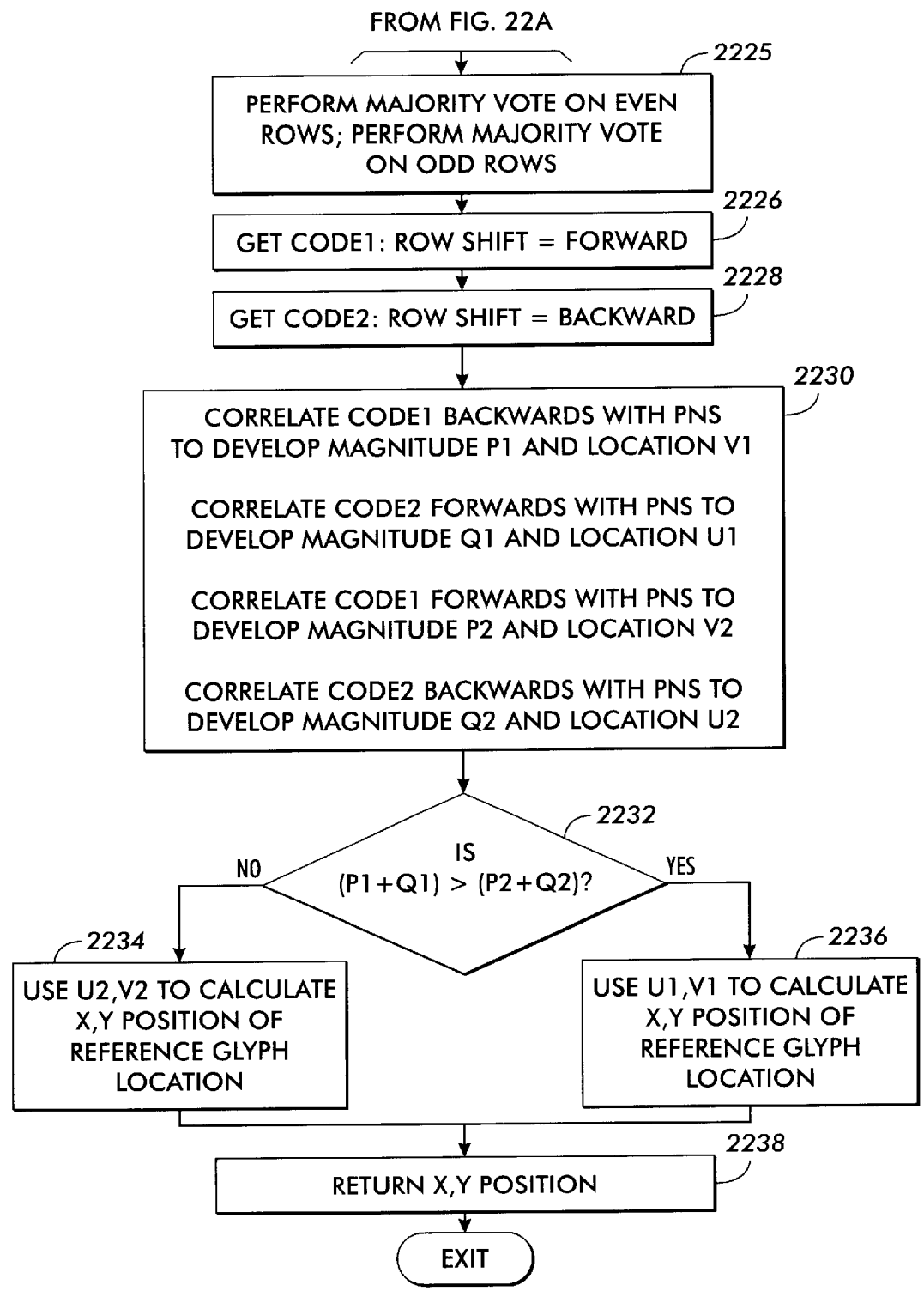

FIG. 22(a) and FIG. 22(b) form a flow chart showing the disambiguation and address decoding processes performed by computer 1712 on the captured image area. Computer 1712 begins the disambiguation process by image processing the captured portion of the address carpet to find a glyph seed. A glyph seed is a first-identified glyph having readable glyphs around it. Once a glyph seed has been found, the glyph lattice can be determined by processing neighbors, of the glyph seed. (See Appendices A and B). The glyphs are then decoded as 1's or 0's, which are filled into a binary data matrix having rows and columns corresponding to the glyph lattice rows. The orientation may still be ambiguous with respect to 90° and 180° rotations.

FIG. 23 illustrates a binary data matrix (BDM) 2310 formed from a glyph lattice captured by camera pen 1710. The BDM has locations corresponding to the glyph lattice. Thus the size of the BDM corresponds closely to the size of the glyph lattice.

Each location of the glyph lattice is analyzed to determine which value should be placed in the corresponding location of the BDM. Initially, the BDM is filled with a value, for example ϕ, which indicates that no attempt has been made to read the glyph. Once the glyph corresponding to a particular location has been analyzed, the ϕ is replaced by a value indicating the result of the glyph analysis.

In FIG. 23, a B indicates a border location; an X indicates that no interpretable glyph was found at the corresponding location of the glyph lattice; an E indicates a glyph at the edge of the captured image portion; a 0 indicates a back slash glyph; and a 1 indicates a forward slash glyph. The area of the matrix corresponding the captured image is filled with 0s and 1s, the edge is bounded by Es, and the Xs correspond to locations that have no readable glyphs. In practice, however, although the BDM will generally have a similar pattern, the values will often not be as evenly distributed. For example, a glyph location within the captured image area might result in an X if the glyph has been obliterated. Several values have been drawn with circles and squares around them to illustrate the two separate code sequences that are staggered in opposite directions.

When a user makes a selection, the user might orient the camera pen in virtually any direction on the user interface. The captured image could be oriented at any angle. Thus, even though step 2210 allows computer 1712 to derive a BDM of 0s and 1s from the captured image, it is uncertain whether the BDM is oriented at 0°(i.e., correctly oriented), 90°, 180°, or 270° relative to the original code pattern in the glyph address carpet from which the image was captured. Until the orientation of the captured image is determined, it is not possible to derive the correct address code from the BDM. The orientation could be provided by auxiliary information such as physical system constraints. However, the orientation can be uniquely determined directly from the address codes.

After converting the glyphs to 0s and 1s, a reference glyph location is selected (step 2211). This location may be chosen in a variety of ways, but is typically a location which represents the selection. For example, the reference glyph location could be at the center of the BDM.

After the image has been converted to a BDM, it is processed by computer 1712 (step 2212). The original BDM developed from the captured image is referred to as BDM1. Computer 1712 1makes a copy of BDM1 and rotates the copy clockwise 90° to form a second binary data matrix, BDM2 (step 2214). By rotating BDM1 by 90°, the rows of BDM1 become the columns of BDM2, and the columns of BDM1 become the rows of BDM2. Additionally, all bit values in BDM2 are flipped from 0 to 1, and 1 to 0, because a 45° slash glyph rotated 90° appears as the opposite state of the non-rotated glyph.

Computer 1712 then performs a correlation separately on the odd and even rows of BDM1 (step 2216) to determine whether code in the rows are staggered forward or backward. The correlation is also performed for the odd and even rows of BDM2 (step 2218). The correlation is performed over all the rows of each BDM, and results in correlation value C1 for BDM1 and correlation value C2 for BDM2.

Figure 24:
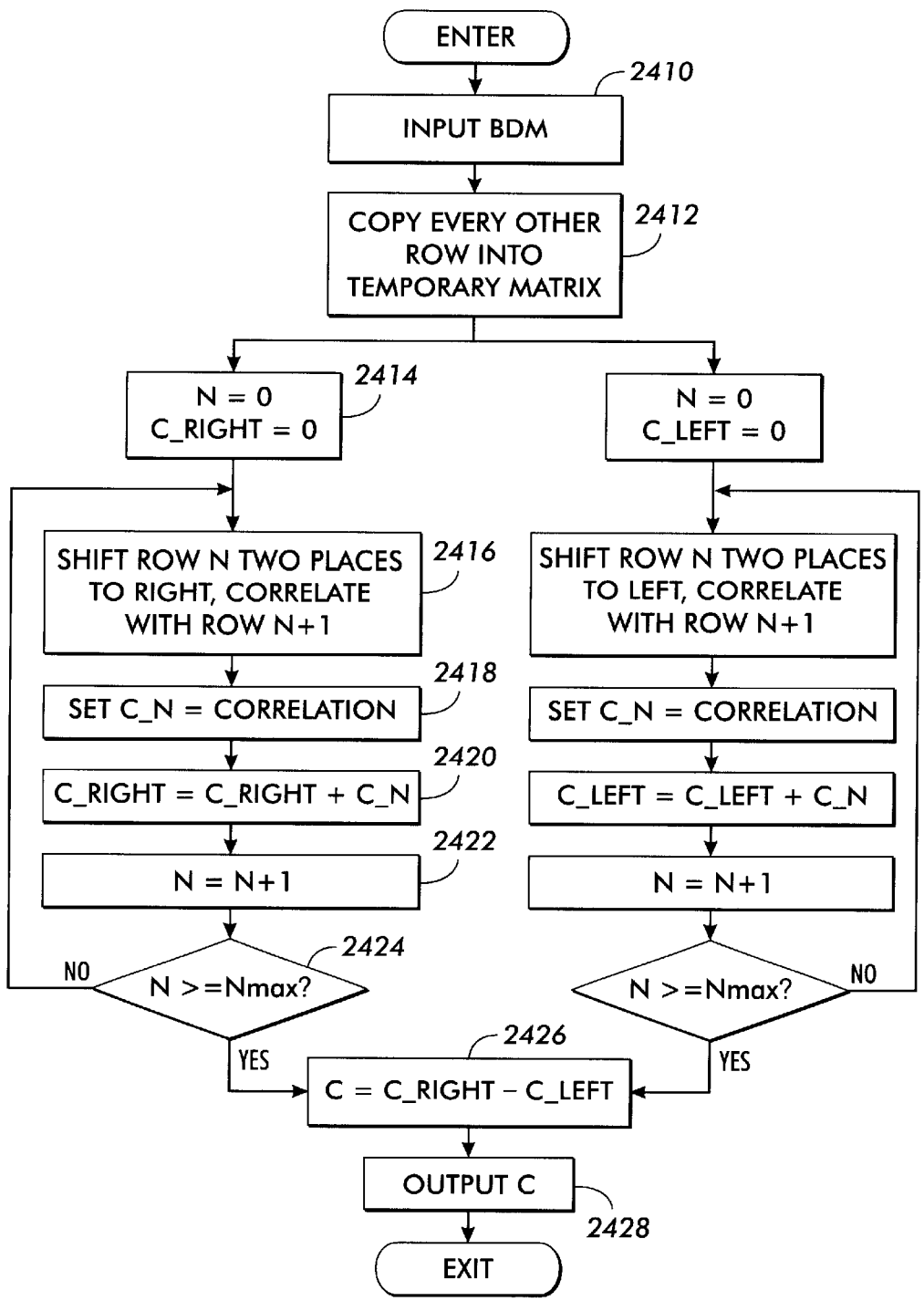
FIG. 24 is a flowchart showing the process for performing correlation steps 2116 and 2118.

FIG. 24 is a flowchart showing an embodiment of correlation steps 2216 and 2218 of FIG. 22(b). The process determines a correlation value for every other line of a BDM along diagonals in each direction, and sums the row correlation values to form a final correlation value for the odd or even rows. The process is performed on the odd rows of BDM1 to form correlation value $C1_{ODD}$ for BDM1, the even rows of BDM1 to form correlation value $C1_{EVEN}$ for BDM1, the odd rows of BDM2 to form correlation value $C2_{ODD}$ for BDM2, the even rows of BDM2 to form correlation value $C2_{EVEN}$ for BDM2. The BDM that is oriented at 0° or 180° will have a larger $C_{ODD}+C_{EVEN}$ than the other BDM.

Computer 1712 first inputs the BDM (step 2410), and then copies every other row to a temporary matrix (step 2412). Identical processes are then performed for diagonals to the right and to the left. Steps 2414, 2416, 2418, 2420, 2422 and 2424 process the diagonals to the right. For example, in FIG. 25 the steps correlate along the diagonals moving from the upper left to lower right. First, row count N and correlation value C_RIGHT are each initialized to zero (step 2414). Row N is shifted two places to the right, and correlated with the next row (step 2416). C_N is then set to this value (step 2418). C_RIGHT is then set to C_RIGHT+C_N (step 2420), and N is incremented (step 2422). If row count N>=Nmax, where N is the number of odd or even rows in the BDM, then the process proceeds to step 2426. If N is not greater than or equal to Nmax, the process continues at step 2416. Thus, after the process has correlated each adjacent row, the correlation value C_RIGHT indicates the strength of the correlation along the diagonals to the right.

The steps on the right of FIG. 24 are similar to steps 2414, 2416, 2418. 2420, 2422 and 2424, but process diagonals running from the upper right to lower left to develop correlation value C_LEFT. After correlating the right and left diagonals to determine C_RIGHT and C_LEFT, a final correlation value C is determined by subtracting C_LEFT from C_RIGHT. For example, if odd rows for BDM1 are processed, the C value becomes $C1_{ODD}$ for BDM1.

The process steps of FIG. 24 are performed for the odd and even rows of BDM1 and the odd and even rows of BDM2. From this information, the correlation value C1 for BDM1 is set to $C1_{EVEN}+C1_{ODD}$ (as determined by FIG. 24 for the rows of BDM1), and the correlation value C2 for BDM2 is set to $C2_{EVEN}+C2_{ODD}$ (as determined by FIG. 24 for the rows of BDM1).

Figure 25:
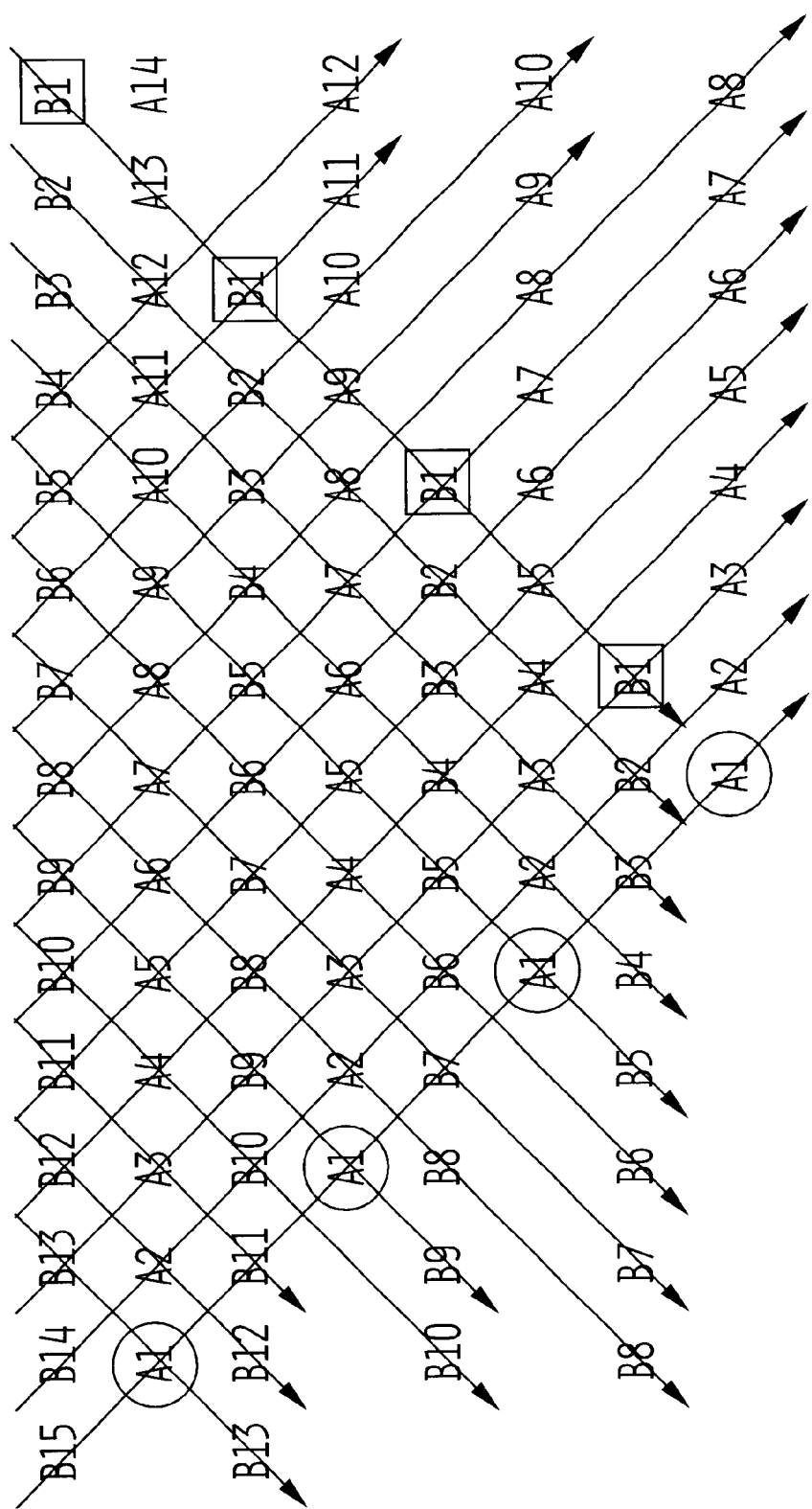
FIG. 25 illustrates the analysis performed by computer 1712 to determine the address encoded by the glyphs of the captured image.

FIG. 25 illustrates why the correlations determine which way the codes in every other row are shifting. For example, as indicated by the circled A1s along the diagonals running to the right, the codes along the diagonal starting at A1 in the first position of the second row should have the same value in every other row along the diagonal, except for erasures and errors. Similarly, as indicated by the boxed B1s, the codes along the diagonal starting at B1 in the upper it right corner should have the same value in every other row along the diagonal, except for erasures or errors. This is true for each value along the diagonal in the odd rows running respectively from B2, B3, . . . in the top row. Thus, the strong correlations along the diagonals running down and to the left on the odd rows, and the strong correlations along the diagonals running down and to the right on the even rows indicate that the codes in the even rows are shifting to the right, and the codes in the odd rows are shifting to the left.

For each BDM, therefore, four correlation values are developed: 1) odd rows, right to left, 2) odd rows, left to right, 3) even rows, right to left and 4) even rows, left to right. From these correlation values, the strongest correlation value for the even rows, and strongest correlation value for the odd rows is chosen, and these become $C_{EVEN}$ and $C_{ODD}$ for that BDM (steps 2216 and 2218). $C_{EVEN}$ and $C_{ODD}$ are then added to form a final C correlation value for that BDM. As discussed above with respect to step 2220, the BDM with the strongest correlation value is the BDM that is oriented at either 0° or 180° because of the relative orientation of the codes in the odd and even rows. Thus, two aspects of the chosen BDM are now established: which direction every other line of codes is staggered, and that the BDM is oriented horizontally, at either 0° or 180°. Another correlation process, step 2230 is performed to determine which direction the code in each line runs (as opposed to which way the code is staggered).

The codes in the odd lines are staggered in one direction, and the codes in the even lines are staggered in the other. This staggering property of the code, in conjunction with knowing the respective codes that run in the odd lines and even lines, allows determination of the proper 0° orientation of the BDM.

Returning to FIG. 22(a), if C1 is greater than C2 (step 2220), then BDM1 is selected for further processing. C1 being greater than C2 indicates that the one-dimensional codes of BDM1 are most strongly correlated and are, therefore, oriented at either 0° or 180° (step 2222). If C2 is greater than C1, then BDM2 is selected for further processing, because the higher correlation indicates that BDM2 is oriented at either 0° or 180° (step 2224). Thus, the correct BDM has been found. Before determining the address location of the captured image, however, computer 1712 must first determine whether the selected BDM is at 0° (i.e., oriented correctly), or rotated by 180°.

FIG. 22(b) is a flowchart showing the steps of how computer 1712 determines the address of the captured area of the glyph carpet. Preferably, bit positions along a diagonal in the BDM, when the BDM is oriented at 0°, have the same value at every other row. The image capture process and interference from the visual indicia, however, may result in errors and erasures in the BDM data. To reduce the impact of these errors and erasures, computer 1712 performs a majority vote along each diagonal of the odd rows in the direction the odd rows are staggered, and repeats the majority vote process for even rows along the each diagonal in the direction the even rows are staggered (step 2225). This results in a first code sequence for the odd rows and a second code sequence for the even rows. To the extent the majority vote correctly determines each bit position, the first and second code sequences should match a subsequence of the original pseudo noise address sequence respectively corresponding to the odd or even set of rows.

Computer 1712 then retrieves the original pseudo noise address code (Get Code 1) for rows staggered forward (step 2226), and retrieves the original pseudo noise address code for (Get Code 2) for rows staggered backward (step 2228). Using the original pseudo noise address code for each code set A and B, and the code from the majority voting, computer 1712 performs four cross correlations (step 2230) to establishes the best match of the glyph sequence with the PN sequence location for the odd and even rows.

More particularly, two adjacent rows of the BDM closest to the reference element chosen in step 2211 are correlated with the respective complete PN sequences that created the original address carpet. The PN sequences could be identical. A forward and backward correlation is performed for each row. The four correlations develop four pairs of peak correlation and position values:

1) P1, V1, respectively representing the peak correlation value and corresponding position for Code 1 correlated backwards with the complete PN sequence;
2) Q1, U1, respectively representing the peak correlation value and corresponding position for Code 2 correlated forwards with the complete PN sequence;
3) P2, V2, respectively representing the peak correlation value and corresponding position for Code 1 correlated forwards with the complete PN sequence; and
4) Q2, U2, respectively representing the peak correlation value and corresponding position for Code 2 correlated backwards with the complete PN sequence.

The $U_i$ and $V_i$, position values, where i=1 or 2, corresponding to the peak magnitudes are used to determine the X and Y values corresponding to the reference element chosen in step 2211. Thus, if (P1+Q1)>(P2+Q2) (step 2232), then U1 and V1 are used to calculate the X, Y position of the reference glyph location chosen in step 2211 (step 2236). If (P1+Q1)<=(P2+Q2) (step 2232), then U2 and V2 are used to calculate the X, Y position of the reference glyph location chosen in step 2211 (step 2234). The address information is determined in accordance with the following equations:

$$X=(V_i-U_i+\text{length of full code})/2$$

$$Y=(V_i+U_i-\text{length of full code})/2$$

The calculated X, Y position is then returned (step 2238). Note that diagonals correspond to constant values of U and V, respectively, while rows and columns correspond to constant X and Y. Note also that U and V could be used directly as address parameters.

Thus, an X, Y value associated with the reference point chosen in step 2211 has been determined. Using this information, computer 1712 associates the X, Y coordinates with a logical reference, or a combination of a logical reference and a control signal (e.g., a button click), with a particular operation to be performed. For example, the X, Y coordinates could be used as an index into a table of operations performable by computer 1712 or other device under direction of computer 1712. The X, Y coordinates could be associated with a file open command that opens a file associated with an icon located near the X, Y coordinates in the address space. Virtually any operation that can be performed by computer 1712 could be associated with a particular X, Y coordinate, or range of X, Y coordinates.

FIG. 26 illustrates an embodiment of a user interface in which address carpet 1612 is divided into hot zones having respective ranges of addresses corresponding to a graphic object which in turn corresponds to a system object or function. Computer 1712 uses the X, Y address determined from the image capture to determine which area of address carpet 1612 was selected by the user. For example, if the address is X=1052 and Y=32, which is in the upper left area of address carpet 1612, then the user has selected CloseWin.avi. Computer 1712 utilizes a table that associates X, Y coordinates to one or more functions that are to be performed based on the X, Y coordinates. For example, in the above example, X=1052 and Y=32 would be associated with the one or more functions to be performed when a user selects CloseWin.avi. Activation could be signaled to computer 1712 by button 1714, such as a click or multiple click. Alternatively, activation could be signaled to computer 1712 by holding the image capture steady for a certain time. The precision of location selection is one glyph unit and the resolution of differentiated selection can be as fine as one glyph unit. Resolution can be extended to a fraction of a glyph unit provided the capture selection device can be referenced to the address carpet to within a fraction of a glyph interval. For example, a camera pixel is typically fraction of a glyph interval.

H. Camera Pen

Figure 27B:
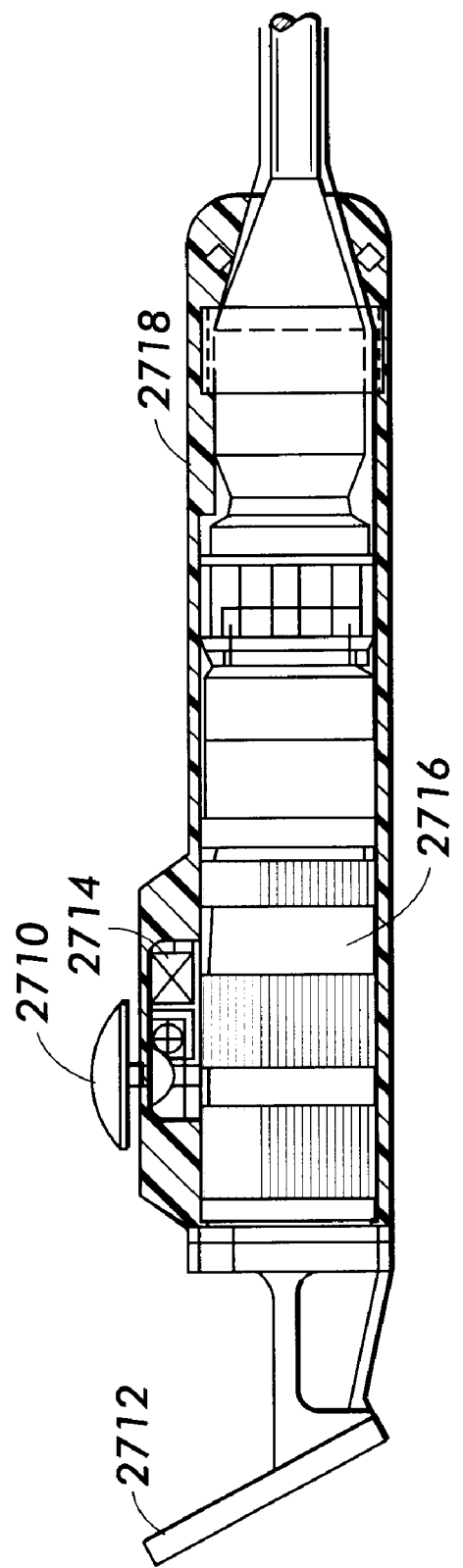
Figure 27C:
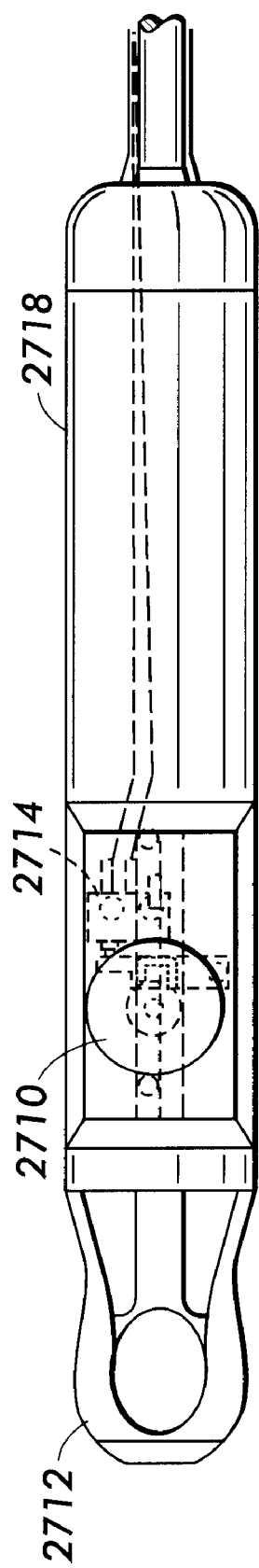

FIGS. 27(*a*), 27(*b*), and 27(*c*) show front, side and top views, respectively, of one embodiment of camera pen 1710 of FIG. 17. The pen includes a camera 2716 encased in case 2718. Case 2718 has a button 2710, switch 2714, and landing gear 2712 attached there Button 2710, when pressed by a user, activates switch 2714 to signal computer 1712 that an image is to be captured. Landing gear 2712 is a rigid or skeletal structure, and is angled so as to allow a user to hold the pen against a substrate at a natural ergonomic angle, similar to a pen with a predetermined working distance from the substrate to the face of the camera lens on camera 2716.

Figure 28A:
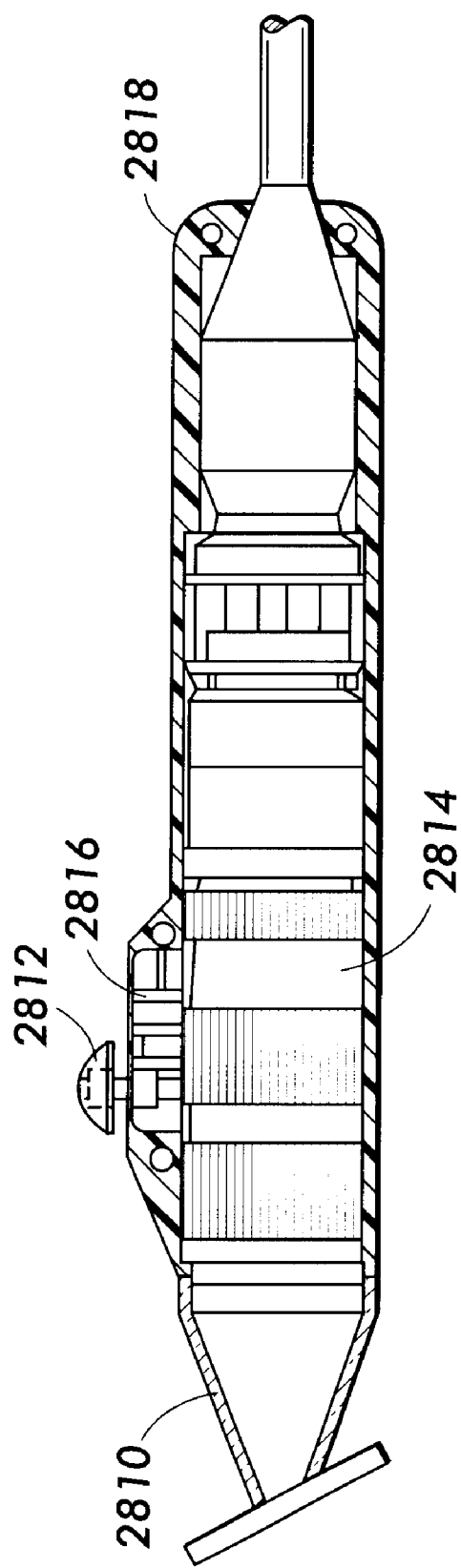

FIGS. 28(*a*) and 28(*b*) show side and front views, respectively, of another embodiment of camera pen 1710 of FIG. 17. The pen is comprised of camera 2814 encased in case 2818. Case 2818 has a switch 2812 and landing gear 2810 attached thereto. Switch 2812 is activated by a user pressing down on button 2812, which activates switch 2816 to signal to computer 1712 that an image is to be captured. Landing gear 2810, like the landing gear 2712 of FIG. 27, is angled so as to allow a user to hold the pen against a substrate at a natural ergonomic angle, similar to a pen. Landing gear 2810, however, is a clear or translucent truncated cone in the embodiment shown in FIG. 28.

In either the skeletal or clear cone embodiment, the landing gear of the camera pen may include selection assistance elements, such as marks or protrusions, that are used by the user to select an area of the image. For example, the landing gear might include cross hairs, a printed arrow, or a protruding nub, that a user places over or on the area being selected.

I. Selection Alternatives

The embodiments described have used a device like camera pen 1710 to capture a portion of glyph carpet associated with a selection. Other selection apparatus may also be used. In general, any device may be used that identifies selection location to a user or machine and provides a corresponding registered image capture portion of the address carpet.

Figure 29:
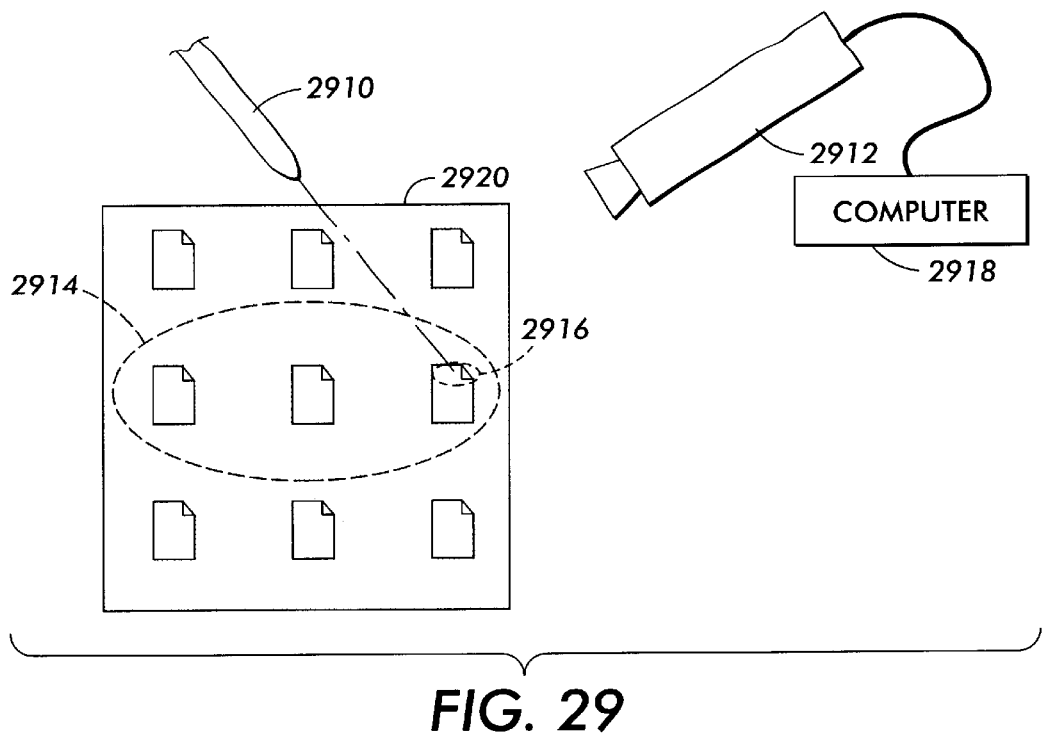
FIG. 29 is a block diagram showing glyph address carpet image capture based on selection using a laser pointer.

FIG. 29 is a block diagram that illustrates a glyph address carpet 2920, which can be read by a pan and zoom camera 2912. The captured portion of glyph address carpet 2920 can then be processed by computer 2918. Camera 2912 scans glyph address carpet 2920 for an area 2916 on glyph address carpet 2920 pointed to by handheld laser pointer 2910. Camera 2912 captures the portion of the glyph address carpet being pointed at and transmits the portion to computer 2918 for processing in response to the selection. Alternatively, or additionally, camera 2912 could capture wide area 2914 for processing. The computer image processing recognizes the pointer location by conventional image recognition techniques.

Figure 30:
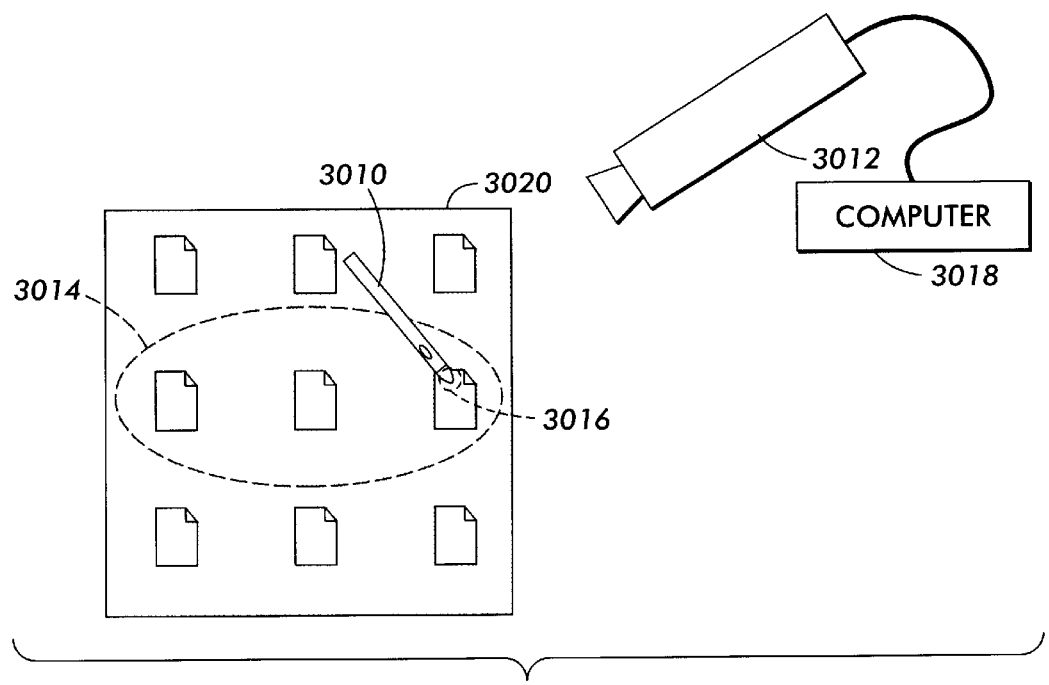
FIG. 30 is a block diagram showing glyph address carpet image capture based on selection using a handheld pointer.

FIG. 30 is a block diagram that illustrates a glyph address carpet 3020, which can be read by a pan and zoom camera 3012. The captured portion of glyph address carpet 3020 can then be processed by computer 3018. Camera 3012 scans glyph address carpet to determine whether handheld pointer 3010 is pointing to an area 3016 on glyph address carpet 3020. If handheld pointer 3010 is pointing to an area, camera 3012 captures the portion of the glyph address carpet near the area being pointed at, and transmits the captured portion to computer 3018.: Alternatively, or additionally, camera 3012 could capture wide area 3014 for processing in response to the selection.

Figure 31:
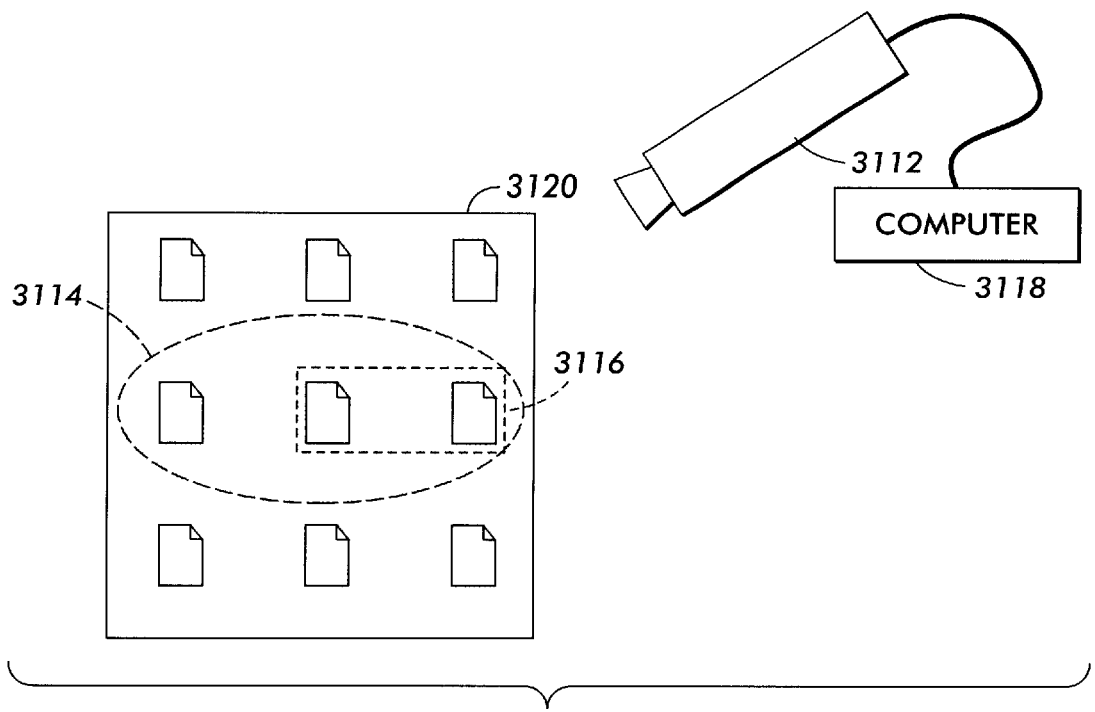
FIG. 31 is a block diagram showing glyph address carpet image capture based on selection using a highlighted area.

FIG. 31 is a block diagram that illustrates a glyph address carpet 3120, which can be read by a pan and zoom camera 3112. The captured portion of glyph address carpet 3120 can then be processed by computer 3118. Camera 3112 scans glyph address carpet 3120 for highlighted area 3116, and captures the portion of the glyph address carpet in the area defined by highlighting 3116. Highlighting 3116 could be any type of highlighting. For example, highlighting 3116 could be a color, a distinctive border, or even a checkmark or other type of handmade mark. Alternatively, or additionally, camera 3112 could capture wide area 3114 for processing in response to the selection.

Similarly, in one embodiment, device 3112 is a document image scanner that captures the image of a document having an address carpet graphical user interface image marked for selection (e.g., check, circle, highlight). The marks are recognizable by conventional techniques of image processing (e.g., color, black, white).

J. Multi-level Selection

Figure 32:
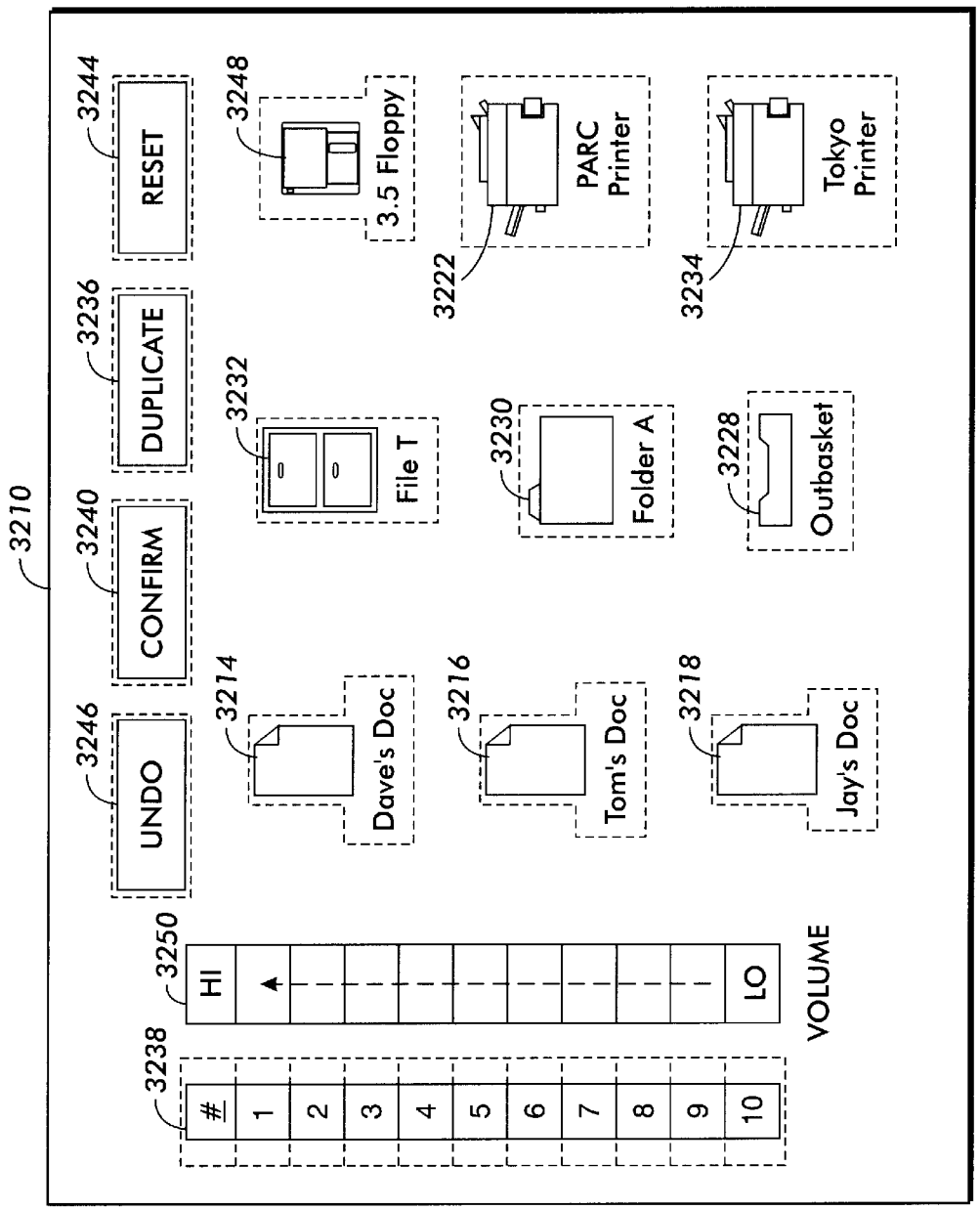
FIG. 32 illustrates a user interface 3210 having several icons that a user can select individually using camera pen 1710.

FIG. 32 illustrates a user interface 3210 having several icons that a user can select individually using camera pen 1710. User interface 3210 includes numeric icon 3238, volume control bar 3250, Undo icon 3246, Confirm icon 3240, Duplicate icon 3236, Reset icon 3244, Dave's Doc icon 3214, Tom's Doc icon 3216, Jay's Doc icon 3218, File T icon 3232, Folder A icon 3230, Outbasket icon 3228, 3.5 Floppy icon 3248, PARC Printer icon 3222, and Tokyo Printer icon 3234. The shaded background of user interface 3210 represents an embedded data code, such as glyphs. In FIG. 32, the embedded data code is an address code. Alternatively, the embedded data code could be implemented as a label.

To make a selection, the user uses an image capture device to select one of the graphic entities and capture embedded code. This might involve pointing to the graphic entity or placing the image capture device over the graphic entity, depending on the configuration of the graphic reading device (described above). The user then activates the selection by pressing a button. In response to the button press, the image capture device sends a captured image including embedded code to a computer, such as computer 1712 of FIG. 17, for further processing.

User interface 3210 can be implemented on any medium capable of having the embedded data-bearing image captured therefrom by an image capture device, such as a camera pen. For example, user interface 3210 could be implemented on a computer display screen, a piece of paper, or be projected on a wall. Capture devices could include, for example, a handheld camera, a remote camera, a digital copier platen, or other devices capable of capturing an image.

The broken lines around each graphic entity represent the hot zone for the graphic entity. The hot zone is the area within which the user must select in order for computer 1712 to get a valid reading that a particular graphic entity has been selected. It usually comprises the vicinity of the icon. The hot zone is typically not shown explicitly to the user, but is shown in FIG. 32 for purposes of illustration.

Figure 33:
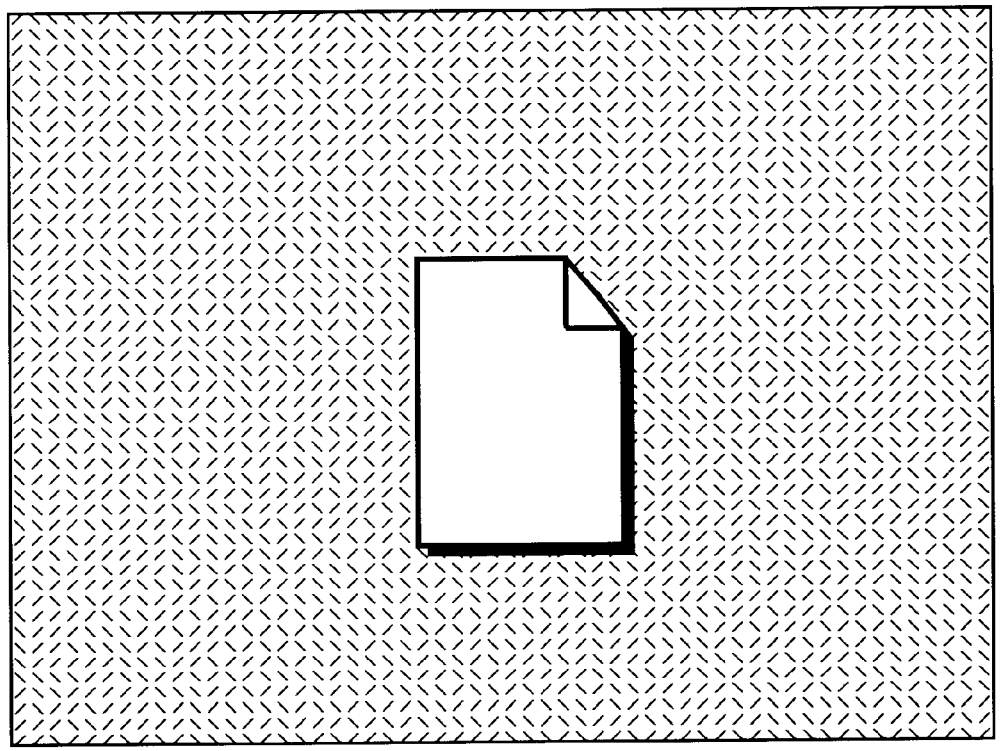
FIG. 33 illustrates an icon overlaying embedded codes.

FIG. 33 illustrates an icon overlaying embedded codes. The embedded codes in FIG. 33 are glyphs. This arrangement may be used to implement user interface 3210 (similar to the embodiment shown in FIG. 16). The image capture must be large enough to include sufficient embedded code to be decodable by computer 1712.

Figure 34:
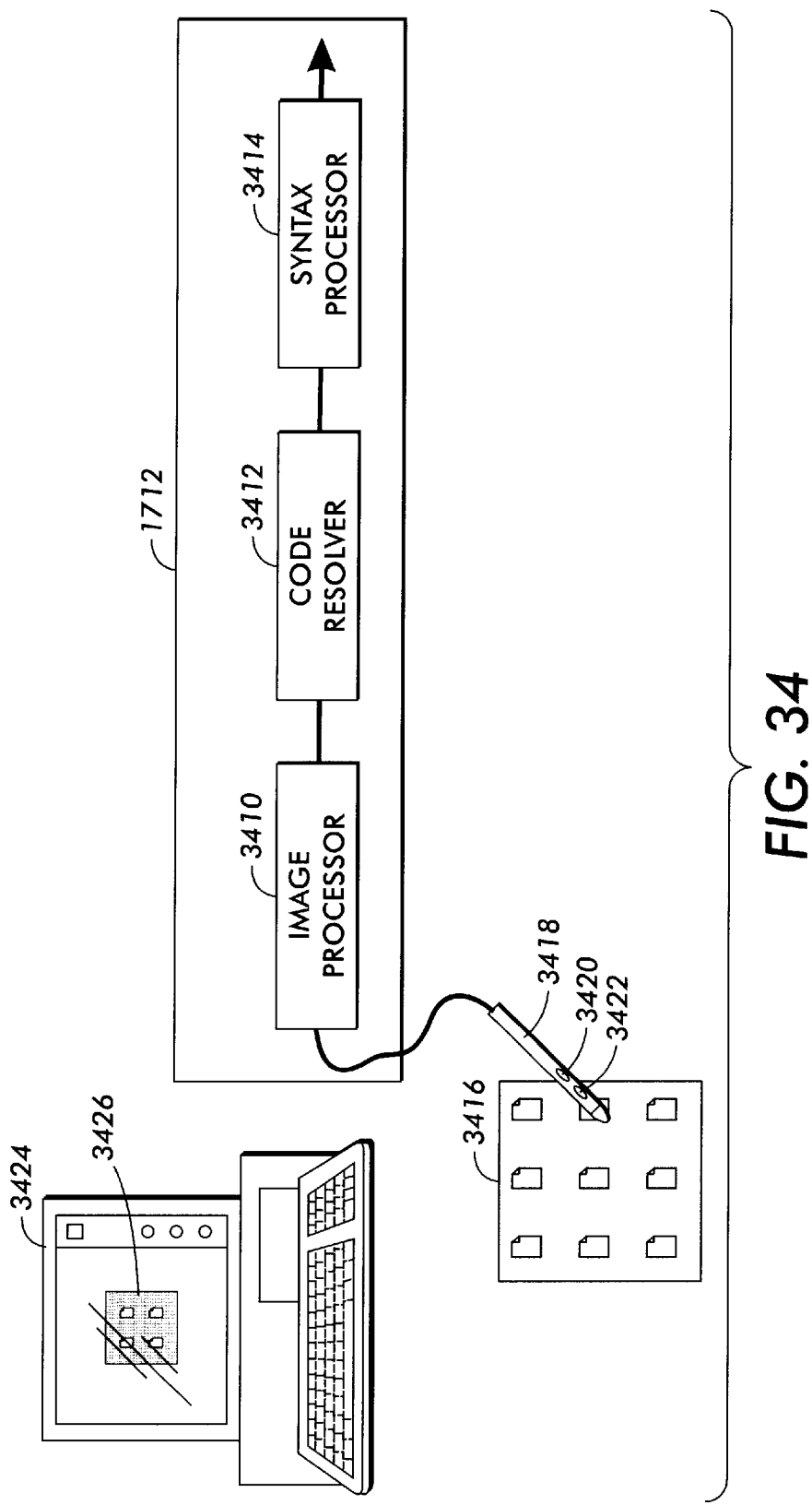
FIG. 34 is a block diagram illustrating the processes of computer 1712 that implement image capture, embedded data decoding, code resolving, and syntax decoding.

FIG. 34 is a simplified block diagram illustrating the processes of computer 1712 that implement user selection and processing of the user selection. More particularly, FIG. 34 illustrates the processes of image capture, image decoding, code resolving, and syntax decoding of user selections from interface 3210.

To activate a graphic entity from user interface 3416, the user uses camera pen 3418 to select the graphic entity and presses camera pen button 3422. In one embodiment, camera pen 3418 has two buttons, 3420 and 3422, that can be used in a manner similar to multiple mouse buttons in conventional computer mice. Computer 1712 responds to clicks from buttons 3420 and 3422 and interprets the clicks in conjunction with the one or more graphic entity selections by the user.

In response to the user pressing a button on camera pen 3418, camera pen 3418 captures an image from user interface 3416, and sends the image to image processor 3410. This process includes use of frame capture 1728 (not shown in FIG. 34). Each selection causes an image of embedded data, and possibly the selected icon or a portion of the icon, to be sent to image processor 3410 for processing.

Selections may also be made from other user interfaces. For example, the user may make graphic entity selections from a user interface 3426 from a display monitor 3424. Thus, a user may select graphic entities from paper user interface 3416, electronic display user interface 3426, or other user interface, and have the selections processed in an integrated manner by computer 1712.

Image processor 3410 processes the image in two steps. First, image processor 3410 converts the embedded data in the image to binary values. Second, image processor 3410 analyzes the binary values to develop an image capture code representing the captured image. As long as the image capture code represents an area within the hot zone of the particular graphic entity, computer 1712 will be able to resolve the image capture code into a corresponding selection code representing the selected computer entity or operation within the hot zone. After determining the image capture code, image processor 3410 passes the image capture code to code resolver 3412.

Code resolver 3412 resolves the image capture code into a selection code corresponding to a computer system entity or operation represented by the graphic entity selected by the user. To determine which graphic entity is selected, code resolver 3412 uses a mapping table (not shown) that correlates an image capture code to a selection code representing the selected graphic entity. For example, for user interface 3210 of FIG. 32, the mapping table maps all image capture codes within the hot zone for Dave's Doc icon 3214 to a selection code representing Dave's Doc icon 3214. Similarly, the mapping table maps all image capture codes within the hot zone for Undo icon 3246 to the selection code representing the Undo operation. Thus, code resolver 3412 determines which computer system entity or operation corresponds to the image capture code by using the mapping table, similar to the process described above with respect to FIG. 16. Code resolver 3412 then passes the selection code representing the selected graphic entity to syntax processor 3414.

In one embodiment, labels are used instead of address codes. In a label system, the image portion within a hot zone will always decode into a particular label (i.e., image capture code) corresponding to the selected graphic entity. It is possible to implement the labels so that there is no need for code resolver 3412 to perform the mapping step. In such a system, the label itself sufficiently identifies the computer system entity or operation.

Syntax processor 3414 receives selection codes from code resolver 3412, and outputs an operation code to computer 1712 when a particular combination of selection codes having a particular syntax is received. If a particular selection code or combination of selection codes is received, representing a particular graphic entity selection or combination of graphic entity selections by the user, syntax processor directs computer 1712 to perform an operation corresponding to the selection code or combination of selection codes.

Image processor 3410, code resolver 3412 and syntax processor may be implemented as hardware software, or a combination of hardware and software. If implemented in whole or in part as software elements, those software elements may be stored on a disk, or transferred over a network as a signal. Software elements implementing all or part of the apparatus and methods consistent with the invention as disclosed herein may be stored as program components or modules on a computer readable and usable medium.

Computer 1712 may provide feedback to the user at appropriate times during the processing of selections by the user (not shown). The feedback may be any type of sensory feedback, such as audio, visual, or tactile, similar to conventional systems. For example, if a computer screen is connected to computer 1712, feedback may be visual, such as by;highlighting or animation. Feedback may be used, for example, as part of syntax processing to notify the user that a particular selection has been made, or a particular series of selections have been made.

Multi-level selection involves user selection of a series of graphic entities that, when interpreted together by computer 1712, causes computer 1712 to perform an operation or select a computer system entity. Using multi-level selection, when the user wants computer 1712 to perform an operation, the user selects a series of graphical entities on user interface 3210 by sequentially placing camera pen 3418 to select individual graphic entities of the interface, and pressing button 3422 to select each entity. Each time button 3422 is pressed, the image under the tip of camera pen 3418 is sent to computer 1712. Image processor 3410 receives each image and decodes the embedded data in the image to form an image capture code corresponding to the capture, code resolver 3412 maps the image capture code into a selection code, and syntax processor 3414 analyzes the received selection codes as they are received, and performs an operation when the particular combination of codes received has appropriate syntax and values.

For example, if a user first selects David's Doc icon 3214 and then PARC Printer icon 3222, computer 1712 prints the document associated with David's Doc icon 3214 on the printer associated with PARC Printer icon 3222. Other operations are performed in response to other selections of graphic entities. For example, a document icon may be selected, followed by selection of Outbasket icon 3228, to place the document in the electronic outbasket file in computer 1712 that is associated with the Outbasket icon 3228. Document icon selection might be followed by selection of Folder A icon 3230, to copy the document to a an electronic folder in computer 1712 that is associated with Folder A icon 3230. Alternatively, a document may be selected, followed by selection of File T icon 3232, to copy the document to an electronic file in computer 1712 that is associated with File T icon 3232.

Selection of certain graphic entities in user interface 3210 augments or assists in the functionality of user interface 3210. For example, computer 1712 can be programmed to respond to selection of graphic entities that are typical menu items on conventional graphical user interfaces. Thus, selecting Undo icon 3246 allows the user to undo one or more levels of selection or operations. Selection of Confirm icon 3240 allows the user to confirm information if requested to do so. For example, computer 1712 might request confirmation of a requested it operation by outputting a voice on a speaker requesting confirmation. Selection of Reset icon 3244 allows the user to delete all previous selections. Selection of a document icon, followed by selection of Duplicate icon 3236 duplicates the selected document.

Numeric icon 3238 allows a user to enter numerical information associated with the operations to be performed by computer 1712. For example, to enter "22," the user selects "2," "2," and "#" (selecting "#" indicates end of selection). Thus, if the user wants 22 copies of Jay's Doc printed on the Tokyo printer, the user selects "2," "2," "#," Jays Doc icon 3218, and Tokyo Printer icon 3234. Computer 1712 receives the image for each selection and decodes the embedded data captured in the image into selection codes representing the selections "2," "2," "#," Jay's Doc icon 3218, and Tokyo Printer icon 3234. Computer 1712 interprets this series of selection codes to mean that the user wants 22 copies of the document Jay's Doc printed on the Tokyo printer, and prints the copies on the Tokyo printer. In another embodiment, an entire keyboard or multiple alternative keyboards could be provided as printed graphical user interfaces.

By selecting a position along Volume control bar 3250, a user may select the level of speaker volume for computer 1712. A graphic entity such as Volume control bar 3250 takes advantage of the fine level of position selection available with an embedded code. For example, if a glyph address carpet is used, each glyph of the address carpet has its own unique address. Thus, Volume bar 3250 can take advantage of this fine level of detail to provide a practically infinite range of volume level values from Hi to Lo along the vertical direction.

Computer 1712 performs operations in response to a single user selection or series of user selections. Operations are also performed in response to multiple selections of the same graphic entity, either alone or in combination with other selections.

In summary, computer 1712 can be programmed to respond to individual or combinations of graphic entity selections to perform corresponding functions performable by the computer. Additionally, computer 1712 can be programmed to perform operations in response to one or more button signals from camera pen 3418, or signals from other user input devices. Each input device, including camera pen 3418, may have one or more buttons, and each button may be interpreted distinctly as a separate signal.

Figure 35:
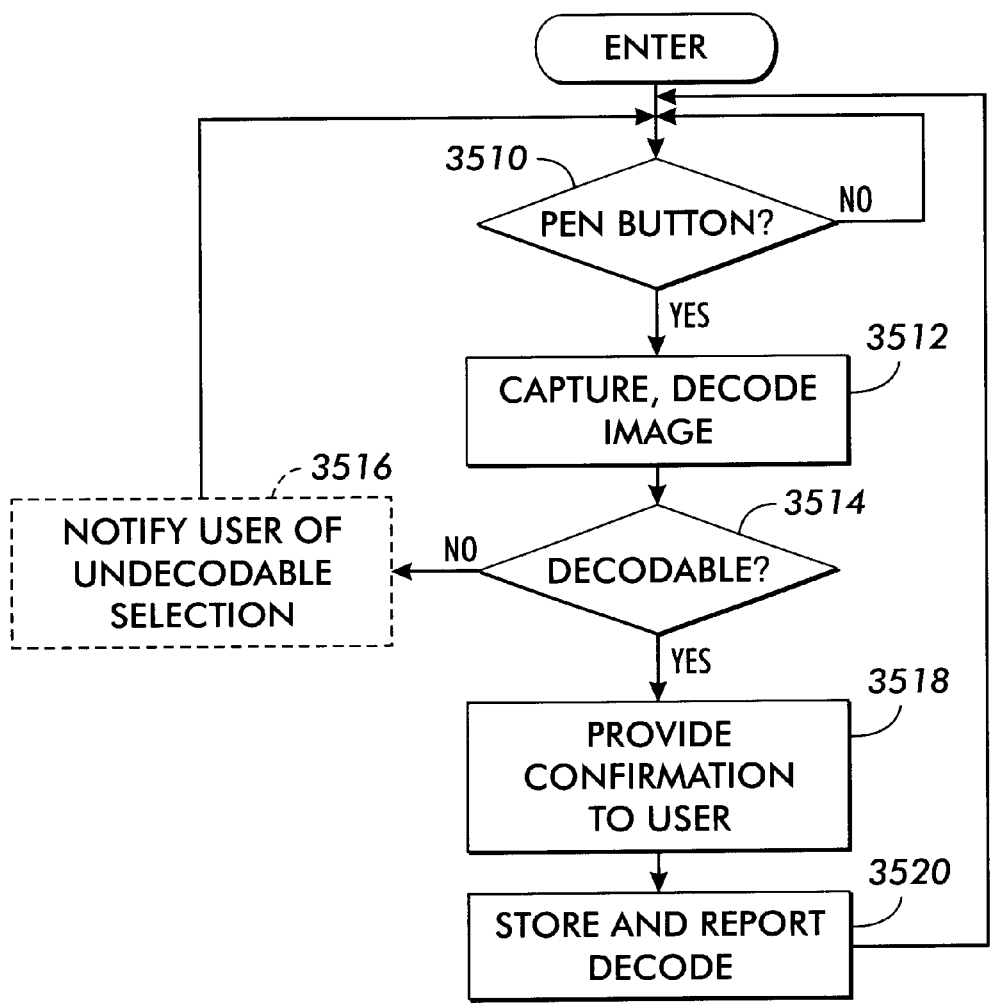
FIG. 35 is a flowchart showing the processing performed by computer 1712 when receiving a selection from the user.

FIG. 35 is a flowchart showing the processing performed by code resolver 3412 when receiving a selection from the user. Code resolver 3412 first waits for a signal indicating that button 3422 on camera pen 3418 has been pressed (step 3510). In response to the signal, code resolver 3412 captures and decodes the image from camera pen 3418 into an image capture code (step 3512). If the image is not decodable (step 3514), code resolver 3412 may signal the user that the selection is not decodable (step 3516), and processing continues by waiting for the next signal indicating that button 3422 on camera pen 3418 has been pressed (step 3510).

If the image is decodable (step 3514), a selection confirmation is preferably provided to the user (step 3518), the image capture code is mapped to a selection code, and the selection code is sent to syntax processor 3414, for storage with other unresolved pending selection codes, if any (step 3520). Syntax processor 3414 buffers the selection codes until the pending selection codes represent an operation to be performed.

Figure 36:
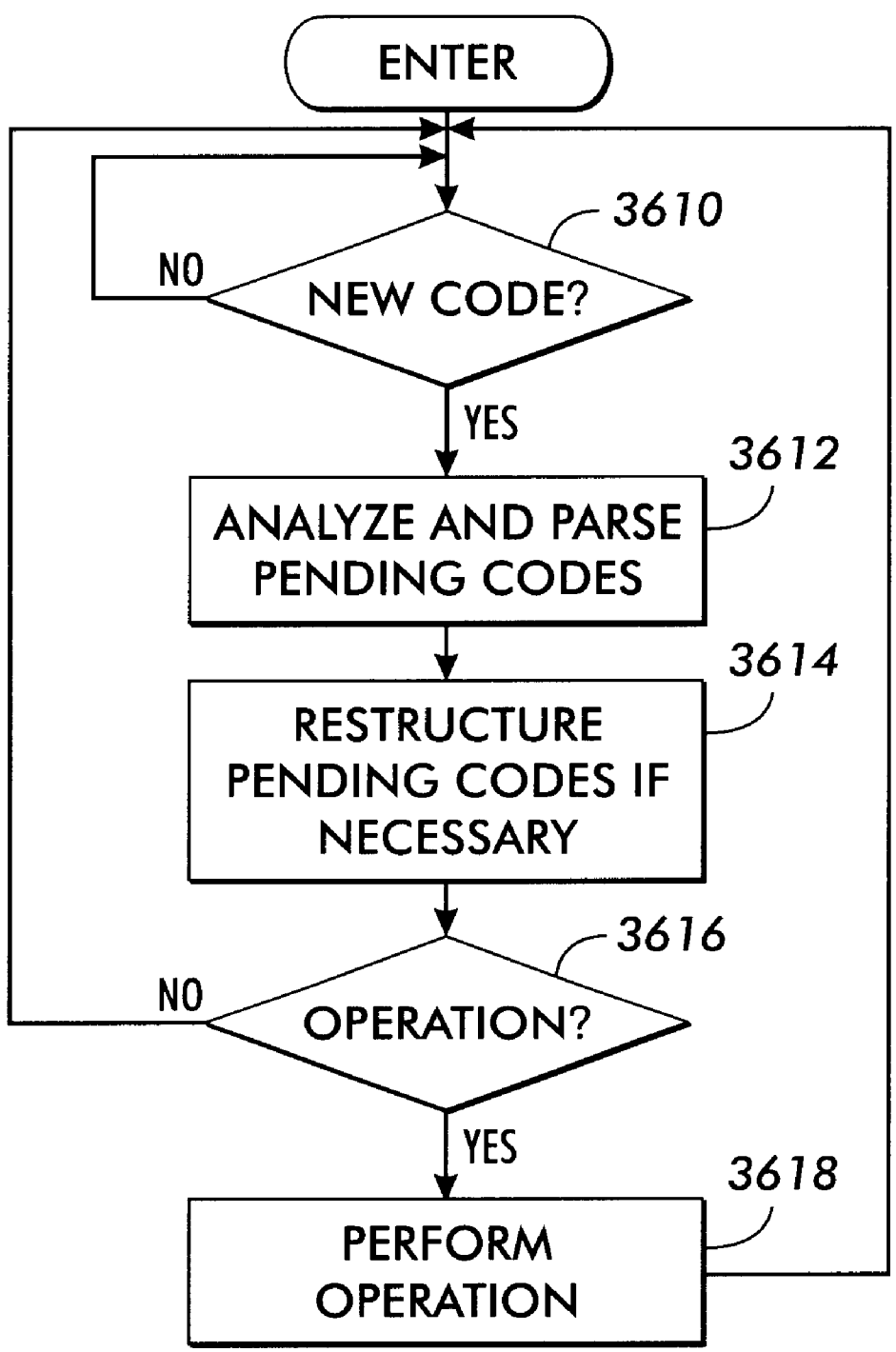
FIG. 36 is a flow chart showing the processing performed by computer 1712 in response to decoded embedded data information.

FIG. 36 is a flow chart showing the processing performed by syntax processor 3414. Syntax processor 3414 first waits until a new selection code is received from code resolver 3412 (step 3610). When anew selection code is received, syntax processor 3414 stores the new selection code with pending selection codes from previous selections, if any, in the order received. Syntax processor 3414 then analyzes and parses the pending selection codes to determine whether the pending selection codes collectively or individually indicate that any operations should be performed (step 3612). Syntax processor 3414 analyzes the pending selection codes for sequences or combinations of selection codes that meet predetermined criteria indicating that an operation should be performed.

Syntax processor 3414 also analyzes the pending selection codes to determine whether the codes should be restructured (step 3614). Restructuring may involve changing the order of pending selection codes or deleting pending selection codes. One or more pending selection codes may be removed if the selection codes indicate a selection sequence or combination that requires removal of codes based on the syntax. For example, a system may be implemented where a user selects a first document icon, using camera pen 3418 and then performs an inclusive selection of a second document icon by selecting the second document icon and double clicking camera button 3422. In this case, the sequence of codes would be recognized as an inclusive selection, and syntax processor 3414 would keep both codes pending. If, however, the first document icon is selected, and followed by a non-inclusive selection of a second document icon, restructuring step 3614 would drop the code corresponding to the first document icon because the selection was non-inclusive. This is equivalent to clicking on a first icon, and then clicking on a second icon, for non-inclusive selection in some conventional systems.

If syntax processor 3414 determines at step 3612 that the pending selection codes do not indicate an operation, syntax processor 3414 returns to waiting for new selection codes (step 3616). If syntax processor 3414 determines at step 3612 that the pending selection codes represent an operation (step 3616), the operation is performed (step 3618), and syntax processor 3414 again begins waiting for the next selection code (step 3610).

Figure 37:
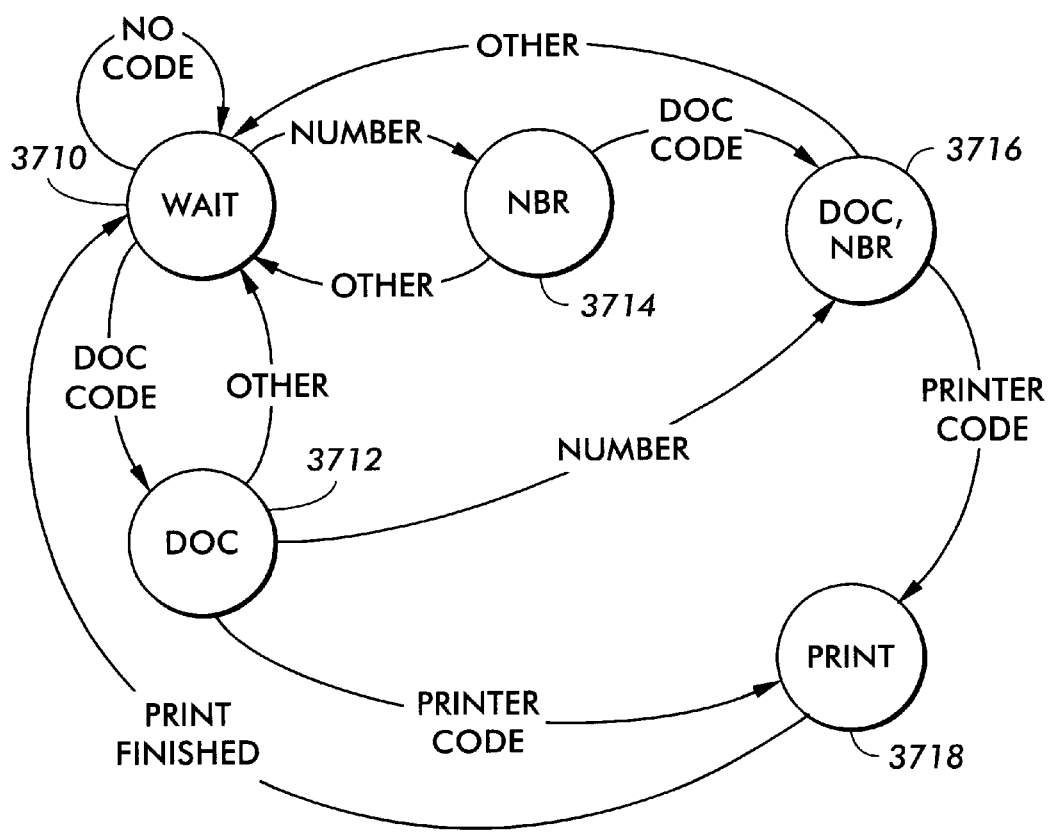
FIG. 37 is a block diagram of the elements used by computer 1712 when determining whether the pending codes collectively represent an operation to be performed.

FIG. 37 is a block diagram of an example of a state diagram that may be implemented by syntax processor 3414 when performing the flow chart of FIG. 36. Syntax processor 3414 starts in a WAIT state 3710. As long as no selection codes are received, syntax processor 3414 remains in WAIT state 3710. If syntax processor 3414 receives a document selection code, syntax processor 3414 moves to the DOC state 3712. If a selection code other than a number or printer selection code is received, syntax processor 3414 returns to WAIT state 3710. If a number selection code is received, however, syntax processor 3414 moves to DOC, NBR state 3716, indicating that a document selection code and number selection code have been received. If a printer selection code is received, syntax processor 3414 moves to the PRINT state 3718 to print the selected document. After printing is finished, syntax processor 3414 returns to WAIT state 3710.

If syntax processor 3414 is in WAIT state 3710 and a number selection code is received, syntax processor 3414 moves to NBR state 3714. If a selection code other than a document selection code is received, syntax processor 3414 returns to WAIT state 3710. If a document selection code is received, however, syntax processor 3414 moves to DOC, NBR state 3716.

From DOC, NBR state 3716, if a selection code other than a printer selection code is received, syntax processor 3414 moves to WAIT state 3710. If a printer selection code is received, however, syntax processor 3414 moves to PRINT state 3718 to print the document the specified number of times on the specified printer. After printing is finished, syntax processor 3414 returns to WAIT state 3710.

The state diagram of FIG. 37 is only representative of a state diagram that could be used by syntax processor 3414 to process incoming selection code signals. The complexity and particular syntax processing will change from system to system. Embodiments might also include moving between states based on device buttons or other user selections in addition to selection codes.

K. Multi-level Selection With Context

Figure 38A:
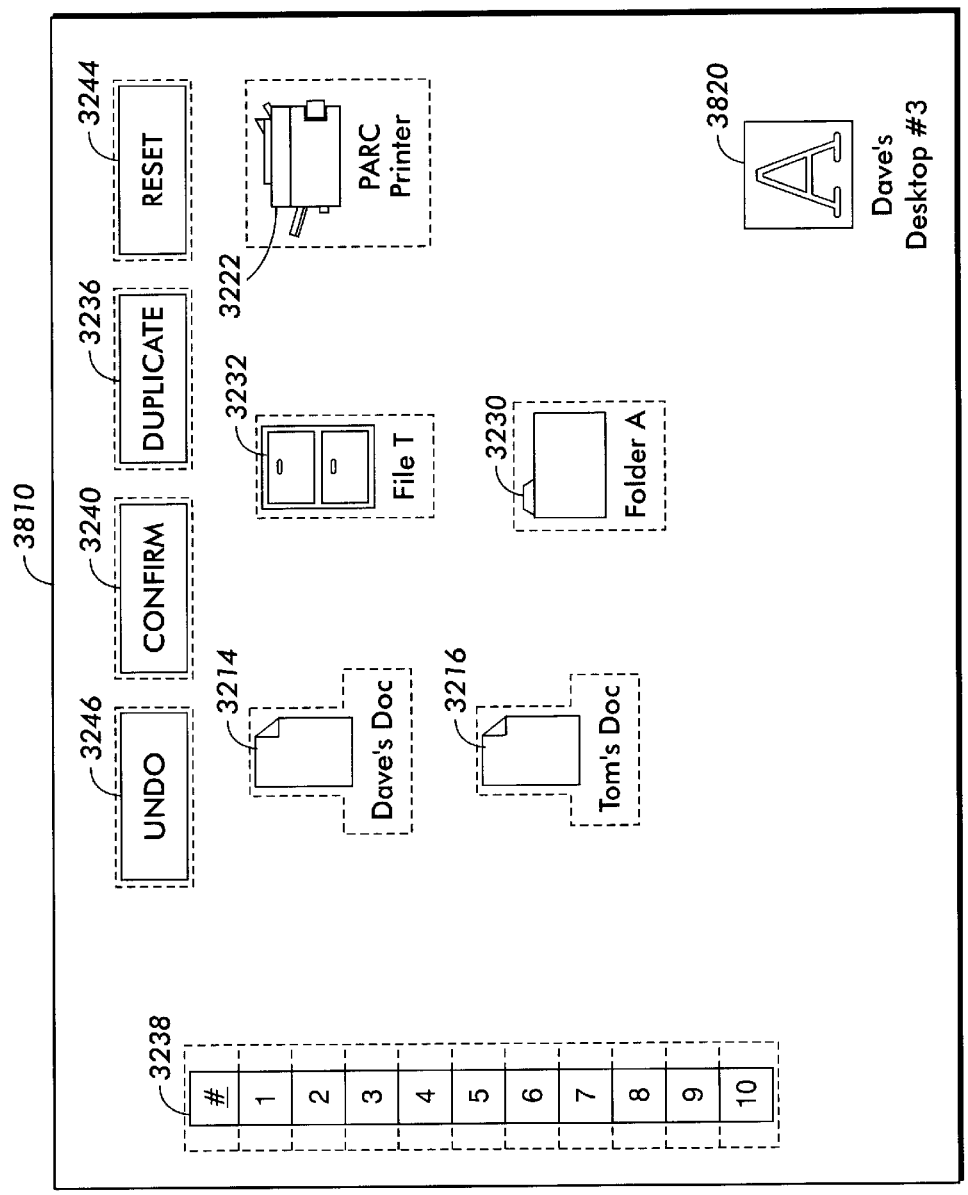
FIGS. 38(a) and 38(b) illustrate user interfaces 3810 and 3812, respectively, each having respectively different contexts.
Figure 38B:
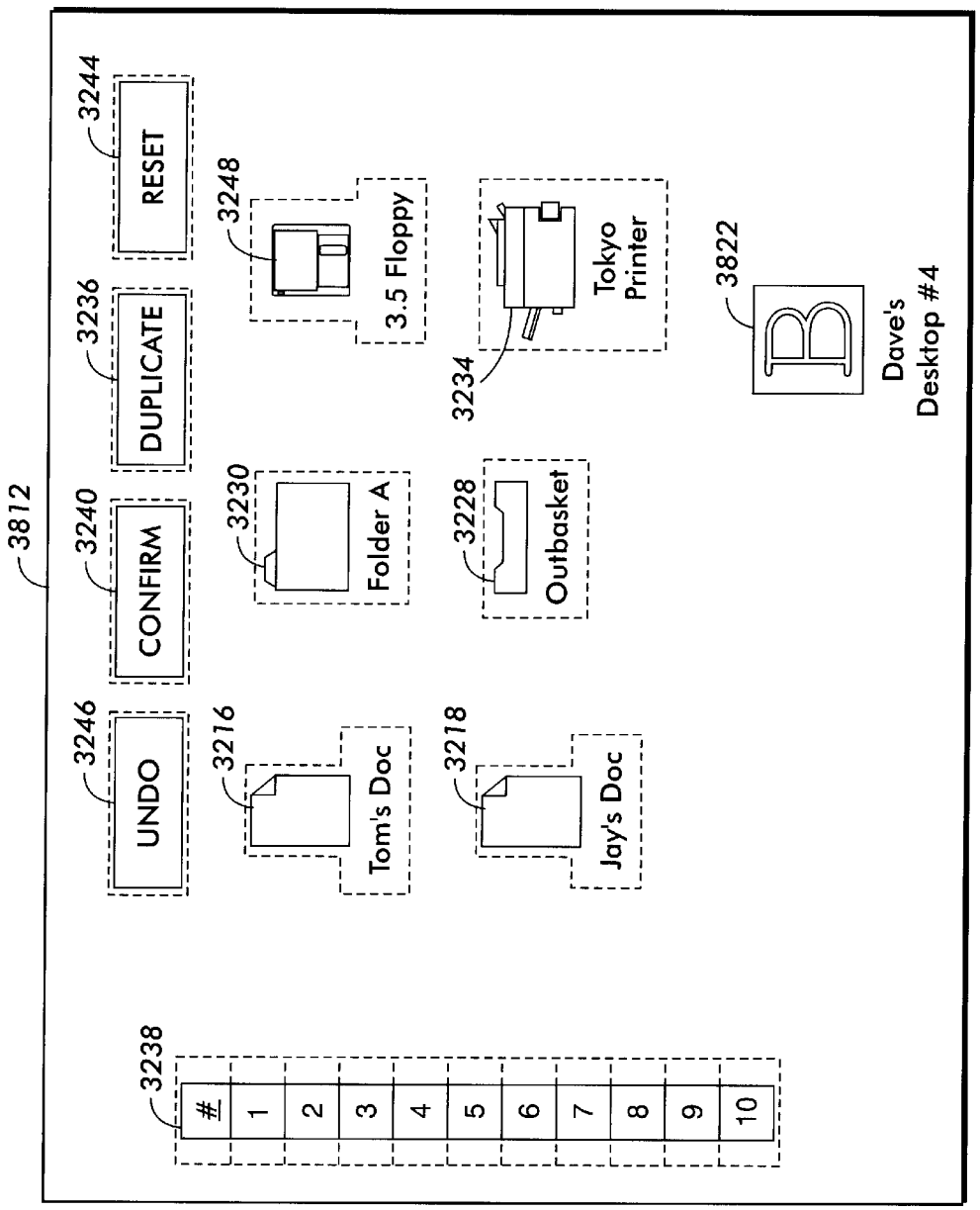

FIGS. 38(a) and 38(b) illustrate user interfaces 3810 and 3812. User interfaces 3810 and 3812 are similar to user interface 3210, but include context icons. The context icons direct computer 1712 to operate in respectively different contexts when processing user interface 3810 or 3812. Context for user interface 3810 is selected using Dave's Desktop #3 icon 3820, whereas context for user interface 3812 is selected using a Dave's Desktop #4 icon. When selected, each context icon causes computer 1712 to use respective combinations of mapping and syntax processing modules. The context icons are graphically associated with an apparent area containing embedded data code that must be substantially captured to provide the context code. Partial capture may be enabled by error correction codes. For example, the visible boundary marking on the context icon of FIGS. 38(a) and 38(b) is an example of the apparent area.

To select Dave's Desktop #3 icon 3820, the user uses camera pen 3418 to select Dave's Desktop #3 icon 3820 as described above w with respect to the graphic entities of FIG. 32. After Dave's Desktop #3 icon 3820 is selected, the remaining selections from user interface 3810 will be mapped and processed syntactically based on the context code derived from Dave's Desktop #3 icon 3820. Similarly, after Dave's Desktop #4 icon 3820 is selected, the remaining selections from user interface 3812 will be mapped and processed syntactically based on the context code derived from Dave's Desktop #4 icon 3820.

Figure 39A:
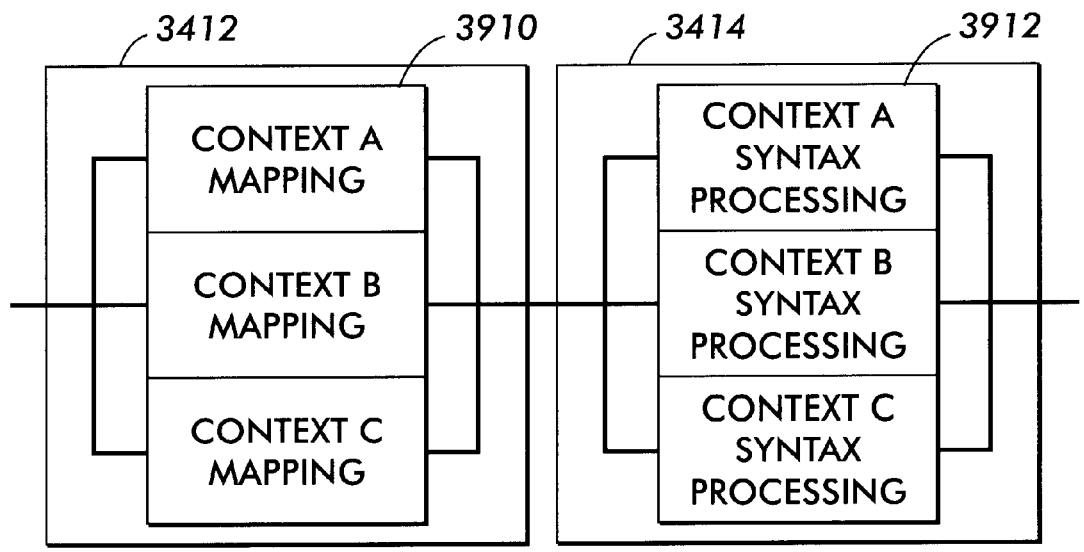
FIGS. 39(a), 39(b), 39(c), and 39(d) show logical representations of embodiments of code resolver 3412 and syntax processor 3414.
Figure 39B:
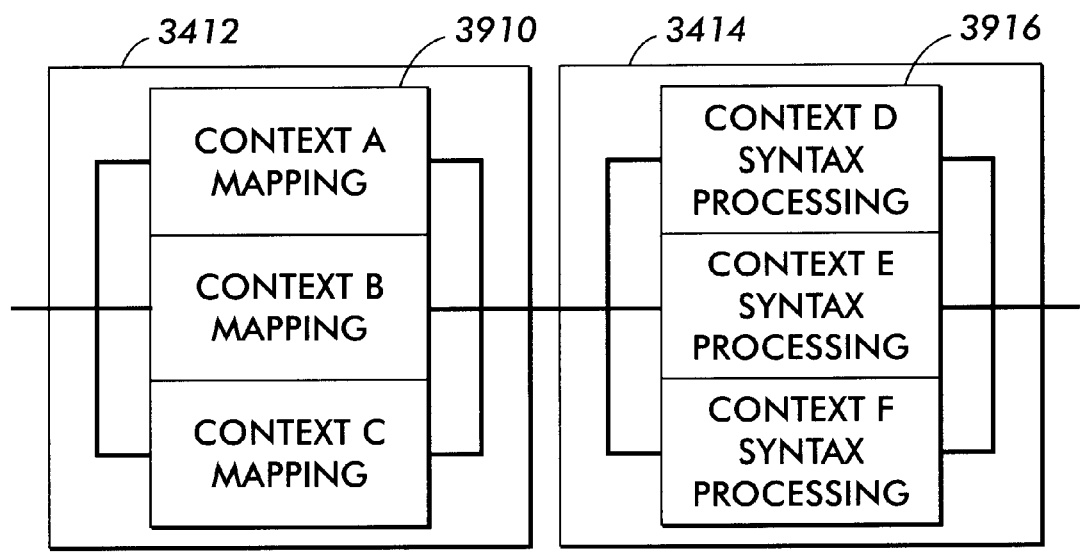
Figure 39C:
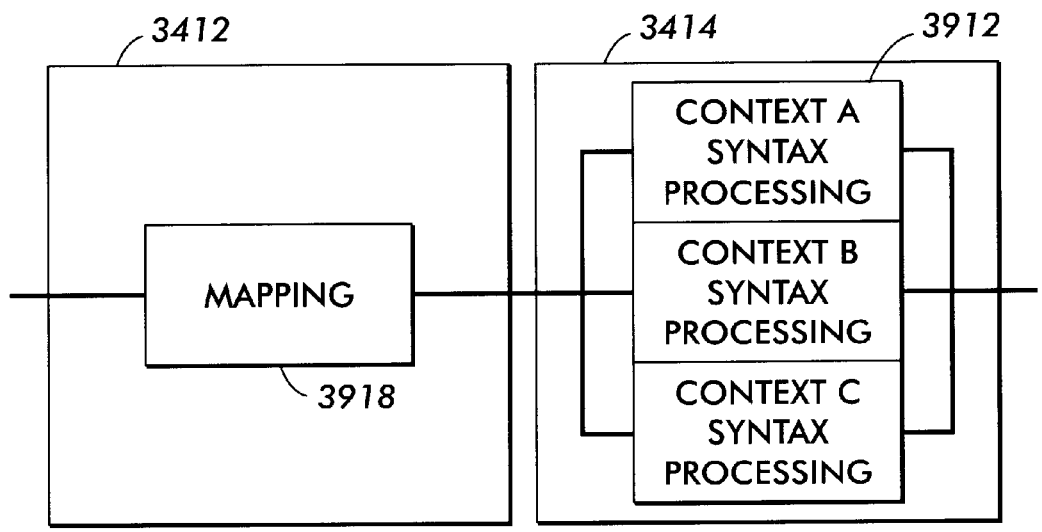
Figure 39D:
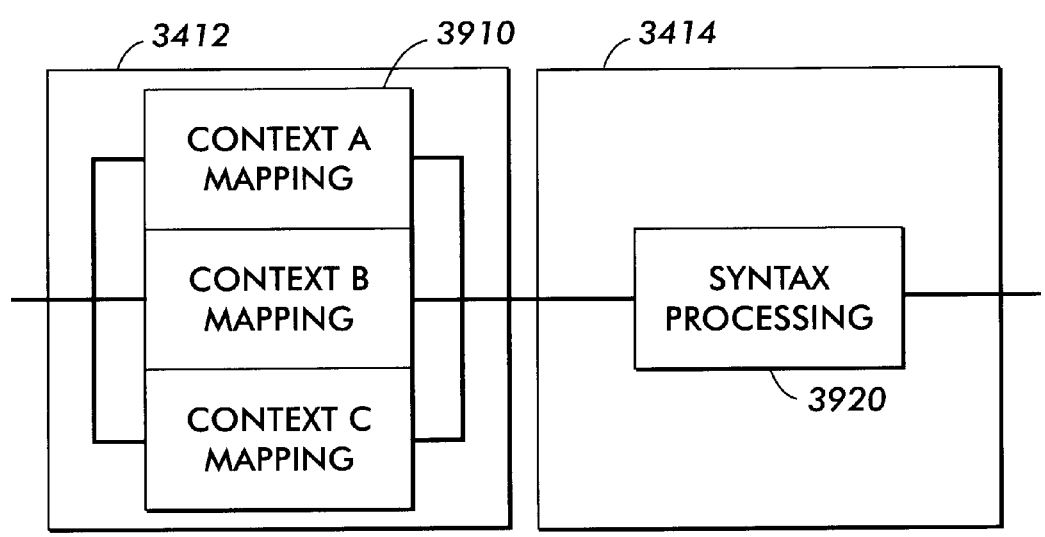

FIGS. 39(a), 39(b), 39(c), and 39(d) show respective logical representations of embodiments of code resolver 3412 and syntax processor 3414. FIG. 39(a) illustrates an embodiment wherein code resolver 3412 includes multiple mapping modules 3910 and multiple syntax processing modules 3912 corresponding to respective contexts. Thus, when a user selects a context graphic entity, the corresponding context mapping module of code resolver 3412 and syntax processing module of syntax processor 3414 are used from that point on until the context is changed by the system or the user. For example, if context icon A is selected, from that point on context A mapping module and context A syntax processing module are used.

FIG. 39(*b*) illustrates a variation of FIG. 39(*a*). In FIG. 39(*b*), mapping modules 3910 and syntax processing modules 3916 are independently selected. For example, a user might select context A mapping module, and context E syntax processing module. This embodiment is in contrast to the embodiment of FIG. 39(*a*), where sets of mapping and syntax processing modules are selected by a single context code.

FIG. 39(*c*) illustrates another embodiment of code resolver 3412 and syntax processor 3414. In this embodiment, mapping is always performed by mapping module 3918, irrespective of context. Syntax processor 3414, however, is context selectable to provide syntax processing by one of syntax processing modules 3912 as selected by the user or the system.

FIG. 39(*d*) illustrates another embodiment of code resolver 3412 and syntax processor 3414 wherein mapping context can be chosen by the user or system, but syntax processing is performed the same, irrespective of context, by syntax processing 3920.

The embodiment shown in FIG. 32 represents a fixed context system. This embodiment comprises a single mapping module in code resolver 3412 and a single syntax processing module in syntax processor 3414 (not shown).

Changing context allows a much broader range of functionality and flexibility, allowing operations performed in response to a particular selection of graphic entities to vary from context to context. For example, multiple user interfaces may each utilize the same embedded code address space, but by providing each with a unique context, the mapping for each respective user interface can be entirely different.

Moreover, context may be selected by virtually any form of user input or by the system. For example, an embedded code user interface could be used in conjunction with a web page. The web page would provide the context for mapping, syntax, or both, for the user interface.

Figure 40:
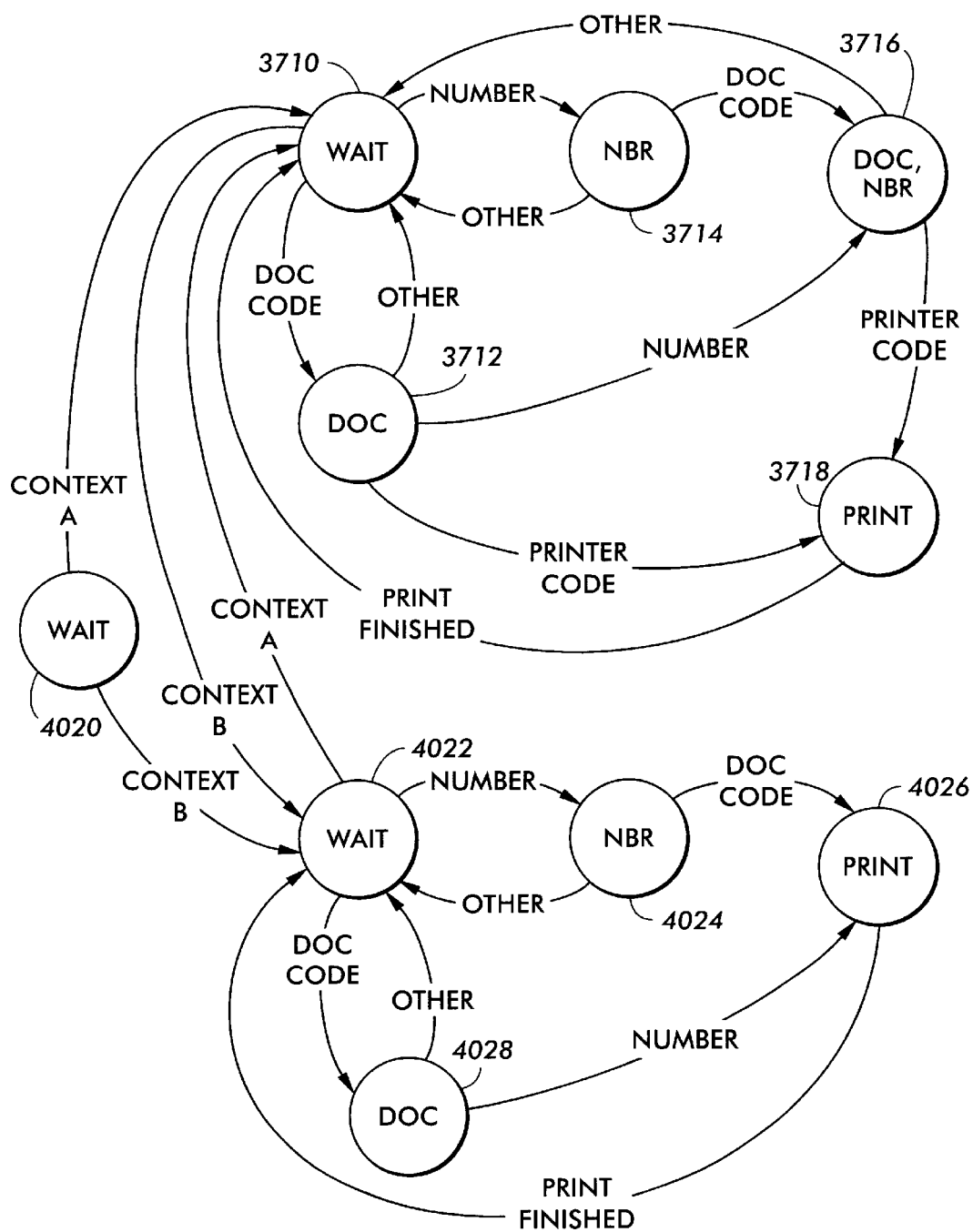
FIG. 40 illustrates a state diagram showing processing of incoming codes using context-based syntax processing.

FIG. 40 illustrates an example of a state diagram that may be used to implement a context-based user interface, such as shown in FIGS. 38(*a*) and 38(*b*). The upper half of the state diagram represents a first context A, and the lower half of the state diagram represents a second context B. State diagram elements WAIT state 3710, DOC state 3712, NBR state 3714, DOC, NBR state 3716 and PRINT state 3718 are the same states as shown in FIG. 37.

Beginning at WAIT state 4020, syntax processor 3414 waits for a context selection code from a user. If the user selects a context icon, such as Dave's desktop #3 icon 3820, indicating context A, syntax processor 3414 moves from WAIT state 4020 to WAIT state 3710. Processing continues as described above in connection with FIG. 37. Thus, as in FIG. 37, the syntax required for context A is that a combination of document/number/printer, number/document/printer, or document/printer be selected.

While in WAIT state 4020 or WAIT state 3710, if the user selects a context icon indicating context B, syntax processor 3414 moves to WAIT state 4022. In context B, user input is processed according to the syntax required by WAIT state 4022, DOC state 4028, NBR state 4024 and PRINT state 4026. From WAIT state 4022, if the user selects a number, syntax processor 3414 moves to NBR state 4024. If a document selection code is received, syntax processor 3414 moves to state DOC 4028. If the user then selects a number, syntax processor 3414 moves to PRINT state 4026, causing computer 1712 to print the document, and returns to WAIT state 4022.

If syntax processor 3414 is at WAIT state 4022, and a number is received, syntax processor 3414 moves to NBR state 4024. If a document selection code is then received, syntax processor 3414 moves to PRINT state 4026, the document is printed and syntax processor 3414 returns to WAIT state 4022. Note also that from WAIT state 4022, if a context A selection code received, processor 1712 moves to WAIT state 3710.

In summary, context A requires a combination of document/number/printer, number/document/printer, or document/printer be selected. Context B merely requires document/number or number/document. Thus, in context B, the printer is already chosen, so computer 1712 will print the document after only receiving a document and number. In context A, however, the printer must be selected.

The state diagrams of FIG. 37 and FIG. 40 represent simplified syntax processing. Systems will typically have more complex state diagrams that can be implemented for any combination of user selections to result in selection of a computer function.

Figure 41:
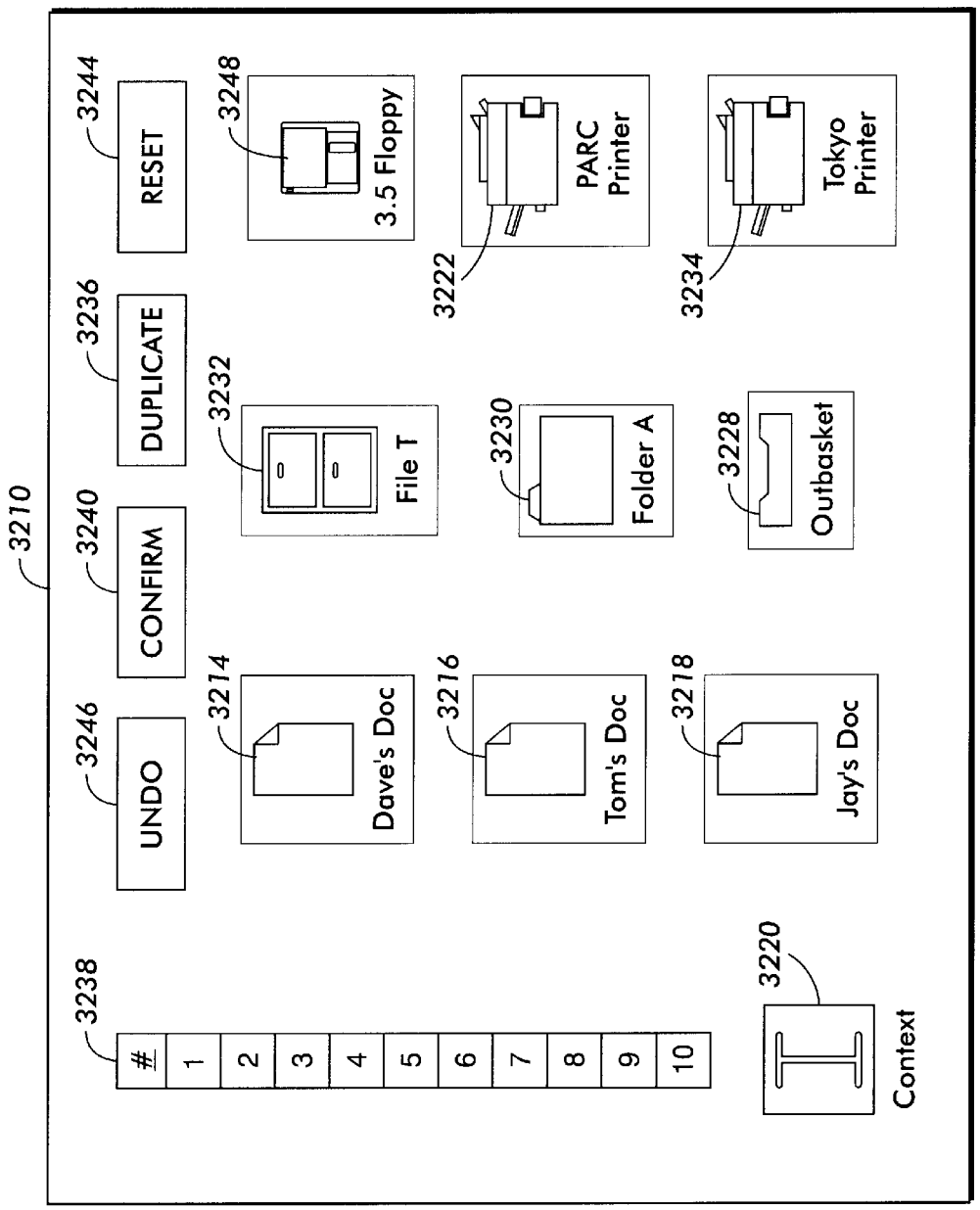
FIG. 41 illustrates a user interface embodiment similar to the interface shown in FIG. 32, but is implemented using explicitly marked hot zones around the graphic entities.

FIG. 41 illustrates a user interface embodiment similar to the interface shown in FIGS. 32, 38(*a*), and 38(*b*), but is implemented using a visual border block around the graphic entity instead of implicit hot zones, which are not visible. When a user places the tip of camera pen 3418 within the border, an image of embedded data will be captured when a button is pushed that will yield a selection code corresponding to the graphic entity within the block.

L. Distributed Context Code

The context-based system of FIGS. 38(*a*), 38(*b*) and 41 may also be implemented using an embedded context code, thus obviating the need for an explicit localized context icon. In one embodiment, context is implemented by a coding system that embeds context codes with location codes in the embedded data. Thus, when computer 1712 decodes a captured image, the decoding provides both a location and a context. Such a coding system may be called a distributed labeling code. For example, see FIGS. 10, 11, and 12. User interface embodiments similar to those shown in FIG. 41 may also be implemented without context icons by embedding one or more context codes in the coding system. Context codes and address codes may be interleaved using an approach similar to that shown in FIG. 5.

M. Multi-Level With Context Selection Example

Figure 42:
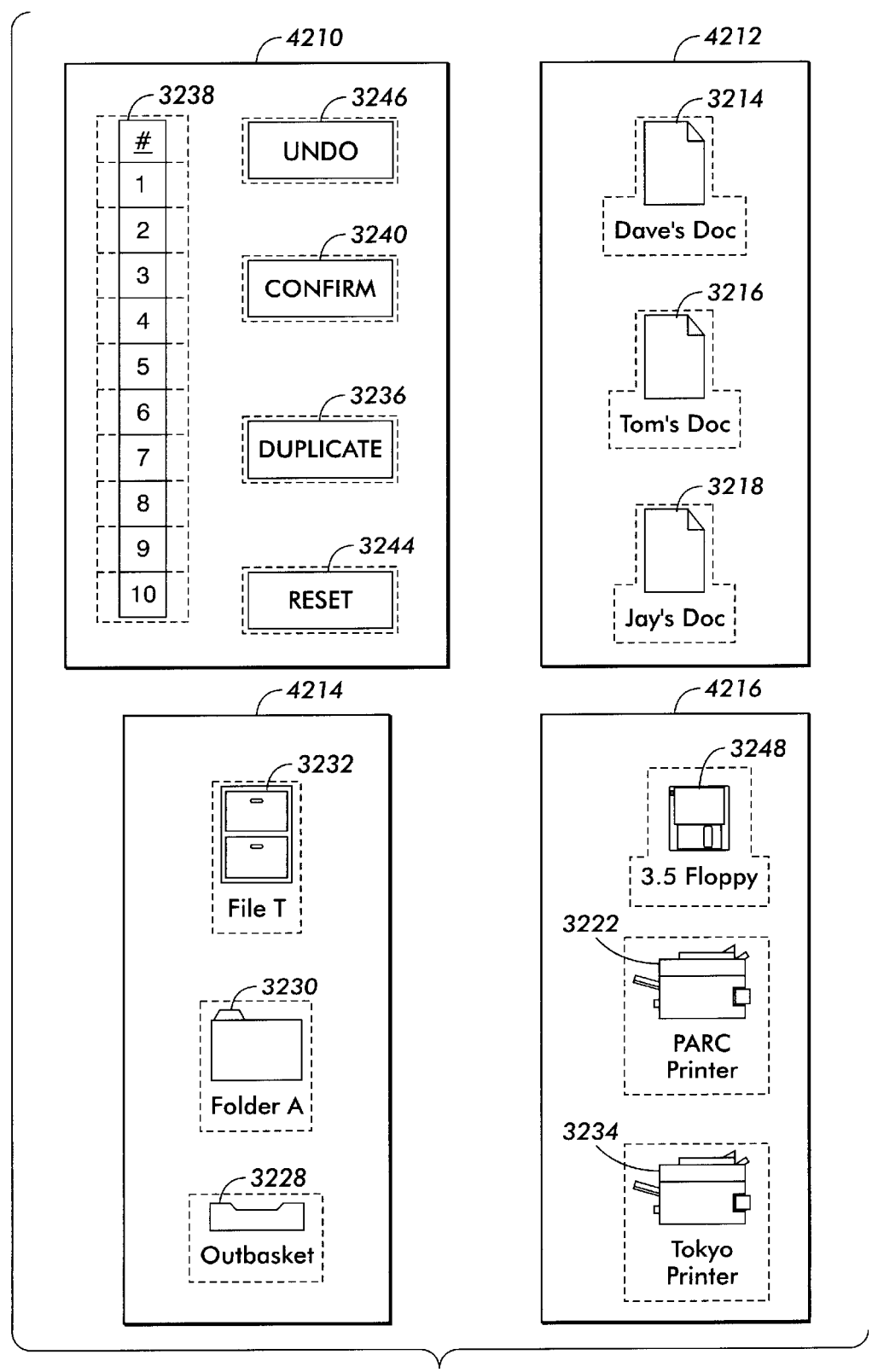
FIG. 42 is a block diagram illustrating a variety of different user interfaces which may be used to select various computer system entities and functions.

FIG. 42 is a block diagram showing the use of multiple sections of user interface, each on a separate substrate. The embodiment also illustrates grouping icons by related graphic entities. User interface 4210 is comprised of graphic entities that augment the selection process, user interface 4212 carries document graphic entities, user interface 4214 includes document storage graphic entities, user interface 4216 comprises input/output device graphic entities, and user interface 4218 includes context A icon 4220 and context B icon 4222. A user may make selections from any of the user interface sections shown in FIG. 42 to cause computer 1712 to perform operations. Thus, FIG. 42 illustrates the flexible nature of the image capture user interface disclosed herein. Physically, the user interface sections could be different types of substrates, as in paper prints, electronic screen, and image projection on a wall or screen.

Moreover, each user interface portion could be implemented using different types of embedded codes. For example, one portion could be implemented using label codes, whereas another portion might be implemented using address carpets. Additionally, a single portion of user interface could incorporate multiple types of embedded data codes.

N. Superimposed Interfaces

Interface portions may include superpositions of embedded data printing and graphical element printing, such as multi-color printing, image projection on a print, or superposition of multiple projected images. Care must be taken to establish and maintain a logical and spatial registration of the superimposed images.

O. Examples

Figure 43:
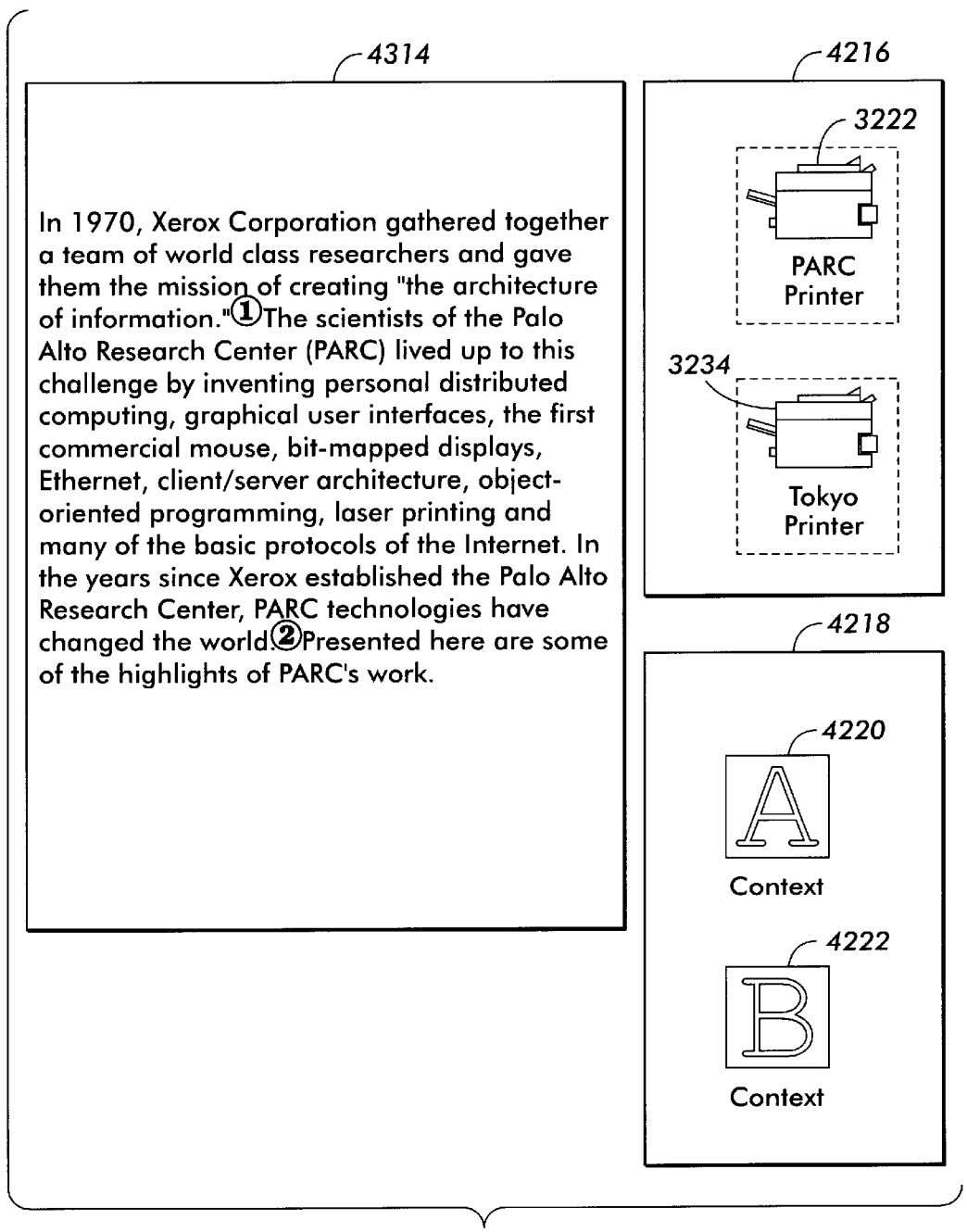
FIG. 43 illustrates the principles of the invention in a document processing environment including a text document.

FIG. 43 is a block diagram illustrating multilevel selection in a document processing environment. Document 4314 is comprised of text overlaying embedded data, as indicated by the background gray area. The user selects text by first making a selection at the beginning of the selection of interest (indicated by "1"), and then making a second selection at the end of the portion of interest, in this case the end of the sentence (indicated by "2"). To print, the user then selects either PARC Printer icon 3222 or Tokyo Printer icon 3234, which results in printing out the selected text on the selected printer. Other variations of this general multilevel selection scheme illustrated in FIG. 43 may be utilized for other text and document processing operations.

Document processing can also take advantage of the fine level of selection offered by address carpets and other embedded data. Because each location is decoded into a different code, a user can select a fine level of detail, typically one glyph in the case of glyph address carpets. On a 300 dpi print, glyph spacing may be, for example, 60/inch, which is comparable to conventional screen resolution. Thus, text selections can be performed using camera pen 3418 which mimic the operations performed by a conventional mouse and electronic user interface. Moreover, interpolation between glyphs can extend selection resolution.

Figure 44:
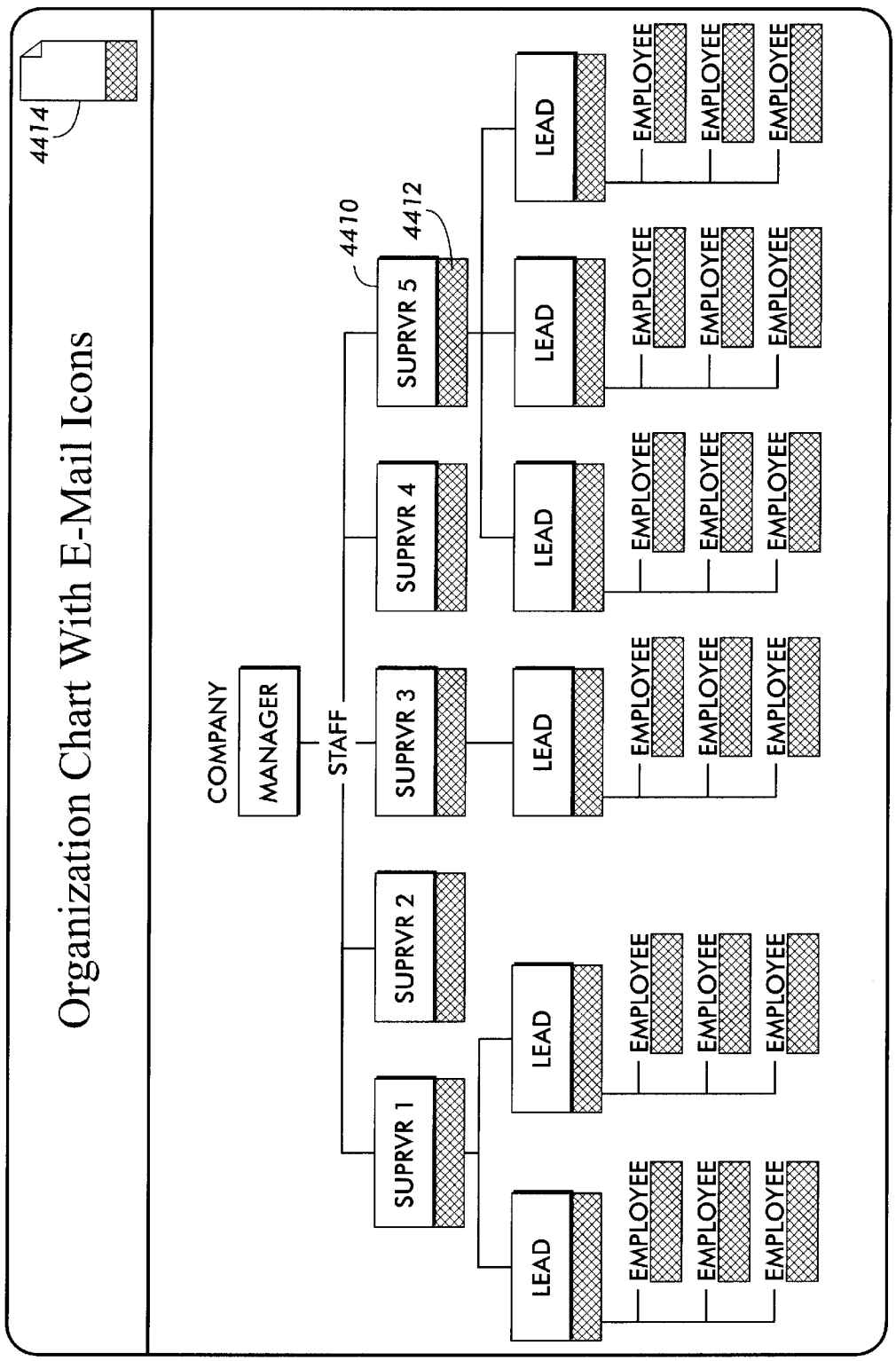
FIG. 44 illustrates a user interface example showing an e-mail system using local embedded data code labels.

FIG. 44 illustrates a user interface example showing an e-mail system using local embedded data code labels. In the embodiment shown, an organizational structure of a company is provided with nodes selectable by local embedded data code labels. For example, node 4410 represents supervisor 5 that may be selected by embedded data label 4412. The user interface provides a mechanism for selecting recipients for e-mail documents. A user could select Dave's Doc icon 3214 from FIG. 32, and then node 4410 using embedded data label 4412 to direct the document Dave's Doc to the supervisor associated with node 4410. Icon 4414 is used for selecting the context associated with the user interface. Alternatively to the local embedded data code labels, or in addition to them, the user interface of FIG. 44 may be implemented using address carpets as a background.

P. Conclusion

Methods, systems and articles of manufacture consistent with the present invention therefore facilitate implementation of a graphical user interface using embedded codes. The foregoing description of an implementation of the invention has been presented for purposes of illustration and description. It is not exhaustive and does not limit the invention to the precise form disclosed. Modifications and variations are possible in light of the above teachings or may be acquired from practicing of the invention.

What is claimed is:

1. Apparatus for use with a user interface having sensory indicia and embedded data code, and an image capture device for selecting a portion of the user interface and sending image information corresponding to the portion, comprising:

an image processor for decoding first image information into a first image capture code;

a resolver for mapping the first image capture code into a first selection code; and a syntax processor for analyzing the first selection code with a second selection code.

2. The apparatus according to claim 1, wherein the resolver comprises:

a plurality of mapping modules for mapping image capture codes to selection codes based on context.

3. The apparatus according to claim 2, wherein the syntax processor comprises:

a plurality of syntax modules for analyzing selection codes based on context.

4. The apparatus according to claim 2, wherein the syntax processor comprises:

a single syntax module for analyzing selection codes.

5. The apparatus according to claim 1, wherein the resolver comprises:

a single mapping module for mapping image capture codes to selection codes.

6. The apparatus according to claim 5, wherein the syntax processor comprises:

a plurality of syntax modules for analyzing selection codes based on context.

7. The apparatus according to claim 5, wherein the syntax processor comprises:

a single syntax module for analyzing selection codes.

8. The apparatus according to claim 1, wherein the resolver comprises a plurality of mapping modules, one of which determines mapping based on a first context; and wherein the syntax processor comprises a plurality of syntax modules, one of which determines an computer system operation based on the first context.

9. The apparatus according to claim 1, wherein the sensory indicia comprises a graphic element.

10. The apparatus according to claim 1, wherein the embedded data code: comprises glyphs.

11. The apparatus according to claim 1, wherein the embedded data code comprises an address code.

12. The apparatus according to claim 1, wherein the embedded data code comprises a glyph address code.

13. The apparatus according to claim 1, wherein the embedded data code comprises a label code associated with a graphic entity.

14. The apparatus according to claim 1, wherein the user interface comprises:

a first user interface portion including a first graphic entity on a first substrate, wherein the first graphic entity is associated with the first selection code; and a second user interface portion including a second graphic entity on a second substrate, wherein the second graphic entity is associated with the second selection code.

15. The apparatus according to claim 14, wherein the first user interface portion comprises a dynamic display.

16. The apparatus according to claim 1, wherein the user interface comprises:

a first user interface portion having an address space on a first substrate corresponding to a first context code; and a second user interface portion having an address space on a second substrate corresponding to a second context code.

17. A method for use with a user interface having sensory indicia and embedded data code, and an image capture device for selecting a portion of the user interface and sending image information corresponding to the portion, comprising:

decoding first image information into a first image capture code;

mapping the first image capture code into a first selection code; and analyzing the first selection code with a second selection code.

18. The method according to claim 17, wherein the step of mapping comprises:

mapping image capture codes to selection codes based on context using a plurality of mapping modules.

19. The method according to claim 18, wherein the step of analyzing comprises:

analyzing selection codes based on context using a plurality of syntax modules.

20. The method according to claim 18, wherein the step of analyzing comprises:

analyzing selection codes using a single syntax module.

21. The method according to claim 17, wherein the step of mapping comprises:

mapping image capture codes to selection codes using a single mapping module.

22. The method according to claim 21, wherein the step of analyzing comprises:

analyzing selection codes based on context using a plurality of syntax modules.

23. The method according to claim 21, wherein the step of analyzing comprises:

analyzing selection codes using a single syntax module.

24. The method according to claim 17, further comprising:

determining a mapping using a mapping module corresponding to a context; and determining a computer system operation using a mapping module corresponding to the context.

25. The method according to claim 17, wherein the sensory indicia comprises a graphic element.

26. The method according to claim 17, wherein the embedded data code comprises glyphs.

27. The method according to claim 17, wherein the embedded data code comprises an address code.

28. The method according to claim 17, wherein the embedded data code comprises a glyph address code.

29. The method according to claim 17, wherein the embedded data code comprises a label code associated with a graphic entity.

30. The method according to claim 17, wherein the user interface comprises:

a first user interface portion including a first graphic entity on a first substrate, wherein the first graphic entity is associated with the first selection code; and a second user interface portion including a second graphic entity on a second substrate, wherein the second graphic entity is associated with a second selection code.

31. The method according to claim 30, wherein the first user interface portion comprises a dynamic display.

32. The method according to claim 17, further comprising:

providing a first address space having an address space on a first substrate corresponding to a first context code; and providing a second interface having an address space on a second substrate corresponding to a second context code.

33. A graphical user interface for use with a user interface system including a device for capturing a portion of the graphical user interface in response to selection of sensory indicia, and a computer system responsive to embedded code in the portion for performing an operation related to the sensory indicia and a first selection code, comprising:

sensory indicia; and embedded data codes having a predetermined spatial relationship to the sensory indicia, wherein the embedded data codes comprise a context code.

34. The graphical user interface according to claim 33, wherein the embedded data codes comprise glyphtones.

35. The graphical user interface according to claim 33, wherein the embedded codes comprise:

an address carpet for relating selected locations in the user interface to corresponding computer system entities.

36. The graphical user interface according to claim 33, wherein the embedded codes comprise glyphs.

37. The graphical user interface according to claim 33, wherein the embedded codes comprise:

a label for relating the sensory indicia to a computer system entity.

38. The graphical user interface according to claim 33, wherein the embedded data codes comprise a distributed label context code.

39. Apparatus for determining computer system operations, comprising:

a user interface having sensory indicia and embedded data code;

an image capture device for selecting a portion of the user interface and sending image information corresponding to the portion;

an image processor for decoding image information into a capture code;

a resolver for mapping the image capture code into a selection code; and a syntax processor for analyzing multiple selection codes to determine corresponding computer system operations.

40. The apparatus according to claim 39, wherein the resolver comprises:

a plurality of mapping modules for mapping image capture codes to selection codes based on context.

41. The apparatus according to claim 40, wherein the syntax processor comprises:

a plurality of syntax modules for analyzing selection codes based on context.

42. The apparatus according to claim 40, wherein the syntax processor comprises:

a single syntax module for analyzing selection codes.

43. The apparatus according to claim 39, wherein the resolver comprises:

a single mapping module for mapping image capture codes to selection codes.

44. The apparatus according to claim 43, wherein the syntax processor comprises:

a plurality of syntax modules for analyzing selection codes based on context.

45. The apparatus according to claim 43, wherein the syntax processor comprises:

a single syntax module for analyzing selection codes.

46. The apparatus according to claim 39, wherein the resolver comprises a plurality of mapping modules, one of which determines mapping based on a first context; and wherein the syntax processor comprises a plurality of syntax modules, one of which determines an computer system operation based on the first context.

47. The apparatus according to claim 39, wherein the sensory indicia comprises: a graphic element.

48. The apparatus according to claim 39, wherein the embedded data code comprises glyphs.

49. The apparatus according to claim 39, wherein the embedded data code comprises an address code.

50. The apparatus according to claim 39, wherein the embedded data code comprises a glyph address code.

51. The apparatus according to claim 39, wherein the embedded data code comprises a label code associated with a graphic entity.

52. The apparatus according to claim 39, wherein the user interface comprises:

a first user interface portion including a first graphic entity on a first substrate, wherein the first graphic entity is associated with the first selection code; and a second user interface portion including a second graphic entity on a second substrate, wherein the second graphic entity is associated with a second selection code.

53. The apparatus according to claim 52, wherein the first user interface portion comprises a dynamic display.

54. The apparatus according to claim 39, wherein the user interface comprises:

a first user interface portion having an address space on a first substrate corresponding to a first context code; and a second user interface portion having an address space on a second substrate corresponding to a second context code.

* * * * *